(12) United States Patent
Mann et al.

(10) Patent No.: US 11,954,428 B2
(45) Date of Patent: Apr. 9, 2024

(54) DIGITAL PROCESSING SYSTEMS AND METHODS FOR ACCESSING ANOTHER'S DISPLAY VIA SOCIAL LAYER INTERACTIONS IN COLLABORATIVE WORK SYSTEMS

(71) Applicant: MONDAY.COM LTD., Tel Aviv (IL)

(72) Inventors: Roy Mann, Tel Aviv (IL); Ronen Sabag, Ashdod (IL); Ayala Naroshevitch, Tel Aviv (IL); Tal Haramati, Tel Aviv (IL)

(73) Assignee: MONDAY.COM LTD., Tel Aviv (IL)

( * ) Notice: Subject to any disclaimer, the term of this patent is extended or adjusted under 35 U.S.C. 154(b) by 0 days.

(21) Appl. No.: 17/243,737

(22) Filed: Apr. 29, 2021

(65) Prior Publication Data
US 2021/0342114 A1    Nov. 4, 2021

Related U.S. Application Data

(63) Continuation of application No. PCT/IB2021/000297, filed on Apr. 28, 2021.
(Continued)

(51) Int. Cl.
*G06F 3/04845* (2022.01)
*G06F 3/04817* (2022.01)
(Continued)

(52) U.S. Cl.
CPC .......... *G06F 40/18* (2020.01); *G06F 3/04817* (2013.01); *G06F 3/0482* (2013.01);
(Continued)

(58) Field of Classification Search
CPC ... G06F 3/1454; G06F 3/0482; H04L 51/046; H04L 65/403; H04L 67/1095; G09G 5/14
See application file for complete search history.

(56) References Cited

U.S. PATENT DOCUMENTS

| | | |
|---|---|---|
| 4,972,314 A | 11/1990 | Getzinger et al. |
| 5,220,657 A | 6/1993 | Bly et al. |

(Continued)

FOREIGN PATENT DOCUMENTS

| | | |
|---|---|---|
| CA | 2 828 011 A1 | 9/2012 |
| CN | 103064833 A | 4/2013 |

(Continued)

OTHER PUBLICATIONS

ShowMyPC, "Switch Presenter while Using ShowMyPC", evidenced by The Wayback Machine web.archive.org, Aug. 20, 2016, https://web.archive.org/web/20160820005929/http://showmypc.com/how-to-switch-screen.html, pp. 1 (Year: 2016).*

(Continued)

*Primary Examiner* — Andrew L Tank
(74) *Attorney, Agent, or Firm* — Finnegan, Henderson, Farabow, Garrett & Dunner, LLP

(57) ABSTRACT

Systems, methods, and computer-readable media for mutual screen sharing during a text chat are disclosed. The systems and methods may involve at least one processor configured to: maintain a platform that hosts a plurality of applications accessible to a plurality of client devices; enable the plurality of client devices to access and display via the platform, the plurality of applications; cause a communications interface to appear on the first client device and the second client device; cause a first display on the first client device of the second application in response to selection on the first client device of the first link; cause a second display on the second client device of the first application in response to selection on the second client device of the second link; and during the first display and the second display, enable communication between the first client device and the second client device.

19 Claims, 20 Drawing Sheets

Related U.S. Application Data

(60) Provisional application No. 63/148,092, filed on Feb. 10, 2021, provisional application No. 63/122,439, filed on Dec. 7, 2020, provisional application No. 63/121,803, filed on Dec. 4, 2020, provisional application No. 63/078,301, filed on Sep. 14, 2020, provisional application No. 63/019,396, filed on May 3, 2020, provisional application No. 63/018,593, filed on May 1, 2020.

(51) Int. Cl.

| | | |
|---|---|---|
| *G06F 3/0482* | (2013.01) | |
| *G06F 3/0484* | (2022.01) | |
| *G06F 3/14* | (2006.01) | |
| *G06F 3/16* | (2006.01) | |
| *G06F 9/54* | (2006.01) | |
| *G06F 11/30* | (2006.01) | |
| *G06F 11/34* | (2006.01) | |
| *G06F 16/11* | (2019.01) | |
| *G06F 16/14* | (2019.01) | |
| *G06F 16/22* | (2019.01) | |
| *G06F 16/23* | (2019.01) | |
| *G06F 16/2455* | (2019.01) | |
| *G06F 16/248* | (2019.01) | |
| *G06F 16/25* | (2019.01) | |
| *G06F 16/26* | (2019.01) | |
| *G06F 16/28* | (2019.01) | |
| *G06F 16/31* | (2019.01) | |
| *G06F 16/901* | (2019.01) | |
| *G06F 16/903* | (2019.01) | |
| *G06F 16/9032* | (2019.01) | |
| *G06F 16/9038* | (2019.01) | |
| *G06F 16/909* | (2019.01) | |
| *G06F 16/951* | (2019.01) | |
| *G06F 16/9536* | (2019.01) | |
| *G06F 18/22* | (2023.01) | |
| *G06F 40/103* | (2020.01) | |
| *G06F 40/106* | (2020.01) | |
| *G06F 40/177* | (2020.01) | |
| *G06F 40/18* | (2020.01) | |
| *G06F 40/186* | (2020.01) | |
| *G06F 40/253* | (2020.01) | |
| *G06F 40/279* | (2020.01) | |
| *G06F 40/30* | (2020.01) | |
| *G06F 40/40* | (2020.01) | |
| *G06N 20/00* | (2019.01) | |
| *G06Q 10/0631* | (2023.01) | |
| *G06Q 10/0633* | (2023.01) | |
| *G06Q 10/10* | (2023.01) | |
| *G06Q 10/101* | (2023.01) | |
| *G06T 11/20* | (2006.01) | |
| *H04L 12/18* | (2006.01) | |
| *H04L 51/04* | (2022.01) | |
| *H04L 51/046* | (2022.01) | |
| *H04L 51/18* | (2022.01) | |
| *H04L 51/48* | (2022.01) | |
| *H04L 65/401* | (2022.01) | |
| *H04L 67/1095* | (2022.01) | |
| *B65D 83/04* | (2006.01) | |

(52) U.S. Cl.
CPC .......... *G06F 3/0484* (2013.01); *G06F 3/1454* (2013.01); *G06F 3/165* (2013.01); *G06F 9/542* (2013.01); *G06F 9/548* (2013.01); *G06F 11/302* (2013.01); *G06F 11/3409* (2013.01); *G06F 11/3438* (2013.01); *G06F 16/116* (2019.01); *G06F 16/144* (2019.01); *G06F 16/2282* (2019.01); *G06F 16/23* (2019.01); *G06F 16/2308* (2019.01); *G06F 16/2365* (2019.01); *G06F 16/2393* (2019.01); *G06F 16/2456* (2019.01); *G06F 16/24564* (2019.01); *G06F 16/24565* (2019.01); *G06F 16/248* (2019.01); *G06F 16/258* (2019.01); *G06F 16/26* (2019.01); *G06F 16/287* (2019.01); *G06F 16/328* (2019.01); *G06F 16/9017* (2019.01); *G06F 16/90328* (2019.01); *G06F 16/90344* (2019.01); *G06F 16/9038* (2019.01); *G06F 16/909* (2019.01); *G06F 16/951* (2019.01); *G06F 16/9536* (2019.01); *G06F 18/22* (2023.01); *G06F 40/103* (2020.01); *G06F 40/106* (2020.01); *G06F 40/177* (2020.01); *G06F 40/186* (2020.01); *G06F 40/253* (2020.01); *G06F 40/279* (2020.01); *G06F 40/30* (2020.01); *G06F 40/40* (2020.01); *G06N 20/00* (2019.01); *G06Q 10/063114* (2013.01); *G06Q 10/063118* (2013.01); *G06Q 10/06312* (2013.01); *G06Q 10/06313* (2013.01); *G06Q 10/06316* (2013.01); *G06Q 10/0633* (2013.01); *G06Q 10/101* (2013.01); *G06Q 10/103* (2013.01); *G06T 11/206* (2013.01); *H04L 12/1827* (2013.01); *H04L 51/04* (2013.01); *H04L 51/046* (2013.01); *H04L 51/18* (2013.01); *H04L 51/48* (2022.05); *H04L 65/4015* (2013.01); *H04L 67/1095* (2013.01); *B65D 83/0409* (2013.01); *G06F 3/04845* (2013.01); *G06F 2201/865* (2013.01); *G06F 2201/88* (2013.01); *G06F 2203/04803* (2013.01); *G06T 2200/24* (2013.01)

(56) References Cited

U.S. PATENT DOCUMENTS

| | | |
|---|---|---|
| 5,479,602 A | 12/1995 | Baecker et al. |
| 5,517,663 A | 5/1996 | Kahn |
| 5,632,009 A | 5/1997 | Rao et al. |
| 5,682,469 A | 10/1997 | Linnett |
| 5,696,702 A | 12/1997 | Skinner et al. |
| 5,726,701 A | 3/1998 | Needham |
| 5,787,411 A | 7/1998 | Groff et al. |
| 5,880,742 A | 3/1999 | Rao et al. |
| 5,933,145 A | 8/1999 | Meek |
| 6,016,438 A | 1/2000 | Wakayama |
| 6,016,553 A | 1/2000 | Schneider et al. |
| 6,023,695 A | 2/2000 | Osborn et al. |
| 6,049,622 A | 4/2000 | Robb et al. |
| 6,088,707 A | 7/2000 | Bates et al. |
| 6,108,573 A | 8/2000 | Debbins et al. |
| 6,111,573 A | 8/2000 | McComb et al. |
| 6,167,405 A | 12/2000 | Rosensteel, Jr. et al. |
| 6,169,534 B1 | 1/2001 | Raffel et al. |
| 6,182,127 B1 | 1/2001 | Cronin, III et al. |
| 6,185,582 B1 | 2/2001 | Zellweger et al. |
| 6,195,794 B1 | 2/2001 | Buxton |
| 6,266,067 B1 | 7/2001 | Owen et al. |
| 6,275,809 B1 | 8/2001 | Tamaki et al. |
| 6,330,022 B1 | 12/2001 | Seligmann |
| 6,377,965 B1 | 4/2002 | Hachamovitch et al. |
| 6,385,617 B1 | 5/2002 | Malik |
| 6,460,043 B1 | 10/2002 | Tabbara et al. |
| 6,496,832 B2 | 12/2002 | Chi et al. |
| 6,509,912 B1 | 1/2003 | Moran et al. |
| 6,510,459 B2 | 1/2003 | Cronin, III et al. |
| 6,522,347 B1 | 2/2003 | Tsuji et al. |
| 6,527,556 B1 | 3/2003 | Koskinen |
| 6,567,830 B1 | 5/2003 | Madduri |
| 6,606,740 B1 | 8/2003 | Lynn et al. |

(56) References Cited

U.S. PATENT DOCUMENTS

| | | |
|---|---|---|
| 6,636,242 B2 | 10/2003 | Bowman-Amuah |
| 6,647,370 B1 | 11/2003 | Fu et al. |
| 6,661,431 B1 | 12/2003 | Stuart et al. |
| 7,027,997 B1 | 4/2006 | Robinson et al. |
| 7,034,860 B2 | 4/2006 | Lia et al. |
| 7,043,529 B1 | 5/2006 | Simonoff |
| 7,054,891 B2 | 5/2006 | Cole |
| 7,237,188 B1 | 6/2007 | Leung |
| 7,249,042 B1 | 7/2007 | Doerr et al. |
| 7,272,637 B1 | 9/2007 | Himmelstein |
| 7,274,375 B1 | 9/2007 | David |
| 7,379,934 B1 | 5/2008 | Forman et al. |
| 7,383,320 B1 | 6/2008 | Silberstein et al. |
| 7,389,473 B1 | 6/2008 | Sawicki et al. |
| 7,415,664 B2 | 8/2008 | Aureglia et al. |
| 7,417,644 B2 | 8/2008 | Cooper et al. |
| 7,461,077 B1 | 12/2008 | Greenwood |
| 7,489,976 B2 | 2/2009 | Adra |
| 7,617,443 B2 | 11/2009 | Mills et al. |
| 7,685,152 B2 | 3/2010 | Chivukula et al. |
| 7,707,514 B2 | 4/2010 | Forstall et al. |
| 7,710,290 B2 | 5/2010 | Johnson |
| 7,770,100 B2 | 8/2010 | Chamberlain et al. |
| 7,827,476 B1 | 11/2010 | Roberts et al. |
| 7,916,157 B1 | 3/2011 | Kelley et al. |
| 7,921,360 B1 | 4/2011 | Sundermeyer et al. |
| 7,954,043 B2 | 5/2011 | Bera |
| 7,954,064 B2 | 5/2011 | Forstall et al. |
| 8,046,703 B2 | 10/2011 | Busch et al. |
| 8,078,955 B1 | 12/2011 | Gupta |
| 8,082,274 B2 | 12/2011 | Steinglass et al. |
| 8,108,241 B2 | 1/2012 | Shukoor |
| 8,136,031 B2 | 3/2012 | Massand |
| 8,151,213 B2 | 4/2012 | Weitzman et al. |
| 8,223,172 B1 | 7/2012 | Miller et al. |
| 8,286,072 B2 | 10/2012 | Chamberlain et al. |
| 8,365,095 B2 | 1/2013 | Bansal et al. |
| 8,375,327 B2 | 2/2013 | Lorch et al. |
| 8,386,960 B1 | 2/2013 | Eismann et al. |
| 8,407,217 B1 | 3/2013 | Zhang |
| 8,413,261 B2 | 4/2013 | Nemoy et al. |
| 8,423,909 B2 | 4/2013 | Zabielski |
| 8,543,566 B2 | 9/2013 | Weissman et al. |
| 8,548,997 B1 | 10/2013 | Wu |
| 8,560,942 B2 | 10/2013 | Fortes et al. |
| 8,566,732 B2 | 10/2013 | Louch et al. |
| 8,572,173 B2 | 10/2013 | Briere et al. |
| 8,578,399 B2 | 11/2013 | Khen et al. |
| 8,601,383 B2 | 12/2013 | Folting et al. |
| 8,620,703 B1 | 12/2013 | Kapoor et al. |
| 8,621,652 B2 | 12/2013 | Slater, Jr. |
| 8,635,520 B2 | 1/2014 | Christiansen et al. |
| 8,677,448 B1 | 3/2014 | Kauffman et al. |
| 8,738,414 B1 | 5/2014 | Nagar et al. |
| 8,812,471 B2 | 8/2014 | Akita |
| 8,819,042 B2 | 8/2014 | Samudrala et al. |
| 8,825,758 B2 | 9/2014 | Bailor et al. |
| 8,838,533 B2 | 9/2014 | Kwiatkowski et al. |
| 8,862,979 B2 | 10/2014 | Hawking |
| 8,863,022 B2 | 10/2014 | Rhodes et al. |
| 8,869,027 B2 | 10/2014 | Louch et al. |
| 8,937,627 B1 | 1/2015 | Otero et al. |
| 8,938,465 B2 | 1/2015 | Messer |
| 8,954,871 B2 | 2/2015 | Louch et al. |
| 9,007,405 B1 | 4/2015 | Eldar et al. |
| 9,015,716 B2 | 4/2015 | Fletcher et al. |
| 9,026,897 B2 | 5/2015 | Zarras |
| 9,043,362 B2 | 5/2015 | Weissman et al. |
| 9,063,958 B2 | 6/2015 | Müller et al. |
| 9,129,234 B2 | 9/2015 | Campbell et al. |
| 9,159,246 B2 | 10/2015 | Rodriguez et al. |
| 9,172,738 B1 | 10/2015 | daCosta |
| 9,183,303 B1 | 11/2015 | Goel et al. |
| 9,223,770 B1 | 12/2015 | Ledet |
| 9,239,719 B1 | 1/2016 | Feinstein et al. |
| 9,244,917 B1 | 1/2016 | Sharma et al. |
| 9,253,130 B2 | 2/2016 | Zaveri |
| 9,286,246 B2 | 3/2016 | Saito et al. |
| 9,286,475 B2 | 3/2016 | Li et al. |
| 9,292,587 B2 | 3/2016 | Kann et al. |
| 9,336,502 B2 | 5/2016 | Mohammad et al. |
| 9,342,579 B2 | 5/2016 | Cao et al. |
| 9,361,287 B1 | 6/2016 | Simon et al. |
| 9,390,059 B1 | 7/2016 | Gur et al. |
| 9,424,287 B2 | 8/2016 | Schroth |
| 9,424,333 B1 | 8/2016 | Bisignani et al. |
| 9,424,545 B1 | 8/2016 | Lee |
| 9,430,458 B2 | 8/2016 | Rhee et al. |
| 9,449,031 B2 | 9/2016 | Barrus et al. |
| 9,495,386 B2 | 11/2016 | Tapley et al. |
| 9,558,172 B2 | 1/2017 | Rampson et al. |
| 9,613,086 B1 | 4/2017 | Sherman |
| 9,635,091 B1 | 4/2017 | Laukkanen et al. |
| 9,679,456 B2 | 6/2017 | East |
| 9,727,376 B1 | 8/2017 | Bills et al. |
| 9,760,271 B2 | 9/2017 | Persaud |
| 9,794,256 B2 | 10/2017 | Kiang et al. |
| 9,798,829 B1 | 10/2017 | Baisley |
| 9,811,676 B1 | 11/2017 | Gauvin |
| 9,866,561 B2 | 1/2018 | Psenka et al. |
| 9,870,136 B2 | 1/2018 | Pourshahid |
| 10,043,296 B2 | 8/2018 | Li |
| 10,067,928 B1 | 9/2018 | Krappe |
| 10,078,668 B1 | 9/2018 | Woodrow et al. |
| 10,169,306 B2 | 1/2019 | O'Shaughnessy et al. |
| 10,176,154 B2 | 1/2019 | Ben-Aharon et al. |
| 10,235,441 B1 | 3/2019 | Makhlin et al. |
| 10,255,609 B2 | 4/2019 | Kinkead et al. |
| 10,282,405 B1 | 5/2019 | Silk et al. |
| 10,282,406 B2 | 5/2019 | Bissantz |
| 10,311,080 B2 | 6/2019 | Folting et al. |
| 10,318,624 B1 | 6/2019 | Rosner et al. |
| 10,327,712 B2 | 6/2019 | Beymer et al. |
| 10,347,017 B2 | 7/2019 | Ruble et al. |
| 10,372,706 B2 | 8/2019 | Chavan et al. |
| 10,380,140 B2 | 8/2019 | Sherman |
| 10,423,758 B2 | 9/2019 | Kido et al. |
| 10,445,702 B1 | 10/2019 | Hunt |
| 10,452,360 B1 | 10/2019 | Burman et al. |
| 10,453,118 B2 | 10/2019 | Smith et al. |
| 10,474,317 B2 | 11/2019 | Ramanathan et al. |
| 10,489,391 B1 | 11/2019 | Tomlin |
| 10,489,462 B1 | 11/2019 | Rogynskyy et al. |
| 10,496,737 B1 | 12/2019 | Sayre et al. |
| 10,505,825 B1 | 12/2019 | Bettaiah et al. |
| 10,528,599 B1 | 1/2020 | Pandis et al. |
| 10,534,507 B1 | 1/2020 | Laukkanen et al. |
| 10,540,152 B1 | 1/2020 | Krishnaswamy et al. |
| 10,540,434 B2 | 1/2020 | Migeon et al. |
| 10,546,001 B1 | 1/2020 | Nguyen et al. |
| 10,564,622 B1 | 2/2020 | Dean et al. |
| 10,573,407 B2 | 2/2020 | Ginsburg |
| 10,579,724 B2 | 3/2020 | Campbell et al. |
| 10,628,002 B1 | 4/2020 | Kang et al. |
| 10,698,594 B2 | 6/2020 | Sanches et al. |
| 10,706,061 B2 | 7/2020 | Sherman et al. |
| 10,719,220 B2 | 7/2020 | Ouellet et al. |
| 10,733,256 B2 | 8/2020 | Fickenscher et al. |
| 10,740,117 B2 | 8/2020 | Ording et al. |
| 10,747,950 B2 | 8/2020 | Dang et al. |
| 10,748,312 B2 | 8/2020 | Ruble et al. |
| 10,754,688 B2 | 8/2020 | Powell |
| 10,761,691 B2 | 9/2020 | Anzures et al. |
| 10,795,555 B2 | 10/2020 | Burke et al. |
| 10,817,660 B2 | 10/2020 | Rampson et al. |
| D910,077 S | 2/2021 | Naroshevitch et al. |
| 10,963,578 B2 | 3/2021 | More et al. |
| 11,010,371 B1 | 5/2021 | Slomka et al. |
| 11,030,259 B2 | 6/2021 | Mullins et al. |
| 11,042,363 B1 | 6/2021 | Krishnaswamy et al. |
| 11,042,699 B1 | 6/2021 | Sayre et al. |
| 11,048,714 B2 | 6/2021 | Sherman et al. |
| 11,222,167 B2 | 1/2022 | Gehrmann et al. |
| 11,243,688 B1 | 2/2022 | Remy et al. |

(56) References Cited

U.S. PATENT DOCUMENTS

| | | |
|---|---|---|
| 2001/0008998 A1 | 7/2001 | Tamaki et al. |
| 2001/0032248 A1 | 10/2001 | Krafchin |
| 2001/0039551 A1 | 11/2001 | Saito et al. |
| 2002/0002459 A1 | 1/2002 | Lewis et al. |
| 2002/0065849 A1 | 5/2002 | Ferguson et al. |
| 2002/0065880 A1 | 5/2002 | Hasegawa et al. |
| 2002/0069207 A1 | 6/2002 | Alexander et al. |
| 2002/0075309 A1 | 6/2002 | Michelman et al. |
| 2002/0082892 A1 | 6/2002 | Raffel et al. |
| 2002/0138528 A1 | 9/2002 | Gong et al. |
| 2003/0033196 A1 | 2/2003 | Tomlin |
| 2003/0041113 A1 | 2/2003 | Larsen |
| 2003/0051377 A1 | 3/2003 | Chirafesi, Jr. |
| 2003/0058277 A1 | 3/2003 | Bowman-Amuah |
| 2003/0065662 A1 | 4/2003 | Cosic |
| 2003/0093408 A1 | 5/2003 | Brown et al. |
| 2003/0101416 A1 | 5/2003 | McInnes et al. |
| 2003/0135558 A1 | 7/2003 | Bellotti et al. |
| 2003/0137536 A1 | 7/2003 | Hugh |
| 2003/0187864 A1 | 10/2003 | McGoveran |
| 2003/0200215 A1 | 10/2003 | Chen et al. |
| 2003/0204490 A1 | 10/2003 | Kasriel |
| 2004/0032432 A1 | 2/2004 | Baynger |
| 2004/0098284 A1 | 5/2004 | Petito et al. |
| 2004/0133441 A1 | 7/2004 | Brady et al. |
| 2004/0138939 A1 | 7/2004 | Theiler |
| 2004/0162833 A1 | 8/2004 | Jones et al. |
| 2004/0172592 A1 | 9/2004 | Collie et al. |
| 2004/0212615 A1 | 10/2004 | Uthe |
| 2004/0215443 A1 | 10/2004 | Hatton |
| 2004/0230940 A1 | 11/2004 | Cooper et al. |
| 2004/0268227 A1 | 12/2004 | Brid |
| 2005/0034058 A1 | 2/2005 | Mills et al. |
| 2005/0034064 A1 | 2/2005 | Meyers et al. |
| 2005/0039001 A1 | 2/2005 | Hudis et al. |
| 2005/0039033 A1 | 2/2005 | Meyers et al. |
| 2005/0044486 A1 | 2/2005 | Kotler et al. |
| 2005/0063615 A1 | 3/2005 | Siegel et al. |
| 2005/0066306 A1 | 3/2005 | Diab |
| 2005/0086360 A1 | 4/2005 | Mamou et al. |
| 2005/0091314 A1 | 4/2005 | Blagsvedt et al. |
| 2005/0091596 A1 | 4/2005 | Anthony et al. |
| 2005/0096973 A1 | 5/2005 | Heyse et al. |
| 2005/0114305 A1 | 5/2005 | Haynes et al. |
| 2005/0125395 A1 | 6/2005 | Boettiger |
| 2005/0165600 A1 | 7/2005 | Kasravi et al. |
| 2005/0171881 A1 | 8/2005 | Ghassemieh et al. |
| 2005/0216830 A1 | 9/2005 | Turner et al. |
| 2005/0228250 A1 | 10/2005 | Bitter et al. |
| 2005/0251021 A1 | 11/2005 | Kaufman et al. |
| 2005/0257204 A1 | 11/2005 | Bryant et al. |
| 2005/0278297 A1 | 12/2005 | Nelson |
| 2005/0289170 A1 | 12/2005 | Brown et al. |
| 2005/0289342 A1 | 12/2005 | Needham et al. |
| 2005/0289453 A1 | 12/2005 | Segal et al. |
| 2006/0009960 A1 | 1/2006 | Valencot et al. |
| 2006/0013462 A1 | 1/2006 | Sadikali |
| 2006/0015499 A1 | 1/2006 | Clissold et al. |
| 2006/0015806 A1 | 1/2006 | Wallace |
| 2006/0031148 A1 | 2/2006 | O'Dell et al. |
| 2006/0036568 A1 | 2/2006 | Moore et al. |
| 2006/0047811 A1 | 3/2006 | Lau et al. |
| 2006/0053096 A1 | 3/2006 | Subramanian et al. |
| 2006/0053194 A1 | 3/2006 | Schneider et al. |
| 2006/0069604 A1 | 3/2006 | Leukart et al. |
| 2006/0069635 A1 | 3/2006 | Ram et al. |
| 2006/0080594 A1 | 4/2006 | Chavoustie et al. |
| 2006/0090169 A1 | 4/2006 | Daniels et al. |
| 2006/0106642 A1 | 5/2006 | Reicher et al. |
| 2006/0107196 A1 | 5/2006 | Thanu et al. |
| 2006/0111953 A1 | 5/2006 | Setya |
| 2006/0129415 A1 | 6/2006 | Thukral et al. |
| 2006/0136828 A1* | 6/2006 | Asano ............... G06F 9/54 715/733 |
| 2006/0150090 A1 | 7/2006 | Swamidass |
| 2006/0173908 A1 | 8/2006 | Browning et al. |
| 2006/0190313 A1 | 8/2006 | Lu |
| 2006/0212299 A1 | 9/2006 | Law |
| 2006/0224542 A1 | 10/2006 | Yalamanchi |
| 2006/0224568 A1 | 10/2006 | Debrito |
| 2006/0224946 A1 | 10/2006 | Barrett et al. |
| 2006/0236246 A1 | 10/2006 | Bono et al. |
| 2006/0250369 A1 | 11/2006 | Keim |
| 2006/0253205 A1 | 11/2006 | Gardiner |
| 2006/0271574 A1 | 11/2006 | Villaron et al. |
| 2006/0287998 A1 | 12/2006 | Folting et al. |
| 2006/0294451 A1 | 12/2006 | Kelkar et al. |
| 2007/0027932 A1 | 2/2007 | Thibeault |
| 2007/0033531 A1 | 2/2007 | Marsh |
| 2007/0050322 A1 | 3/2007 | Vigesaa et al. |
| 2007/0050379 A1 | 3/2007 | Day et al. |
| 2007/0073899 A1 | 3/2007 | Judge et al. |
| 2007/0092048 A1 | 4/2007 | Chelstrom et al. |
| 2007/0094607 A1 | 4/2007 | Morgan et al. |
| 2007/0101291 A1 | 5/2007 | Forstall et al. |
| 2007/0106754 A1 | 5/2007 | Moore |
| 2007/0118527 A1 | 5/2007 | Winje et al. |
| 2007/0118813 A1 | 5/2007 | Forstall et al. |
| 2007/0143169 A1 | 6/2007 | Grant et al. |
| 2007/0168861 A1 | 7/2007 | Bell et al. |
| 2007/0174228 A1 | 7/2007 | Folting et al. |
| 2007/0174760 A1 | 7/2007 | Chamberlain et al. |
| 2007/0186173 A1 | 8/2007 | Both et al. |
| 2007/0220119 A1 | 9/2007 | Himmelstein |
| 2007/0233647 A1 | 10/2007 | Rawat et al. |
| 2007/0256043 A1 | 11/2007 | Peters et al. |
| 2007/0282522 A1 | 12/2007 | Geelen |
| 2007/0282627 A1 | 12/2007 | Greenstein et al. |
| 2007/0283259 A1 | 12/2007 | Barry et al. |
| 2007/0294235 A1 | 12/2007 | Millett |
| 2007/0299795 A1 | 12/2007 | Macbeth et al. |
| 2007/0300174 A1 | 12/2007 | Macbeth et al. |
| 2007/0300185 A1 | 12/2007 | Macbeth et al. |
| 2008/0004929 A9 | 1/2008 | Raffel et al. |
| 2008/0005235 A1 | 1/2008 | Hegde et al. |
| 2008/0033777 A1 | 2/2008 | Shukoor |
| 2008/0034307 A1 | 2/2008 | Cisler et al. |
| 2008/0034314 A1 | 2/2008 | Louch et al. |
| 2008/0052291 A1 | 2/2008 | Bender |
| 2008/0059312 A1 | 3/2008 | Gern et al. |
| 2008/0059539 A1 | 3/2008 | Chin et al. |
| 2008/0065460 A1 | 3/2008 | Raynor |
| 2008/0077530 A1 | 3/2008 | Banas et al. |
| 2008/0097748 A1 | 4/2008 | Haley et al. |
| 2008/0104091 A1 | 5/2008 | Chin |
| 2008/0126389 A1 | 5/2008 | Mush et al. |
| 2008/0133736 A1 | 6/2008 | Wensley et al. |
| 2008/0148140 A1 | 6/2008 | Nakano |
| 2008/0155547 A1 | 6/2008 | Weber et al. |
| 2008/0163075 A1 | 7/2008 | Beck et al. |
| 2008/0195948 A1 | 8/2008 | Bauer |
| 2008/0209318 A1 | 8/2008 | Allsop et al. |
| 2008/0216022 A1 | 9/2008 | Lorch et al. |
| 2008/0222192 A1 | 9/2008 | Hughes |
| 2008/0256014 A1 | 10/2008 | Gould et al. |
| 2008/0256429 A1 | 10/2008 | Penner et al. |
| 2008/0270597 A1 | 10/2008 | Tenenti |
| 2008/0282189 A1 | 11/2008 | Hofmann et al. |
| 2008/0295038 A1 | 11/2008 | Helfman et al. |
| 2008/0301237 A1 | 12/2008 | Parsons |
| 2009/0006171 A1 | 1/2009 | Blatchley et al. |
| 2009/0006283 A1 | 1/2009 | Labrie et al. |
| 2009/0013244 A1 | 1/2009 | Cudich et al. |
| 2009/0019383 A1 | 1/2009 | Riley et al. |
| 2009/0024944 A1 | 1/2009 | Louch et al. |
| 2009/0044090 A1 | 2/2009 | Gur et al. |
| 2009/0048896 A1 | 2/2009 | Anandan |
| 2009/0049372 A1 | 2/2009 | Goldberg |
| 2009/0077164 A1 | 3/2009 | Phillips et al. |
| 2009/0077217 A1 | 3/2009 | McFarland et al. |
| 2009/0083140 A1 | 3/2009 | Phan |
| 2009/0094514 A1 | 4/2009 | Dargahi et al. |
| 2009/0113310 A1 | 4/2009 | Appleyard et al. |
| 2009/0132470 A1 | 5/2009 | Vignet |

(56) References Cited

U.S. PATENT DOCUMENTS

| | | |
|---|---|---|
| 2009/0150813 A1 | 6/2009 | Chang et al. |
| 2009/0174680 A1 | 7/2009 | Anzures et al. |
| 2009/0192787 A1 | 7/2009 | Roon |
| 2009/0198715 A1 | 8/2009 | Barbarek |
| 2009/0222760 A1 | 9/2009 | Halverson et al. |
| 2009/0248710 A1 | 10/2009 | McCormack et al. |
| 2009/0271696 A1 | 10/2009 | Bailor et al. |
| 2009/0276692 A1 | 11/2009 | Rosner |
| 2009/0313201 A1 | 12/2009 | Huelsman et al. |
| 2009/0313537 A1 | 12/2009 | Fu et al. |
| 2009/0313570 A1 | 12/2009 | Po et al. |
| 2009/0319623 A1 | 12/2009 | Srinivasan et al. |
| 2009/0319882 A1 | 12/2009 | Morrison et al. |
| 2009/0327240 A1 | 12/2009 | Meehan et al. |
| 2009/0327851 A1 | 12/2009 | Raposo |
| 2009/0327875 A1 | 12/2009 | Kinkoh |
| 2010/0017699 A1 | 1/2010 | Farrell et al. |
| 2010/0031135 A1 | 2/2010 | Naghshin et al. |
| 2010/0070845 A1 | 3/2010 | Facemire et al. |
| 2010/0070895 A1 | 3/2010 | Messer |
| 2010/0083164 A1 | 4/2010 | Martin et al. |
| 2010/0088636 A1 | 4/2010 | Yerkes et al. |
| 2010/0095219 A1 | 4/2010 | Stachowiak et al. |
| 2010/0095298 A1 | 4/2010 | Seshadrinathan et al. |
| 2010/0100427 A1 | 4/2010 | McKeown et al. |
| 2010/0100463 A1 | 4/2010 | Molotsi et al. |
| 2010/0114926 A1 | 5/2010 | Agrawal et al. |
| 2010/0149005 A1 | 6/2010 | Yoon et al. |
| 2010/0174678 A1 | 7/2010 | Massand |
| 2010/0228752 A1 | 9/2010 | Folting et al. |
| 2010/0241477 A1 | 9/2010 | Nylander et al. |
| 2010/0241948 A1 | 9/2010 | Andeen et al. |
| 2010/0241972 A1 | 9/2010 | Spataro et al. |
| 2010/0241990 A1 | 9/2010 | Gabriel et al. |
| 2010/0251090 A1 | 9/2010 | Chamberlain et al. |
| 2010/0251386 A1 | 9/2010 | Gilzean et al. |
| 2010/0257015 A1 | 10/2010 | Molander |
| 2010/0262625 A1 | 10/2010 | Pittenger |
| 2010/0287163 A1 | 11/2010 | Sridhar et al. |
| 2010/0287221 A1 | 11/2010 | Battepati et al. |
| 2010/0313119 A1 | 12/2010 | Baldwin et al. |
| 2010/0324964 A1 | 12/2010 | Callanan et al. |
| 2010/0332973 A1 | 12/2010 | Kloiber et al. |
| 2011/0010340 A1* | 1/2011 | Hung .................. H04L 12/1886 709/204 |
| 2011/0016432 A1 | 1/2011 | Helfman |
| 2011/0028138 A1 | 2/2011 | Davies-Moore et al. |
| 2011/0047484 A1 | 2/2011 | Mount et al. |
| 2011/0055177 A1 | 3/2011 | Chakra et al. |
| 2011/0066933 A1 | 3/2011 | Ludwig |
| 2011/0071869 A1 | 3/2011 | O'Brien et al. |
| 2011/0106636 A1 | 5/2011 | Spear et al. |
| 2011/0119352 A1* | 5/2011 | Perov .................. G06F 16/954 709/218 |
| 2011/0179371 A1 | 7/2011 | Kopycinski et al. |
| 2011/0205231 A1 | 8/2011 | Hartley et al. |
| 2011/0208324 A1 | 8/2011 | Fukatsu |
| 2011/0208732 A1 | 8/2011 | Melton et al. |
| 2011/0209150 A1 | 8/2011 | Hammond et al. |
| 2011/0219321 A1 | 9/2011 | Gonzalez et al. |
| 2011/0225525 A1 | 9/2011 | Chasman et al. |
| 2011/0231273 A1 | 9/2011 | Buchheit |
| 2011/0289397 A1 | 11/2011 | Eastmond et al. |
| 2011/0289439 A1 | 11/2011 | Jugel |
| 2011/0298618 A1 | 12/2011 | Stahl et al. |
| 2011/0302003 A1 | 12/2011 | Shirish et al. |
| 2012/0029962 A1 | 2/2012 | Podgurny et al. |
| 2012/0035974 A1 | 2/2012 | Seybold |
| 2012/0036462 A1 | 2/2012 | Schwartz et al. |
| 2012/0066587 A1 | 3/2012 | Zhou et al. |
| 2012/0072821 A1 | 3/2012 | Bowling |
| 2012/0079408 A1 | 3/2012 | Rohwer |
| 2012/0081762 A1 | 4/2012 | Yamada |
| 2012/0084798 A1 | 4/2012 | Reeves et al. |
| 2012/0086716 A1 | 4/2012 | Reeves et al. |
| 2012/0086717 A1 | 4/2012 | Liu |
| 2012/0089610 A1 | 4/2012 | Agrawal et al. |
| 2012/0089914 A1 | 4/2012 | Holt et al. |
| 2012/0089992 A1 | 4/2012 | Reeves et al. |
| 2012/0096389 A1 | 4/2012 | Flam et al. |
| 2012/0096392 A1 | 4/2012 | Ording et al. |
| 2012/0102432 A1 | 4/2012 | Breedvelt-Schouten et al. |
| 2012/0102543 A1 | 4/2012 | Kohli et al. |
| 2012/0110515 A1 | 5/2012 | Abramoff et al. |
| 2012/0116834 A1 | 5/2012 | Pope et al. |
| 2012/0116835 A1 | 5/2012 | Pope et al. |
| 2012/0124749 A1 | 5/2012 | Lewman et al. |
| 2012/0131445 A1 | 5/2012 | Oyarzabal et al. |
| 2012/0151173 A1 | 6/2012 | Shirley et al. |
| 2012/0158744 A1 | 6/2012 | Tseng et al. |
| 2012/0192050 A1 | 7/2012 | Campbell et al. |
| 2012/0198322 A1 | 8/2012 | Gulwani et al. |
| 2012/0210252 A1 | 8/2012 | Fedoseyeva et al. |
| 2012/0215574 A1 | 8/2012 | Driessnack et al. |
| 2012/0215578 A1 | 8/2012 | Swierz, III et al. |
| 2012/0233150 A1 | 9/2012 | Naim et al. |
| 2012/0233533 A1 | 9/2012 | Yücel et al. |
| 2012/0239454 A1 | 9/2012 | Taix et al. |
| 2012/0246170 A1 | 9/2012 | Iantorno |
| 2012/0254252 A1 | 10/2012 | Jin et al. |
| 2012/0254770 A1 | 10/2012 | Ophir |
| 2012/0260190 A1 | 10/2012 | Berger et al. |
| 2012/0278117 A1 | 11/2012 | Nguyen et al. |
| 2012/0284197 A1 | 11/2012 | Strick et al. |
| 2012/0297307 A1 | 11/2012 | Rider et al. |
| 2012/0303262 A1 | 11/2012 | Alam et al. |
| 2012/0304098 A1 | 11/2012 | Kuulusa |
| 2012/0311496 A1 | 12/2012 | Cao et al. |
| 2013/0018952 A1 | 1/2013 | McConnell et al. |
| 2013/0018953 A1 | 1/2013 | McConnell et al. |
| 2013/0018960 A1* | 1/2013 | Knysz .................. H04L 65/403 709/204 |
| 2013/0024418 A1 | 1/2013 | Strick et al. |
| 2013/0024760 A1 | 1/2013 | Vogel et al. |
| 2013/0036369 A1 | 2/2013 | Mitchell et al. |
| 2013/0041958 A1 | 2/2013 | Post et al. |
| 2013/0055113 A1* | 2/2013 | Chazin ................ H04L 12/1822 715/758 |
| 2013/0063490 A1 | 3/2013 | Zaman et al. |
| 2013/0086460 A1 | 4/2013 | Folting et al. |
| 2013/0090969 A1 | 4/2013 | Rivere |
| 2013/0097490 A1 | 4/2013 | Kotler et al. |
| 2013/0103417 A1 | 4/2013 | Seto et al. |
| 2013/0104035 A1 | 4/2013 | Wagner et al. |
| 2013/0111320 A1 | 5/2013 | Campbell et al. |
| 2013/0117268 A1 | 5/2013 | Smith et al. |
| 2013/0159832 A1 | 6/2013 | Ingargiola et al. |
| 2013/0159907 A1 | 6/2013 | Brosche et al. |
| 2013/0179209 A1 | 7/2013 | Milosevich |
| 2013/0211866 A1 | 8/2013 | Gordon et al. |
| 2013/0212197 A1 | 8/2013 | Karlson |
| 2013/0212234 A1 | 8/2013 | Bartlett et al. |
| 2013/0238363 A1 | 9/2013 | Ohta et al. |
| 2013/0238968 A1 | 9/2013 | Barrus |
| 2013/0246384 A1 | 9/2013 | Victor |
| 2013/0262527 A1 | 10/2013 | Hunter |
| 2013/0268331 A1 | 10/2013 | Bitz et al. |
| 2013/0297468 A1 | 11/2013 | Hirsch et al. |
| 2013/0318424 A1 | 11/2013 | Boyd |
| 2013/0339051 A1 | 12/2013 | Dobrean |
| 2014/0006326 A1 | 1/2014 | Bazanov |
| 2014/0019842 A1 | 1/2014 | Montagna et al. |
| 2014/0033307 A1 | 1/2014 | Schmidtler |
| 2014/0043331 A1 | 2/2014 | Makinen et al. |
| 2014/0046638 A1 | 2/2014 | Peloski |
| 2014/0052749 A1 | 2/2014 | Rissanen |
| 2014/0068403 A1 | 3/2014 | Bhargav et al. |
| 2014/0074545 A1 | 3/2014 | Minder et al. |
| 2014/0075301 A1 | 3/2014 | Mihara |
| 2014/0082525 A1 | 3/2014 | Kass et al. |
| 2014/0101527 A1 | 4/2014 | Suciu |
| 2014/0108985 A1 | 4/2014 | Scott et al. |
| 2014/0109012 A1 | 4/2014 | Choudhary et al. |
| 2014/0111516 A1 | 4/2014 | Hall et al. |

(56) References Cited

U.S. PATENT DOCUMENTS

| | | |
|---|---|---|
| 2014/0115515 A1 | 4/2014 | Adams et al. |
| 2014/0115518 A1 | 4/2014 | Abdukalykov et al. |
| 2014/0129960 A1 | 5/2014 | Wang et al. |
| 2014/0136972 A1 | 5/2014 | Rodgers et al. |
| 2014/0137003 A1 | 5/2014 | Peters et al. |
| 2014/0137144 A1 | 5/2014 | Järvenpää et al. |
| 2014/0172475 A1 | 6/2014 | Olliphant et al. |
| 2014/0173401 A1 | 6/2014 | Oshlag et al. |
| 2014/0181155 A1 | 6/2014 | Homsany |
| 2014/0188748 A1 | 7/2014 | Cavoue et al. |
| 2014/0195933 A1 | 7/2014 | Rao Dv |
| 2014/0214404 A1 | 7/2014 | Kalia et al. |
| 2014/0215303 A1 | 7/2014 | Grigorovitch et al. |
| 2014/0249877 A1 | 9/2014 | Hull et al. |
| 2014/0278638 A1 | 9/2014 | Kreuzkamp et al. |
| 2014/0278720 A1 | 9/2014 | Taguchi |
| 2014/0280287 A1 | 9/2014 | Ganti et al. |
| 2014/0280377 A1 | 9/2014 | Frew |
| 2014/0281868 A1 | 9/2014 | Vogel et al. |
| 2014/0281869 A1 | 9/2014 | Yob |
| 2014/0289223 A1 | 9/2014 | Colwell et al. |
| 2014/0304174 A1 | 10/2014 | Scott et al. |
| 2014/0306837 A1 | 10/2014 | Hauck, III |
| 2014/0310345 A1* | 10/2014 | Megiddo ............ G06Q 10/101 709/204 |
| 2014/0324497 A1 | 10/2014 | Verma et al. |
| 2014/0324501 A1 | 10/2014 | Davidow et al. |
| 2014/0365938 A1 | 12/2014 | Black et al. |
| 2014/0372856 A1 | 12/2014 | Radakovitz et al. |
| 2014/0372932 A1 | 12/2014 | Rutherford et al. |
| 2015/0032686 A1 | 1/2015 | Kuchoor |
| 2015/0033131 A1 | 1/2015 | Peev et al. |
| 2015/0033149 A1* | 1/2015 | Kuchoor ............ H04N 21/4782 715/753 |
| 2015/0067556 A1 | 3/2015 | Tibrewal et al. |
| 2015/0074721 A1 | 3/2015 | Fishman et al. |
| 2015/0074728 A1 | 3/2015 | Chai et al. |
| 2015/0095752 A1 | 4/2015 | Studer et al. |
| 2015/0106736 A1 | 4/2015 | Torman et al. |
| 2015/0125834 A1 | 5/2015 | Mendoza |
| 2015/0142676 A1 | 5/2015 | McGinnis et al. |
| 2015/0142829 A1 | 5/2015 | Lee et al. |
| 2015/0153943 A1 | 6/2015 | Wang |
| 2015/0154660 A1 | 6/2015 | Weald et al. |
| 2015/0169514 A1 | 6/2015 | Sah et al. |
| 2015/0169531 A1 | 6/2015 | Campbell et al. |
| 2015/0188964 A1 | 7/2015 | Sharma et al. |
| 2015/0212717 A1 | 7/2015 | Nair et al. |
| 2015/0220491 A1 | 8/2015 | Cochrane et al. |
| 2015/0242091 A1 | 8/2015 | Lu et al. |
| 2015/0249864 A1 | 9/2015 | Tang et al. |
| 2015/0261796 A1 | 9/2015 | Gould et al. |
| 2015/0262121 A1 | 9/2015 | Riel-Dalpe et al. |
| 2015/0278699 A1 | 10/2015 | Danielsson |
| 2015/0281292 A1 | 10/2015 | Murayama |
| 2015/0295877 A1 | 10/2015 | Roman |
| 2015/0317590 A1 | 11/2015 | Karlson |
| 2015/0324453 A1 | 11/2015 | Werner |
| 2015/0331846 A1 | 11/2015 | Guggilla et al. |
| 2015/0363478 A1 | 12/2015 | Haynes |
| 2015/0370540 A1 | 12/2015 | Coslovi et al. |
| 2015/0370904 A1 | 12/2015 | Joshi et al. |
| 2015/0378542 A1 | 12/2015 | Saito et al. |
| 2015/0378711 A1 | 12/2015 | Cameron et al. |
| 2015/0378979 A1 | 12/2015 | Hirzel et al. |
| 2016/0012111 A1 | 1/2016 | Pattabhiraman et al. |
| 2016/0018962 A1 | 1/2016 | Low et al. |
| 2016/0026939 A1 | 1/2016 | Schiffer et al. |
| 2016/0027076 A1* | 1/2016 | Jackson ............ H04L 65/403 709/217 |
| 2016/0055134 A1 | 2/2016 | Sathish et al. |
| 2016/0055374 A1 | 2/2016 | Zhang et al. |
| 2016/0063435 A1 | 3/2016 | Shah et al. |
| 2016/0078368 A1 | 3/2016 | Kakhandiki et al. |
| 2016/0088480 A1* | 3/2016 | Chen ............ H04W 12/04 713/171 |
| 2016/0092557 A1 | 3/2016 | Stojanovic et al. |
| 2016/0117308 A1 | 4/2016 | Haider et al. |
| 2016/0170586 A1 | 6/2016 | Gallo |
| 2016/0173122 A1 | 6/2016 | Akitomi et al. |
| 2016/0210572 A1 | 7/2016 | Shaaban et al. |
| 2016/0224532 A1 | 8/2016 | Miller et al. |
| 2016/0231915 A1 | 8/2016 | Nhan et al. |
| 2016/0232489 A1 | 8/2016 | Skaaksrud |
| 2016/0246490 A1 | 8/2016 | Cabral |
| 2016/0253982 A1 | 9/2016 | Cheung et al. |
| 2016/0259856 A1 | 9/2016 | Ananthapur et al. |
| 2016/0275150 A1 | 9/2016 | Bournonnais et al. |
| 2016/0299655 A1 | 10/2016 | Migos et al. |
| 2016/0321235 A1 | 11/2016 | He et al. |
| 2016/0321604 A1 | 11/2016 | Imaeda et al. |
| 2016/0335302 A1 | 11/2016 | Teodorescu et al. |
| 2016/0335303 A1 | 11/2016 | Madhalam et al. |
| 2016/0335731 A1 | 11/2016 | Hall |
| 2016/0335903 A1 | 11/2016 | Mendoza |
| 2016/0344828 A1 | 11/2016 | Häusler et al. |
| 2016/0350950 A1 | 12/2016 | Ritchie et al. |
| 2016/0381099 A1 | 12/2016 | Keslin et al. |
| 2017/0017779 A1 | 1/2017 | Huang et al. |
| 2017/0031967 A1 | 2/2017 | Chavan et al. |
| 2017/0041296 A1 | 2/2017 | Ford et al. |
| 2017/0052937 A1 | 2/2017 | Sirven et al. |
| 2017/0061342 A1 | 3/2017 | LoRe et al. |
| 2017/0061360 A1 | 3/2017 | Rucker et al. |
| 2017/0061820 A1 | 3/2017 | Firoozbakhsh |
| 2017/0063722 A1 | 3/2017 | Cropper et al. |
| 2017/0075557 A1 | 3/2017 | Noble et al. |
| 2017/0076101 A1 | 3/2017 | Kochhar et al. |
| 2017/0090734 A1 | 3/2017 | Fitzpatrick |
| 2017/0090736 A1 | 3/2017 | King et al. |
| 2017/0091337 A1 | 3/2017 | Patterson |
| 2017/0093876 A1 | 3/2017 | Feng et al. |
| 2017/0109499 A1 | 4/2017 | Doshi et al. |
| 2017/0111327 A1 | 4/2017 | Wu |
| 2017/0116552 A1 | 4/2017 | Deodhar et al. |
| 2017/0124042 A1 | 5/2017 | Campbell et al. |
| 2017/0124048 A1 | 5/2017 | Campbell et al. |
| 2017/0124055 A1 | 5/2017 | Radakovitz et al. |
| 2017/0124740 A1 | 5/2017 | Campbell et al. |
| 2017/0126772 A1 | 5/2017 | Campbell et al. |
| 2017/0132296 A1 | 5/2017 | Ding |
| 2017/0132652 A1 | 5/2017 | Kedzlie et al. |
| 2017/0139874 A1 | 5/2017 | Chin |
| 2017/0139884 A1 | 5/2017 | Bendig et al. |
| 2017/0139891 A1 | 5/2017 | Ah-Soon et al. |
| 2017/0140047 A1 | 5/2017 | Bendig et al. |
| 2017/0140219 A1 | 5/2017 | King et al. |
| 2017/0153771 A1 | 6/2017 | Chu |
| 2017/0161246 A1 | 6/2017 | Klima |
| 2017/0177888 A1 | 6/2017 | Arora et al. |
| 2017/0185668 A1 | 6/2017 | Convertino et al. |
| 2017/0200122 A1 | 7/2017 | Edson et al. |
| 2017/0206366 A1 | 7/2017 | Fay et al. |
| 2017/0220813 A1 | 8/2017 | Mullins et al. |
| 2017/0221072 A1 | 8/2017 | AthuluruTlrumala et al. |
| 2017/0228445 A1 | 8/2017 | Chiu et al. |
| 2017/0228460 A1 | 8/2017 | Amel et al. |
| 2017/0236081 A1 | 8/2017 | Grady Smith et al. |
| 2017/0242921 A1 | 8/2017 | Rota |
| 2017/0262786 A1 | 9/2017 | Khasis |
| 2017/0270970 A1 | 9/2017 | Ho et al. |
| 2017/0272316 A1 | 9/2017 | Johnson et al. |
| 2017/0272331 A1 | 9/2017 | Lissack |
| 2017/0277669 A1 | 9/2017 | Sekharan |
| 2017/0285879 A1 | 10/2017 | Pilkington et al. |
| 2017/0285890 A1 | 10/2017 | Dolman |
| 2017/0315683 A1 | 11/2017 | Boucher et al. |
| 2017/0315974 A1 | 11/2017 | Kong et al. |
| 2017/0315979 A1 | 11/2017 | Boucher et al. |
| 2017/0324692 A1* | 11/2017 | Zhou ............ H04L 51/16 |
| 2017/0351252 A1 | 12/2017 | Kleifges et al. |
| 2017/0372442 A1 | 12/2017 | Mejias |
| 2018/0011827 A1 | 1/2018 | Avery et al. |

(56) References Cited

U.S. PATENT DOCUMENTS

| | | |
|---|---|---|
| 2018/0025084 A1 | 1/2018 | Conlan et al. |
| 2018/0026954 A1 | 1/2018 | Toepke et al. |
| 2018/0032492 A1 | 2/2018 | Altshuller et al. |
| 2018/0032570 A1 | 2/2018 | Miller et al. |
| 2018/0055434 A1 | 3/2018 | Cheung et al. |
| 2018/0075104 A1 | 3/2018 | Oberbreckling et al. |
| 2018/0075115 A1 | 3/2018 | Murray et al. |
| 2018/0075413 A1 | 3/2018 | Culver et al. |
| 2018/0075560 A1 | 3/2018 | Thukral et al. |
| 2018/0081863 A1 | 3/2018 | Bathla |
| 2018/0081868 A1 | 3/2018 | Willcock et al. |
| 2018/0088753 A1 | 3/2018 | Viégas et al. |
| 2018/0088989 A1 | 3/2018 | Nield et al. |
| 2018/0089299 A1 | 3/2018 | Collins et al. |
| 2018/0095938 A1 | 4/2018 | Monte |
| 2018/0096417 A1 | 4/2018 | Cook et al. |
| 2018/0109760 A1 | 4/2018 | Metter et al. |
| 2018/0121994 A1 | 5/2018 | Matsunaga et al. |
| 2018/0128636 A1 | 5/2018 | Zhou |
| 2018/0129651 A1 | 5/2018 | Latvala et al. |
| 2018/0157455 A1 | 6/2018 | Troy et al. |
| 2018/0157467 A1 | 6/2018 | Stachura |
| 2018/0157468 A1 | 6/2018 | Stachura |
| 2018/0157633 A1 | 6/2018 | He et al. |
| 2018/0173715 A1 | 6/2018 | Dunne |
| 2018/0181650 A1 | 6/2018 | Komatsuda et al. |
| 2018/0181716 A1 | 6/2018 | Mander et al. |
| 2018/0210936 A1 | 7/2018 | Reynolds et al. |
| 2018/0225270 A1 | 8/2018 | Bhide et al. |
| 2018/0260371 A1 | 9/2018 | Theodore et al. |
| 2018/0276417 A1 | 9/2018 | Cerezo |
| 2018/0293217 A1 | 10/2018 | Callaghan |
| 2018/0293669 A1 | 10/2018 | Jackson et al. |
| 2018/0329930 A1 | 11/2018 | Eberlein et al. |
| 2018/0330320 A1 | 11/2018 | Kohli |
| 2018/0357305 A1 | 12/2018 | Kinast et al. |
| 2018/0365429 A1 | 12/2018 | Segal |
| 2018/0367484 A1* | 12/2018 | Rodriguez ............ H04L 67/36 |
| 2018/0373434 A1 | 12/2018 | Switzer et al. |
| 2018/0373757 A1 | 12/2018 | Schukovets et al. |
| 2019/0005094 A1 | 1/2019 | Yi |
| 2019/0012342 A1 | 1/2019 | Cohn |
| 2019/0036989 A1* | 1/2019 | Eirinberg ............... H04L 51/18 |
| 2019/0042628 A1 | 2/2019 | Rajpara |
| 2019/0050445 A1 | 2/2019 | Griffith et al. |
| 2019/0050812 A1 | 2/2019 | Boileau |
| 2019/0056856 A1 | 2/2019 | Simmons et al. |
| 2019/0065545 A1 | 2/2019 | Hazel et al. |
| 2019/0068703 A1 | 2/2019 | Vora et al. |
| 2019/0073350 A1 | 3/2019 | Shiotani |
| 2019/0095413 A1 | 3/2019 | Davis et al. |
| 2019/0108046 A1 | 4/2019 | Spencer-Harper et al. |
| 2019/0113935 A1 | 4/2019 | Kuo et al. |
| 2019/0114308 A1 | 4/2019 | Hancock |
| 2019/0123924 A1 | 4/2019 | Embiricos et al. |
| 2019/0130611 A1 | 5/2019 | Black et al. |
| 2019/0138583 A1 | 5/2019 | Silk et al. |
| 2019/0138588 A1 | 5/2019 | Silk et al. |
| 2019/0138653 A1 | 5/2019 | Roller et al. |
| 2019/0155821 A1 | 5/2019 | Dirisala |
| 2019/0179501 A1 | 6/2019 | Seeley et al. |
| 2019/0208058 A1 | 7/2019 | Dvorkin et al. |
| 2019/0236188 A1 | 8/2019 | McKenna |
| 2019/0243879 A1 | 8/2019 | Harley et al. |
| 2019/0251884 A1 | 8/2019 | Burns et al. |
| 2019/0258461 A1 | 8/2019 | Li et al. |
| 2019/0258706 A1 | 8/2019 | Li et al. |
| 2019/0286839 A1 | 9/2019 | Mutha et al. |
| 2019/0306009 A1 | 10/2019 | Makovsky et al. |
| 2019/0324840 A1 | 10/2019 | Malamut et al. |
| 2019/0325012 A1 | 10/2019 | Delaney et al. |
| 2019/0347077 A1 | 11/2019 | Huebra |
| 2019/0361879 A1 | 11/2019 | Rogynskyy et al. |
| 2019/0361971 A1 | 11/2019 | Zenger et al. |
| 2019/0364009 A1 | 11/2019 | Joseph et al. |
| 2019/0371442 A1 | 12/2019 | Schoenberg |
| 2019/0391707 A1 | 12/2019 | Ristow et al. |
| 2020/0005248 A1 | 1/2020 | Gerzi et al. |
| 2020/0005295 A1 | 1/2020 | Murphy |
| 2020/0012629 A1 | 1/2020 | Lereya et al. |
| 2020/0019548 A1 | 1/2020 | Agnew et al. |
| 2020/0019595 A1 | 1/2020 | Azua |
| 2020/0026397 A1 | 1/2020 | Wohlstadter et al. |
| 2020/0042648 A1 | 2/2020 | Rao |
| 2020/0050696 A1 | 2/2020 | Mowatt et al. |
| 2020/0053176 A1 | 2/2020 | Jimenez et al. |
| 2020/0125574 A1 | 4/2020 | Ghoshal et al. |
| 2020/0134002 A1 | 4/2020 | Tung et al. |
| 2020/0142546 A1 | 5/2020 | Breedvelt-Schouten et al. |
| 2020/0151630 A1 | 5/2020 | Shakhnovich |
| 2020/0159558 A1 | 5/2020 | Bak et al. |
| 2020/0175094 A1 | 6/2020 | Palmer |
| 2020/0192785 A1 | 6/2020 | Chen |
| 2020/0247661 A1 | 8/2020 | Rao et al. |
| 2020/0265112 A1 | 8/2020 | Fox et al. |
| 2020/0279315 A1 | 9/2020 | Manggala |
| 2020/0293616 A1 | 9/2020 | Nelson et al. |
| 2020/0301678 A1 | 9/2020 | Burman et al. |
| 2020/0301902 A1 | 9/2020 | Maloy et al. |
| 2020/0327244 A1 | 10/2020 | Blass et al. |
| 2020/0334019 A1 | 10/2020 | Bosworth et al. |
| 2020/0348809 A1 | 11/2020 | Drescher |
| 2020/0349320 A1 | 11/2020 | Owens |
| 2020/0356740 A1 | 11/2020 | Principato |
| 2020/0356873 A1 | 11/2020 | Nawrocke et al. |
| 2020/0380212 A1 | 12/2020 | Butler et al. |
| 2020/0380449 A1 | 12/2020 | Choi |
| 2020/0387664 A1 | 12/2020 | Kusumura et al. |
| 2020/0401581 A1 | 12/2020 | Eubank et al. |
| 2021/0019287 A1 | 1/2021 | Prasad et al. |
| 2021/0021603 A1 | 1/2021 | Gibbons |
| 2021/0034058 A1 | 2/2021 | Subramanian et al. |
| 2021/0042796 A1 | 2/2021 | Khoury et al. |
| 2021/0049555 A1 | 2/2021 | Shor |
| 2021/0055955 A1 | 2/2021 | Yankelevich et al. |
| 2021/0056509 A1 | 2/2021 | Lindy |
| 2021/0072883 A1 | 3/2021 | Migunova et al. |
| 2021/0073526 A1 | 3/2021 | Zeng et al. |
| 2021/0084120 A1 | 3/2021 | Fisher et al. |
| 2021/0124749 A1 | 4/2021 | Suzuki et al. |
| 2021/0124872 A1 | 4/2021 | Lereya |
| 2021/0136027 A1 | 5/2021 | Barbitta et al. |
| 2021/0149553 A1 | 5/2021 | Lereya et al. |
| 2021/0150489 A1 | 5/2021 | Haramati et al. |
| 2021/0165782 A1 | 6/2021 | Deshpande et al. |
| 2021/0166196 A1 | 6/2021 | Lereya et al. |
| 2021/0166339 A1 | 6/2021 | Mann et al. |
| 2021/0173682 A1 | 6/2021 | Chakraborti et al. |
| 2021/0174006 A1 | 6/2021 | Stokes |
| 2021/0192126 A1 | 6/2021 | Gehrmann et al. |
| 2021/0264220 A1 | 8/2021 | Wei et al. |
| 2021/0326519 A1 | 10/2021 | Lin et al. |
| 2022/0221591 A1 | 7/2022 | Smith et al. |

FOREIGN PATENT DOCUMENTS

| | | |
|---|---|---|
| CN | 107123424 | 9/2017 |
| CN | 107422666 A | 12/2017 |
| CN | 107623596 A | 1/2018 |
| CN | 107885656 A | 4/2018 |
| CN | 112929172 A | 6/2021 |
| EP | 3 443 466 B1 | 12/2021 |
| KR | 20150100760 | 9/2015 |
| WO | WO 2004/100015 A2 | 11/2004 |
| WO | WO 2006/116580 A2 | 11/2006 |
| WO | 2008109541 A1 | 9/2008 |
| WO | WO 2017202159 A1 | 11/2017 |
| WO | WO 2020/187408 A1 | 9/2020 |
| WO | WO 2021096944 A1 | 5/2021 |
| WO | WO 2021144656 A1 | 7/2021 |
| WO | WO 2021161104 A1 | 8/2021 |
| WO | WO 2021220058 A1 | 11/2021 |

(56) References Cited

FOREIGN PATENT DOCUMENTS

OTHER PUBLICATIONS

Gutwin, C., Greenberg, S., Blum, R., Dyck, J., Tee, K., & McEwan, G. (2008). Supporting Informal Collaboration in Shared-Workspace Groupware. J. Univers. Comput. Sci., 14(9), 1411-1434. (Year: 2008).*
B. Ionescu, C. Gadea, B. Solomon, M. Trifan, D. Ionescu and V. Stoicu-Tivadar, "A chat-centric collaborative environment for web-based real-time collaboration," 2015 IEEE 10th Jubilee International Symposium on Applied Computational Intelligence and Informatics, Timisoara, Romania, 2015, pp. 105-110 (Year: 2015).*
Susanne Hupfer, Li-Te Cheng, Steven Ross, and John Patterson. 2004. Introducing collaboration into an application development environment. In Proceedings of the 2004 ACM conference on Computer supported cooperative work (CSCW '04). Association for Computing Machinery, New York, NY, USA, 21-24 (Year: 2004).*
D'Alessio et al., Monday.com Walkthrough 2018\All Features, Platforms & Thoughts, (https://www.youtube.com/watch?v=ajBtOzTlhC8&t=362s), Mar. 1, 2018, Screenshots and transcript pp. 1-55, (Year: 2018).
Rodrigo et al., Project Management with Monday.com: a 101 Introduction; Jul. 22, 2019, pp. 1-21, 2019.
International Search Report and Written Opinion of the International Searching Authority in PCT/IB2020/000658, dated Nov. 11, 2020 (12 pages).
International Search Report in PCT/IB2020/000974, dated May 3, 2021 (19 pages).
International Search Report in PCT/1B2021/000090 dated Jul. 27, 2021.
ShowMyPC, "Switch Presenter While Using ShowMyPC"; web archive.org; Aug. 20, 2016.
International Search Report and Written Opinion of the International Search Authority in PCT/1B2020/000024, dated May 3, 2021 (13 pages).
"Pivot table—Wikipedia"; URL: https://en.wikepedia .org/w/index. php?title=Pivot_table&oldid=857163289, originally retrieve on Oct. 23, 2019; retrieved on Jul. 16, 2021.
Vishal Singh, "A Theoretical Framework of a BIM-based Multi-Disciplinary Collaboration Platform", Nov. 5, 2010, Automation in Construction, 20 (2011), pp. 134-144 (Year: 2011).
Edward A. Stohr, Workflow Automation: Overview and Research Issues, 2001, Information Systems Frontiers 3:3, pp. 281-296 (Year: 2001).
U.S. Appl. No. 17/243,737, filed Apr. 29, 2021.
U.S. Appl. No. 17/243,803, filed Apr. 29, 2021.
International Search Report and Written Opinion of the International Search Authority in PCT/1B2021/000297, dated Oct. 12, 2021 (20 pages).
Dapulse.com "features".extracted from web.archive.or/web/2014091818421/https://dapulse.com/features; Sep. 2014 (Year: 2014).
Stephen Larson et al., Introducing Data Mining Concepts Using Microsoft Excel's Table Analysis Tools, Oct. 2015, [Retrieved on Nov. 19, 2021], Retrieved from the internet: <URL: https://dl.acm.org/doi/pdf/10.5555/2831373.2831394> 3 Pages (127-129) (Year: 2015).
Isaiah Pinchas et al., Lexical Analysis Tool, May 2004, [Retrieved on Nov. 19, 2021], Retrieved from the internet: <URL: https://dl.acm.org/doi/pdf/10.1145/997140.997147> 9 Pages (66-74) (Year: 2004).
Sajjad Bahrebar et al., "A Novel Type-2 Fuzzy Logic for Improved Risk Analysis of Proton Exchange Membrane Fuel Cells in Marine Power Systems Application", *Energies*, 11, 721, pp. 1-16, Mar. 22, 2018.
U.S. Appl. No. 16/502,679, filed Jul. 3, 2021.
Pedersen et al., "Tivoli: an electronic whiteboard for informal workgroup meetings", Conference on Human Factors in Computing Systems: Proceedings of the INTERACT '93 and CHI '93 conference on Human factors in computing systems; Apr. 24-29, 1993:391-398. (Year 1993).
Kollmann, Franz, "Realizing Fine-Granular Read and Write Rights on Tree Structured Documents." in The Second International Conference on Availability, Reliability and Security (ARES'07), pp. 517-523. IEEE, 2007. (Year: 2007).
Baarslag, "Negotiation as an Interaction Mechanism for Deciding App Permissions." In Proceedings of the 2016 CHI Conference Extended Abstracts on Human Factors in Computing Systems, pp. 2012-2019. 2016 (Year: 2016).
Peltier, "Clustered and Stacked col. and Bar Charts", Aug. 2011, Peltier Technical Services, Inc., pp. 1-128, (Year: 2011).
U.S. Appl. No. 17/143,897, filed Jan. 7, 2021.
U.S. Appl. No. 17/143,603, filed Jan. 7, 2021.
U.S. Appl. No. 17/143,745, filed Jan. 7, 2021.
U.S. Appl. No. 17/143,482, filed Jan. 7, 2021.
U.S. Appl. No. 17/143,768, filed Jan. 7, 2021.
U.S. Appl. No. 17/143,677, filed Jan. 7, 2021.
U.S. Appl. No. 17/143,653, filed Jan. 7, 2021.
U.S. Appl. No. 17/143,916, filed Jan. 7, 2021.
U.S. Appl. No. 17/143,475, filed Jan. 7, 2021.
U.S. Appl. No. 17/143,865, filed Jan. 7, 2021.
U.S. Appl. No. 17/143,462, filed Jan. 7, 2021.
U.S. Appl. No. 17/143,470, filed Jan. 7, 2021.
U.S. Appl. No. 17/143,905, filed Jan. 7, 2021.
U.S. Appl. No. 17/143,798, filed Jan. 7, 2021.
U.S. Appl. No. 17/143,892, filed Jan. 7, 2021.
U.S. Appl. No. 17/243,716, filed Apr. 29, 2021.
U.S. Appl. No. 17/243,727, filed Apr. 29, 2021.
U.S. Appl. No. 17/232,978, filed Apr. 16, 2021.
U.S. Appl. No. 17/243,809, filed Apr. 29, 2021.
U.S. Appl. No. 17/243,901, filed Apr. 29, 2021.
U.S. Appl. No. 17/232,354, filed Apr. 16, 2021.
U.S. Appl. No. 17/243,898, filed Apr. 29, 2021.
U.S. Appl. No. 17/243,969, filed Apr. 29, 2021.
U.S. Appl. No. 17/243,742, filed Apr. 29, 2021.
U.S. Appl. No. 17/243,752, filed Apr. 29, 2021.
U.S. Appl. No. 17/232,754, filed Apr. 16, 2021.
U.S. Appl. No. 17/232,827, filed Apr. 16, 2021.
U.S. Appl. No. 17/243,763, filed Apr. 29, 2021.
U.S. Appl. No. 17/243,848, filed Apr. 29, 2021.
U.S. Appl. No. 17/243,934, filed Apr. 29, 2021.
U.S. Appl. No. 17/244,121, filed Apr. 29, 2021.
U.S. Appl. No. 17/243,807, filed Apr. 29, 2021.
U.S. Appl. No. 17/244,027, filed Apr. 29, 2021.
U.S. Appl. No. 17/244,157, filed Apr. 29, 2021.
U.S. Appl. No. 17/243,725, filed Apr. 29, 2021.
U.S. Appl. No. 17/243,748, filed Apr. 29, 2021.
U.S. Appl. No. 16/453,065, filed Jun. 26, 2019.
U.S. Appl. No. 17/243,691, filed Apr. 29, 2021.
U.S. Appl. No. 17/243,722, filed Apr. 29, 2021.
U.S. Appl. No. 17/243,892, filed Apr. 29, 2021.
U.S. Appl. No. 17/243,977, filed Apr. 29, 2021.
U.S. Appl. No. 17/243,764, filed Apr. 29, 2021.
U.S. Appl. No. 17/243,837, filed Apr. 29, 2021.
U.S. Appl. No. 17/243,729, filed Apr. 29, 2021.
U.S. Appl. No. 17/243,802, filed Apr. 29, 2021.
U.S. Appl. No. 17/242,452, filed Apr. 28, 2021.
U.S. Appl. No. 17/243,891, filed Apr. 29, 2021.
U.S. Appl. No. 17/243,775, filed Apr. 29, 2021.
U.S. Appl. No. 17/243,731, filed Apr. 29, 2021.
U.S. Appl. No. 17/243,768, filed Apr. 29, 2021.
U.S. Appl. No. 16/502,679, filed Jul. 3, 2019.
U.S. Appl. No. 17/565,652, filed Dec. 30, 2021.
U.S. Appl. No. 17/565,699, filed Dec. 30, 2021.
U.S. Appl. No. 17/565,853, filed Dec. 30, 2021.
U.S. Appl. No. 17/565,880, filed Dec. 30, 2021.
U.S. Appl. No. 17/564,745, filed Dec. 29, 2021.
U.S. Appl. No. 17/565,526, filed Dec. 30, 2021.
U.S. Appl. No. 17/565,614, filed Dec. 30, 2021.
U.S. Appl. No. 17/565,718, filed Dec. 30, 2021.
U.S. Appl. No. 17/565,843, filed Dec. 30, 2021.

(56) References Cited

OTHER PUBLICATIONS

U.S. Appl. No. 17/565,534, filed Dec. 30, 2021.
U.S. Appl. No. 17/565,801, filed Dec. 30, 2021.
U.S. Appl. No. 17/565,821, filed Dec. 30, 2021.
U.S. Appl. No. 17/565,780, filed Dec. 30, 2021.
Beate List, "An Evaluation of Conceptual Business Process Modelling Languages", 2006, SAC'06, April 23-27, pp. 1532-1539 (Year: 2006).
"demonstracion en espanol de Monday.com", published Feb. 20, 2019. https://www.youtube.com/watch?v=z0qydTgof1A (Year: 2019).
Desmedt, Yvo, and Arash Shaghaghi, "Function-Based Access Control (FBAC) From Access Control Matrix to Access Control Tensor." In Proceedings of the 8th ACM CCS International Workshop on Managing Insider Security Threats, pp. 89-92. (2016).
Anupam, V., et al., "Personalizing the Web Using Site Descriptions", Proceedings of the Tenth International Workshop on Database and Expert Systems Applications, ISBN: 0-7695-0281-4, DOI: 10.1109/DEXA.1999.795275, Jan. 1, 1999, pp. 732-738. (Year: 1999).
Gutwin, C. et al., "Supporting Informal Collaboration in Shared-Workspace Groupware", J. Univers. Comput. Sci., 14 (9), 1411-1434 (2008).
Barai, S., et al., "Image Annotation System Using Visual and Textual Features", In: Proceedings of the 16th International Conference on Distributed Multi-media Systems, pp. 289-296 (2010).

\* cited by examiner

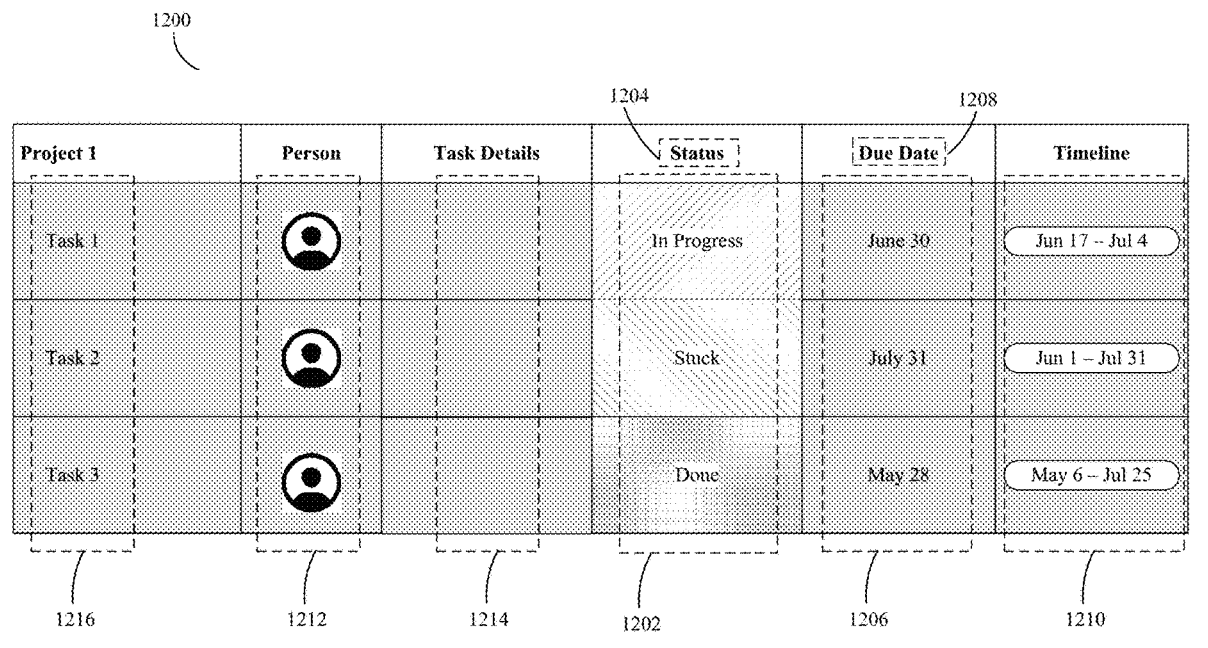

| Project 1 | Person | Task Details | Status | Due Date | Timeline |
|---|---|---|---|---|---|
| Task 1 | 👤 | | In Progress | June 30 | Jun 17 – Jul 4 |
| Task 2 | 👤 | | Stuck | July 31 | Jun 1 – Jul 31 |
| Task 3 | 👤 | | Done | May 28 | May 6 – Jul 25 |

FIG. 12

DIGITAL PROCESSING SYSTEMS AND METHODS FOR ACCESSING ANOTHER'S DISPLAY VIA SOCIAL LAYER INTERACTIONS IN COLLABORATIVE WORK SYSTEMS

CROSS-REFERENCE TO RELATED APPLICATIONS

This application is based on and claims benefit of priority of U.S. Nonprovisional patent application Ser. No. 17/242,452 filed on Apr. 28, 2021, which claims priority to U.S. Provisional Patent Application No. 63/018,593, filed May 1, 2020, U.S. Provisional Patent Application No. 63/019,396, filed May 3, 2020, U.S. Provisional Patent Application No. 63/078,301, filed Sep. 14, 2020, U.S. Provisional Patent Application No. 63/121,803, filed on Dec. 4, 2020, U.S. Provisional Patent Application No. 63/122,439, filed on Dec. 7, 2020, and U.S. Provisional Patent Application No. 63/148,092, filed on Feb. 10, 2021, the contents of all of which are incorporated herein by reference in their entireties.

TECHNICAL FIELD

Embodiments consistent with the present disclosure include systems and methods for collaborative work systems. The disclosed systems and methods may be implemented using a combination of conventional hardware and software as well as specialized hardware and software, such as a machine constructed and/or programmed specifically for performing functions associated with the disclosed method steps. Consistent with other disclosed embodiments, non-transitory computer-readable storage media may store program instructions, which may be executable by at least one processing device and perform any of the steps and/or methods described herein.

BACKGROUND

Operation of modern enterprises can be complicated and time consuming. In many cases, managing the operation of a single project requires integration of several employees, departments, and other resources of the entity. To manage the challenging operation, project management software applications may be used. Such software applications allow a user to organize, plan, and manage resources by providing project-related information in order to optimize the time and resources spent on each project. It would be useful to improve these software applications to increase operation management efficiency.

SUMMARY

Embodiments of the present disclosure may include systems and methods for mutual screen sharing during a text chat, the system including at least one processor configured to: maintain a platform that hosts a plurality of applications accessible to a plurality of client devices; enable the plurality of client devices to access and display via the platform, the plurality of applications, wherein at a particular time, at least a first client device displays a first application and does not display a second application, and at least a second client device displays the second application and does not display the first application; cause a communications interface to appear on the first client device and the second client device, wherein the communications interface on the first client device includes a first link to the second application and the communications interface on the second client device includes a second link to the first application; cause a first display on the first client device of the second application in response to selection on the first client device of the first link; cause a second display on the second client device of the first application in response to selection on the second client device of the second link; and during the first display and the second display, enable communication between the first client device and the second client device.

Embodiments of the present disclosure may include systems, methods and computer readable media that automatically vary hang-time of pop-up messages, to enable presentation of a shared work environment on a plurality of client devices and cause a presentation of a plurality of visual indicators on a fraction of a display of the shared work environment, wherein each visual indicator represents differing clients associated with the plurality of client devices. The embodiments may further enable at least one group chat between the plurality of client devices, wherein communications are presented in pop-up windows appearing adjacent corresponding visual indicators, and wherein the pop-up windows remain on the display for differing durations depending on variables including at least one of length of message, number of concurrently displayed messages, a client defined threshold, or a sender status.

Some disclosed embodiments include systems, computer readable media, and methods for generating a network map reflective of node connection strength are disclosed. The embodiments may include tracking electronic connections between a plurality of entities in an electronic workspace; tracking characteristics of the electronic connections between the plurality of entities in the electronic workspace; storing in memory the tracked connections and the tracked characteristics; calculating connection strength between connected entities based on at least one of the tracked characteristics; rendering a visualization of the plurality of entities; rendering a visualization of the tracked electronic connections between the plurality of entities; and rendering a visualization of at least one of the tracked characteristics of the electronic connections, wherein at least one of the rendered visualization of the tracked electronic connections and the rendered visualization of the at least one of the tracked characteristics is reflective of the calculated connection strength.

BRIEF DESCRIPTION OF THE DRAWINGS

FIG. 12 illustrates an example of a table generated in a collaborative work system, consistent with some embodiments of the present disclosure.

DETAILED DESCRIPTION

Figure 1:
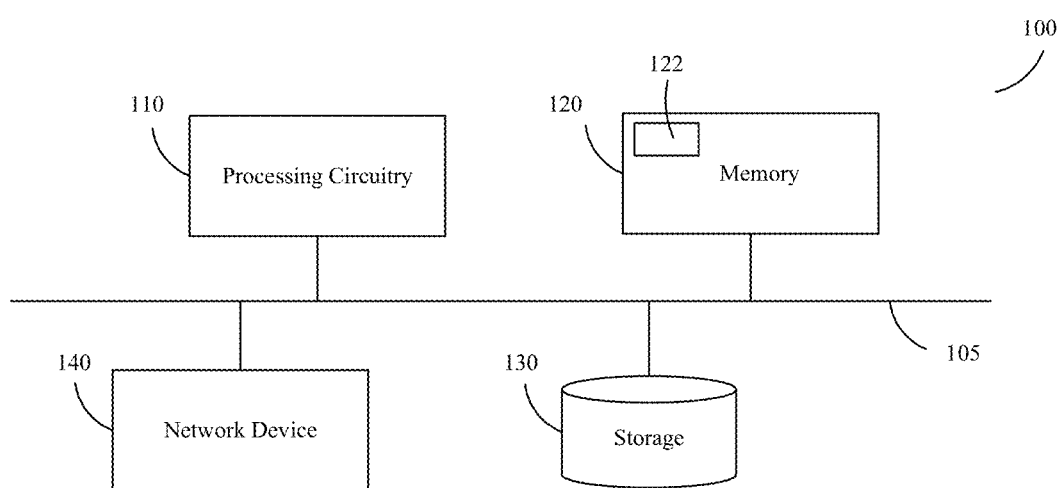
FIG. 1 is a block diagram of an exemplary computing device which may be employed in connection with embodiments of the present disclosure.

Exemplary embodiments are described with reference to the accompanying drawings. The figures are not necessarily drawn to scale. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It should also be noted that as used herein and in the appended claims, the singular forms "a," "an," and "the" include plural references unless the context clearly dictates otherwise.

In the following description, various working examples are provided for illustrative purposes. However, is to be understood the present disclosure may be practiced without one or more of these details.

Throughout, this disclosure mentions "disclosed embodiments," which refer to examples of inventive ideas, concepts, and/or manifestations described herein. Many related and unrelated embodiments are described throughout this disclosure. The fact that some "disclosed embodiments" are described as exhibiting a feature or characteristic does not mean that other disclosed embodiments necessarily share that feature or characteristic.

This disclosure presents various mechanisms for collaborative work systems. Such systems may involve software that enables multiple users to work collaboratively. By way of one example, workflow management software may enable various members of a team to cooperate via a common online platform. It is intended that one or more aspects of any mechanism may be combined with one or more aspect of any other mechanisms, and such combinations are within the scope of this disclosure.

This disclosure is provided for the convenience of the reader to provide a basic understanding of a few exemplary embodiments and does not wholly define the breadth of the disclosure. This disclosure is not an extensive overview of all contemplated embodiments and is intended to neither identify key or critical elements of all embodiments nor to delineate the scope of any or all aspects. Its sole purpose is to present some features of one or more embodiments in a simplified form as a prelude to the more detailed description presented later. For convenience, the term "certain embodiments" or "exemplary embodiment" may be used herein to refer to a single embodiment or multiple embodiments of the disclosure.

Certain embodiments disclosed herein include devices, systems, and methods for collaborative work systems that may allow a user to interact with information in real time. To avoid repetition, the functionality of some embodiments is described herein solely in connection with a processor or at least one processor. It is to be understood that such exemplary descriptions of functionality applies equally to methods and computer readable media and constitutes a written description of systems, methods, and computer readable media. The platform may allow a user to structure the system in many ways with the same building blocks to represent what the user wants to manage and how the user wants to manage it. This may be accomplished through the use of boards. A board may be a table with items (e.g., individual items presented in horizontal rows) defining objects or entities that are managed in the platform (task, project, client, deal, etc.). Unless expressly noted otherwise, the terms "board" and "table" may be considered synonymous for purposes of this disclosure. In some embodiments, a board may contain information beyond which is displayed in a table. Boards may include sub-boards that may have a separate structure from a board. Sub-boards may be tables with sub-items that may be related to the items of a board. Columns intersecting with rows of items may together define cells in which data associated with each item may be maintained. Each column may have a heading or label defining an associated data type. When used herein in combination with a column, a row may be presented horizontally and a column vertically. However, in the broader generic sense as used herein, the term "row" may refer to one or more of a horizontal and a vertical presentation. A table or tablature as used herein, refers to data presented in horizontal and vertical rows, (e.g., horizontal rows and vertical columns) defining cells in which data is presented. Tablature may refer to any structure for presenting data in an organized manner, as previously discussed. such as cells presented in horizontal rows and vertical columns, vertical rows and horizontal columns, a tree data structure, a web chart, or any other structured representation, as explained throughout this disclosure. A cell may refer to a unit of information contained in the tablature defined by the structure of the tablature. For example, a cell may be defined as an intersection between a horizontal row with a vertical column in a tablature having rows and columns. A cell may also be defined as an intersection between a horizontal and a vertical row, or an intersection between a horizontal and a vertical column. As a further example, a cell may be defined as a node on a web chart or a node on a tree data structure. As would be appreciated by a skilled artisan, however, the disclosed embodiments are not limited to any specific structure, but rather may be practiced in conjunction with any desired organizational arrangement. In addition, a tablature may include any suitable information. When used in conjunction with a workflow management application, the tablature may include any information associated with one or more tasks, such as one or more status values, projects, countries, persons, teams, progresses, a combination thereof, or any other information related to a task.

While a table view may be one way to present and manage the data contained on a board, a table's or board's data may be presented in different ways. For example, in some embodiments, dashboards may be utilized to present or summarize data derived from one or more boards. A dashboard may be a non-table form of presenting data, using for example static or dynamic graphical representations. A dashboard may also include multiple non-table forms of presenting data. As discussed later in greater detail, such representations may include various forms of graphs or graphics. In some instances, dashboards (which may also be referred to more generically as "widgets") may include tablature. Software links may interconnect one or more boards with one or more dashboards thereby enabling the dashboards to reflect data presented on the boards. This may allow, for example, data from multiple boards to be displayed and/or managed from a common location. These widgets may provide visualizations that allow a user to update data derived from one or more boards.

Boards (or the data associated with boards) may be stored in a local memory on a user device or may be stored in a local network repository. Boards may also be stored in a remote repository and may be accessed through a network. In some instances, permissions may be set to limit board access to the board's "owner" while in other embodiments a user's board may be accessed by other users through any of the networks described in this disclosure. When one user makes a change in a board, that change may be updated to the board stored in a memory or repository and may be pushed to the other user devices that access that same board. These changes may be made to cells, items, columns, boards, dashboard views, logical rules, or any other data associated with the boards. Similarly, when cells are tied together or are mirrored across multiple boards, a change in one board may cause a cascading change in the tied or mirrored boards or dashboards of the same or other owners.

Various embodiments are described herein with reference to a system, method, device, or computer readable medium. It is intended that the disclosure of one is a disclosure of all. For example, it is to be understood that disclosure of a computer readable medium described herein also constitutes a disclosure of methods implemented by the computer readable medium, and systems and devices for implementing those methods, via for example, at least one processor. It is to be understood that this form of disclosure is for ease of discussion only, and one or more aspects of one embodiment herein may be combined with one or more aspects of other embodiments herein, within the intended scope of this disclosure.

Embodiments described herein may refer to a non-transitory computer readable medium containing instructions that when executed by at least one processor, cause the at least one processor to perform a method. Non-transitory computer readable mediums may be any medium capable of storing data in any memory in a way that may be read by any computing device with a processor to carry out methods or any other instructions stored in the memory. The non-transitory computer readable medium may be implemented as hardware, firmware, software, or any combination thereof. Moreover, the software may preferably be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine may be implemented on a computer platform having hardware such as one or more central processing units ("CPUs"), a memory, and input/output interfaces. The computer platform may also include an operating system and microinstruction code. The various processes and functions described in this disclosure may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium may be any computer readable medium except for a transitory propagating signal.

The memory may include a Random Access Memory (RAM), a Read-Only Memory (ROM), a hard disk, an optical disk, a magnetic medium, a flash memory, other permanent, fixed, volatile or non-volatile memory, or any other mechanism capable of storing instructions. The memory may include one or more separate storage devices collocated or disbursed, capable of storing data structures, instructions, or any other data. The memory may further include a memory portion containing instructions for the processor to execute. The memory may also be used as a working scratch pad for the processors or as a temporary storage.

Some embodiments may involve at least one processor. A processor may be any physical device or group of devices having electric circuitry that performs a logic operation on input or inputs. For example, the at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory.

In some embodiments, the at least one processor may include more than one processor. Each processor may have a similar construction, or the processors may be of differing constructions that are electrically connected or disconnected from each other. For example, the processors may be separate circuits or integrated in a single circuit. When more than one processor is used, the processors may be configured to operate independently or collaboratively. The processors may be coupled electrically, magnetically, optically, acoustically, mechanically or by other means that permit them to interact.

Consistent with the present disclosure, disclosed embodiments may involve a network. A network may constitute any type of physical or wireless computer networking arrangement used to exchange data. For example, a network may be the Internet, a private data network, a virtual private network using a public network, a Wi-Fi network, a LAN or WAN network, and/or other suitable connections that may enable information exchange among various components of the system. In some embodiments, a network may include one or more physical links used to exchange data, such as Ethernet, coaxial cables, twisted pair cables, fiber optics, or any other suitable physical medium for exchanging data. A network may also include a public switched telephone network ("PSTN") and/or a wireless cellular network. A network may be a secured network or unsecured network. In other embodiments, one or more components of the system may communicate directly through a dedicated communication network. Direct communications may use any suitable technologies, including, for example, BLUETOOTH™, BLUETOOTH LE™ (BLE), Wi-Fi, near field communications (NFC), or other suitable communication methods that provide a medium for exchanging data and/or information between separate entities.

Certain embodiments disclosed herein may also include a computing device for generating features for work collaborative systems, the computing device may include processing circuitry communicatively connected to a network interface and to a memory, wherein the memory contains instructions that, when executed by the processing circuitry, configure the computing device to receive from a user device associated with a user account instruction to generate a new column of a single data type for a first data structure, wherein the first data structure may be a column oriented data structure, and store, based on the instructions, the new column within the column-oriented data structure repository, wherein the column-oriented data structure repository may be accessible and may be displayed as a display feature to the user and at least a second user account. The computing devices may be devices such as mobile devices, desktops, laptops, tablets, or any other devices capable of processing data. Such computing devices may include a display such as an LED display, augmented reality (AR), virtual reality (VR) display.

Certain embodiments disclosed herein may include a processor configured to perform methods that may include triggering an action in response to an input. The input may be from a user action or from a change of information contained in a user's table, in another table, across multiple tables, across multiple user devices, or from third-party applications. Triggering may be caused manually, such as through a user action, or may be caused automatically, such as through a logical rule, logical combination rule, or logical templates associated with a board. For example, a trigger may include an input of a data item that is recognized by at least one processor that brings about another action.

In some embodiments, the methods including triggering may cause an alteration of data and may also cause an alteration of display of data contained in a board or in memory. An alteration of data may include a recalculation of data, the addition of data, the subtraction of data, or a rearrangement of information. Further, triggering may also cause a communication to be sent to a user, other individuals, or groups of individuals. The communication may be a notification within the system or may be a notification outside of the system through a contact address such as by email, phone call, text message, video conferencing, or any other third-party communication application.

Some embodiments include one or more of automations, logical rules, logical sentence structures and logical (sentence structure) templates. While these terms are described herein in differing contexts, in a broadest sense, in each instance an automation may include a process that responds to a trigger or condition to produce an outcome; a logical rule may underly the automation in order to implement the automation via a set of instructions; a logical sentence structure is one way for a user to define an automation; and a logical template/logical sentence structure template may be a fill-in-the-blank tool used to construct a logical sentence structure. While all automations may have an underlying logical rule, all automations need not implement that rule through a logical sentence structure. Any other manner of defining a process that respond to a trigger or condition to produce an outcome may be used to construct an automation.

Other terms used throughout this disclosure in differing exemplary contexts may generally share the following common definitions.

In some embodiments, machine learning algorithms (also referred to as machine learning models or artificial intelligence in the present disclosure) may be trained using training examples, for example in the cases described below. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recursive neural network algorithms, linear machine learning models, non-linear machine learning models, ensemble algorithms, and so forth. For example, a trained machine learning algorithm may comprise an inference model, such as a predictive model, a classification model, a regression model, a clustering model, a segmentation model, an artificial neural network (such as a deep neural network, a convolutional neural network, a recursive neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters, where the hyper parameters are set manually by a person or automatically by a process external to the machine learning algorithm (such as a hyper parameter search algorithm), and the parameters of the machine learning algorithm are set by the machine learning algorithm according to the training examples. In some implementations, the hyper-parameters are set according to the training examples and the validation examples, and the parameters are set according to the training examples and the selected hyper-parameters.

FIG. 1 is a block diagram of an exemplary computing device 100 for generating a column and/or row oriented data structure repository for data consistent with some embodiments. The computing device 100 may include processing circuitry 110, such as, for example, a central processing unit (CPU). In some embodiments, the processing circuitry 110 may include, or may be a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. The processing circuitry such as processing circuitry 110 may be coupled via a bus 105 to a memory 120.

The memory 120 may further include a memory portion 122 that may contain instructions that when executed by the processing circuitry 110, may perform the method described in more detail herein. The memory 120 may be further used as a working scratch pad for the processing circuitry 110, a temporary storage, and others, as the case may be. The memory 120 may be a volatile memory such as, but not limited to, random access memory (RAM), or non-volatile memory (NVM), such as, but not limited to, flash memory. The processing circuitry 110 may be further connected to a network device 140, such as a network interface card, for providing connectivity between the computing device 100 and a network, such as a network 210, discussed in more detail with respect to FIG. 2 below. The processing circuitry 110 may be further coupled with a storage device 130. The storage device 130 may be used for the purpose of storing single data type column-oriented data structures, data elements associated with the data structures, or any other data structures. While illustrated in FIG. 1 as a single device, it is to be understood that storage device 130 may include multiple devices either collocated or distributed.

The processing circuitry 110 and/or the memory 120 may also include machine-readable media for storing software. "Software" as used herein refers broadly to any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, may cause the processing system to perform the various functions described in further detail herein.

Figure 2:
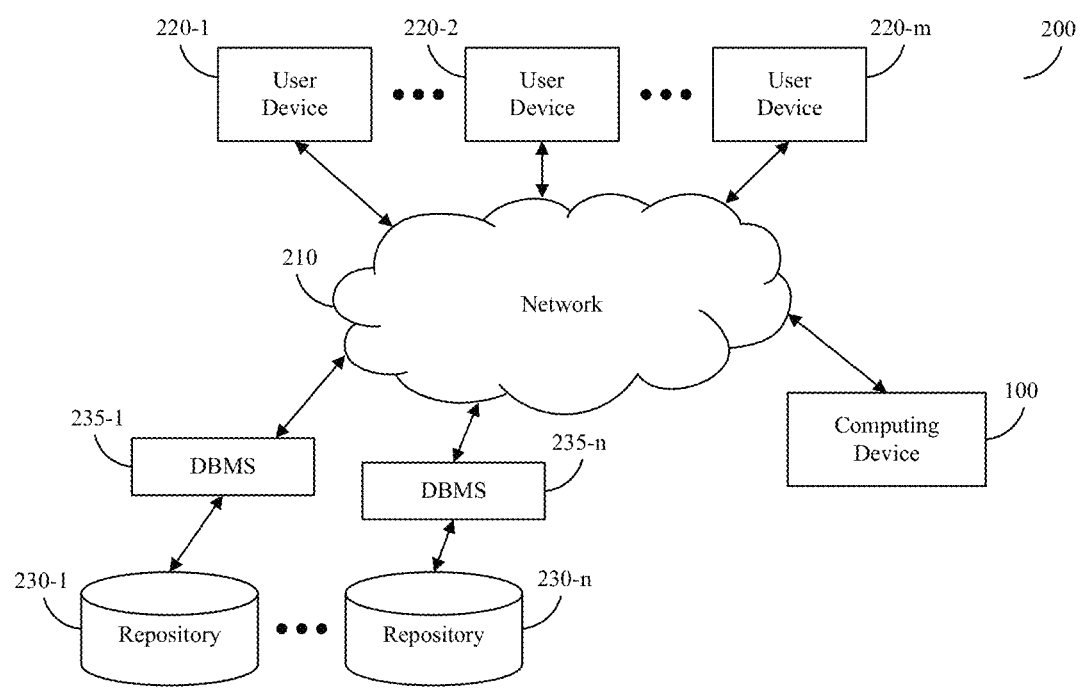
FIG. 2 is a block diagram of an exemplary computing architecture for collaborative work systems, consistent with embodiments of the present disclosure.

FIG. 2 is a block diagram of computing architecture 200 that may be used in connection with various disclosed embodiments. The computing device 100, as described in connection with FIG. 1, may be coupled to network 210. The network 210 may enable communication between different elements that may be communicatively coupled with the computing device 100, as further described below. The network 210 may include the Internet, the world-wide-web (WWW), a local area network (LAN), a wide area network (WAN), a metro area network (MAN), and other networks capable of enabling communication between the elements of the computing architecture 200. In some disclosed embodiments, the computing device 100 may be a server deployed in a cloud computing environment.

One or more user devices 220-1 through user device 220-m, where 'm' in an integer equal to or greater than 1, referred to individually as user device 220 and collectively as user devices 220, may be communicatively coupled with the computing device 100 via the network 210. A user device 220 may be for example, a smart phone, a mobile phone, a laptop, a tablet computer, a wearable computing device, a personal computer (PC), a smart television and the like. A user device 220 may be configured to send to and receive from the computing device 100 data and/or metadata associated with a variety of elements associated with single data type column-oriented data structures, such as columns, rows, cells, schemas, and the like.

One or more data repositories 230-1 through data repository 230-n, where 'n' in an integer equal to or greater than 1, referred to individually as data repository 230 and collectively as data repository 230, may be communicatively coupled with the computing device 100 via the network 210, or embedded within the computing device 100. Each data repository 230 may be communicatively connected to the network 210 through one or more database management services (DBMS) 235-1 through DBMS 235-n. The data repository 230 may be for example, a storage device containing a database, a data warehouse, and the like, that may be used for storing data structures, data items, metadata, or any information, as further described below. In some embodiments, one or more of the repositories may be distributed over several physical storage devices, e.g., in a cloud-based computing environment. Any storage device may be a network accessible storage device, or a component of the computing device 100.

In the course of collaboration between different users, each of whom may be using a different device (e.g., client device), there may exist a technical challenge to configuring the user interfaces being displayed on each of the different device. For example, there may be a technical challenge to enable a user using one device to view what is being display to another user using another device, and vice versa.

Therefore, there is a need for unconventional approaches to enable a user using one device to view what is being display to another user using another device, and vice versa. Various embodiments of the present disclosure describe unconventional systems and methods of mutual screen sharing. Various embodiments of the present disclosure describe enabling a plurality of client devices to access and display via the platform, causing a communications interface to appear on the first client device and the second client device, wherein the communications interface on the first client device includes a first link to the second application and the communications interface on the second client device includes a second link to the first application; causing a first display on the first client device of the second application in response to selection on the first client device of the first link; causing a second display on the second client device of the first application in response to selection on the second client device of the second link; and during the first display and the second display, enabling communication between the first client device and the second client device. Thus, the various embodiments the present disclosure describe at least a technological solution, based on improvement to operations of computer systems and platforms, to the technical challenge of configuring the user interfaces being displayed on each of the different device.

Aspects of this disclosure may relate to systems, methods, and computer readable media for mutual screen sharing during a text chat. For ease of discussion, some examples are described below with reference to systems, methods, devices, and/or computer-readable media, with the understanding that discussions of each apply equally to the others. For example, some aspects of these methods may be implemented by a computing device or software running thereon. The computing device may include at least one processor as previously described (e.g., a CPU, GPU, DSP, FPGA, ASIC, or any circuitry for performing logical operations on input data) to perform the example methods. Other aspects of such methods may be implemented over a network (e.g., a wired network, a wireless network, or both).

As another example, some aspects of such methods may be implemented as operations or program codes in a non-transitory computer-readable medium. The operations or program codes may be executed by at least one processor. Non-transitory computer readable media, as described herein, may be implemented as any combination of hardware, firmware, software, or any medium capable of storing data that is readable by any computing device with a processor for performing methods or operations represented by the stored data. In a broadest sense, the example systems, methods and computer readable media are not limited to particular physical or electronic instrumentalities, but rather may be accomplished using many differing instrumentalities.

Mutual screen sharing may refer to an operation or an ability for viewer of one screen to view contents being displayed on a screen of a different viewer, and vice versa. A screen may be an example of the display interface described previously, and may include devices such as a display screen of computer monitor, TV, mobile device, augmented reality (AR), virtual reality (VR) display, and/or other display technologies. Mutual sharing may include directing the different screens to display the same content. For example, different screens may display identical sets of visual data.

Text chat may refer to a method of communication that may include the use of alphanumeric symbols. For example, two or more individuals may communicate through text symbols inputted into a computer systems (including PCs, MACs, phones, pagers, and other electronic devices) by way of an input device (including keyboards, touch screen, voice-to-text interface, and other suitable text interface), which may be displayed on display interfaces to be viewed by a different individual. Examples of text chat includes text messages, instant messages, direct messages, chat boards, SMS, and other similar format of exchanging information via alphanumeric symbols. Text chat may include alphanumerics in any language of any country (e.g., English, Hebrew, Spanish, Chinese, French, Japanese, Korean) and may also include graphics such as images, videos, emojis, GIFs, or any other graphical representation. Other forms of text chat may include the transmission of a link (e.g., a URL or file path) that may cause a re-rendering of a display to present different information.

Consistent with disclosed embodiments, at least one processor of the system may carry out operations that may involve maintaining a platform that hosts a plurality of applications accessible to a plurality of client devices. A platform may refer to a computer system having hardware such as one or more central processing units ("CPUs"), a memory, and input/output interfaces, and software such as an operating system, application program, instruction codes, or any combination thereof, which may be executed by the CPU or other hardware components. For example, the platform may be a software program, executed by the processor of the computer system, which enables the various functions and operations described in the present disclosure. Maintaining the platform may refer to maintaining the operation of the hardware components and/or software programs of the platform or storing data and/or operations of software programs of the platform in a repository.

Hosting may refer to enabling, storing and/or otherwise supporting processes and functions of hardware and software components of the computer system. The platform may generate a software environment that supports various functions carried by applications. For example, a website or a webpage may be an example of a platform, on which various other applications may carryout functions, such as organization of information via tables and spreadsheets, audio and video playback, animations, and graphics generation, downloading and uploading of data, linking to other software or webpages, posting and viewing of messages, text chat, and any other electronic and digital functions. In some instances, these applications may be accessed by client devices connected to the platform. Client devices may refer to computer systems (including PCs, MACs, phones, pagers, and other electronic devices) associated with parties, entities, or users connected to the platform, but not necessarily part of the platform. A user, for instance, may access the platform (e.g., a webpage) to use one or more of the applications hosted by the platform via a client device.

By way of example in FIG. 2, computing device 100 and DBMS 235-1 through DBMS 235-n may be examples of client device included in a system that may execute computer instructions, maintain or support the platform, and host a plurality of applications.

Consistent with disclosed embodiments, at least one processor of the system may carry out operations that may enable the plurality of client devices to access and display via the platform, the plurality of applications. Accessing may refer to gaining authorization or entry to download, upload, copy, extract, update, edit, or otherwise receive or manipulate data or information. For example, for a client device to gain access to a board, the platform may authorize the client device to view information that may be stored in items of the board. If accessing the board requires authentication or credential information, the processor may confirm authentication information supplied by the client device as needed.

By way of examples, one or more user devices 220-1 through user device 220-m depicted in FIG. 2 may be examples of the plurality of client devices.

In some embodiments, the plurality of applications may include tables. A table refers to any organized manner of displaying information in two dimensions, three dimensions, or more. A plurality of cells formed by horizontal and vertical rows (e.g., rows and columns) may form one example of a two-dimensional table. Tables presented in greater than two dimensions may be simulated on a two-dimensional display or may be presented holographically or through virtual glasses or other virtual displays. The table may be part of a plurality of boards as described previously, which may include tables with items defining objects or entities that are managed in the platform (e.g., task, project, client, deal, or any other indication of an item). Items may be contained in a rows or columns of the boards or may be associated therewith through a link (e.g., a link to another board or sub-board, or to any other data structure) or through metadata. The boards or items of the boards may be associated with a user, and the platform may allow a client device of the user to access and view the boards, or items of the boards.

Figure 3A:
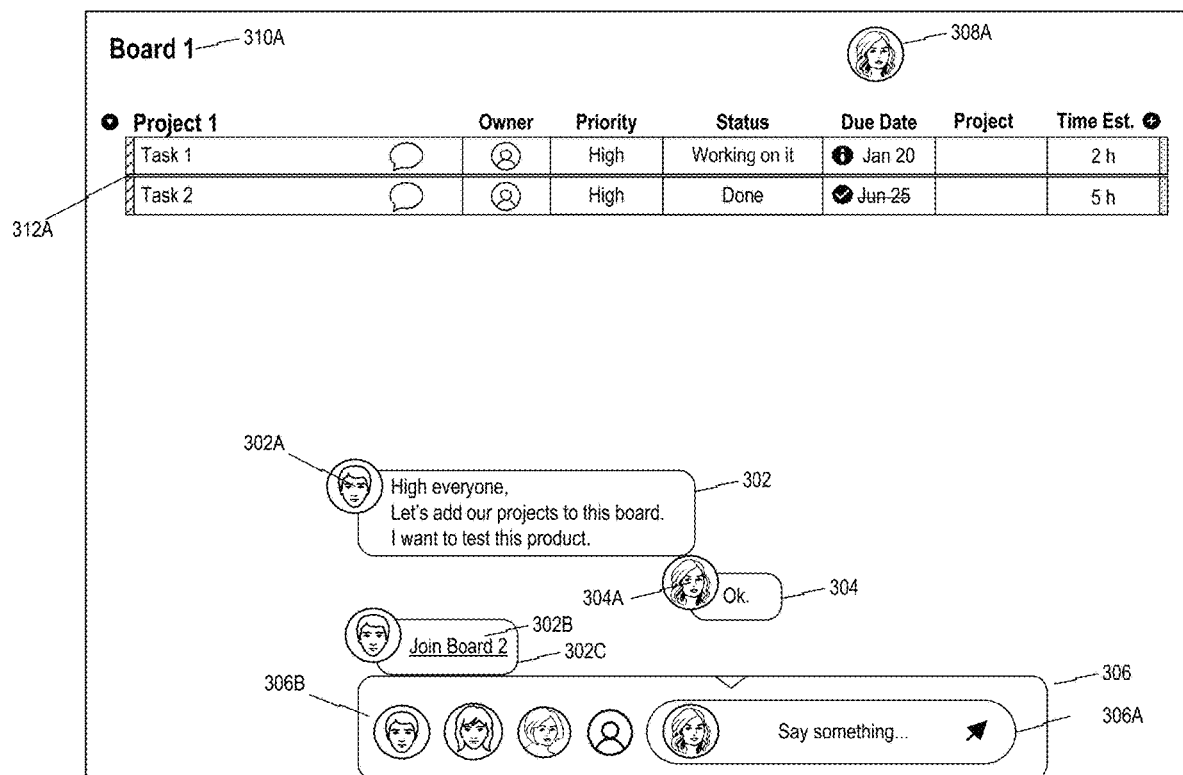
FIG. 3A depicts an exemplary application displayed on a client device, consistent with some embodiments of the present disclosure.

Board 310A depicted in FIG. 3A is one example of a board. Board 310A includes table 312A, which may be an example of an application or a table. Table 312A may include one or more rows and columns. For example, each row represents an item, such as "Task 1" or "Task 2." Similarly, in FIG. 3B, board 310B may be another example of a board, and it may include table 312B.

In some embodiments, a plurality of client devices may be enabled to access and display via the platform when, at a particular time, at least a first client device displays a first application and does not display a second application, and at least a second client device displays the second application and does not display the first application. An application may include any platform that may be used by a user that may store and/or process information and may render information on a display. Exemplary applications may be customized to provide unique workflows according to user-design, such as a cell, a column, a row, a header, a board, a dashboard, a widget, or any combination thereof. A second application may be part of the same system or platform as a first application (e.g., a first application and second applications are different boards of the same system). In other embodiments, the second application may be part of a different system or platform from that of the first application (e.g., the second application is part of a third-party application and is external to the system that hosts the first application). Not displaying an application may include obscuring a view of the application, minimizing a view of the application, not hosting the application, or any other means of not presenting information from the application.

For instance, the system may include a platform for enabling collaboration among several entities. The system may, for example, share information about a task or a project (e.g., due states, current status, priority, collaborators, collaboration notes, or any other information) among the several users. This information may be contained in tables and boards hosted by the platform. When the platform hosts multiple tables or boards, each of which may be associated with a different project, different users accessing the platform may view a different board or table from other users at any given time. For example, a first user may be viewing a first board on the first client device while a second user is viewing a second board, different form the first board, on the second client device.

FIG. 3A illustrates an exemplary display 300A. Display 300A may be an example of what may be displayed (e.g., a first application) on the first client device. Display 300A includes board header 310A and table 312A (e.g., a board), each of which may be an example of the first application displayed on the first client device. In other non-limiting examples, the first application may include multiple tables, dashboards (e.g., summary boards), or any other visualization of information according to any customized workflow consistent with some embodiments of this disclosure. The first client device may be associated with user 308A, who may be an example of a first user. Table 312A includes two rows, each representing an item (e.g., "Task 1" and "Task 2"). Table 312A includes columns, each representing a category of information of an item. For example, column "Owner" may contain information on the user that created the particular item; column "Priority" may contain information regarding level importance of the item; and so on.

Figure 3B:
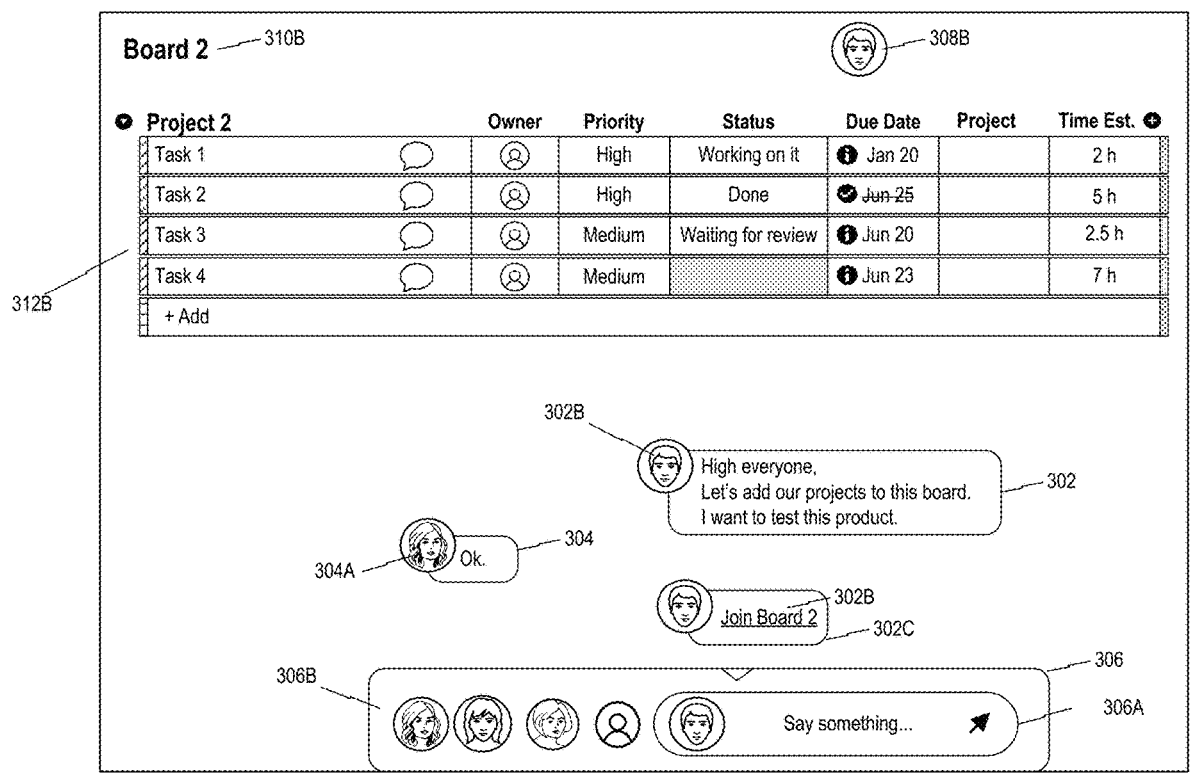
FIG. 3B depicts an exemplary application displayed on a different client device, consistent with some embodiments of present disclosure.

FIG. 3B depicts yet another exemplary display 300B. Display 300B may be an example of what may be displayed on a second client device. Display 300B includes board header 310B and table 312B, each of which may be an example of the second application displayed on the second client device. The second client device may be associated with user 308B, which may be an example of the second user. Any one of user devices 220-1 through user device 220-m depicted in FIG. 2 may an example of the first client device or the second client device. In some embodiments, the second client device may display the second application as shown in FIG. 3B, but the second client device might not display the first application as shown in FIG. 3A. Similarly, the first device may display the first application as shown in FIG. 3A and not display the second application as shown in FIG. 3B.

Consistent with disclosed embodiments, at least one processor of the system may carry out operations that may cause a communications interface to appear on a first client device and a second client device. A communications interface may refer to an interactive element of a web page, a mobile-application, a software interface, or any graphical user interface (GUI) that enables interactions between a user and a machine via the interactive element, for the purpose of enabling communication. Examples of the communication interface may include a chat box, a chat bar, a button, an icon, a pop-up menu, virtual keyboard, or any other GUI capable of receiving user input or generating output to the user.

By way of example, interface 306 depicted in FIG. 3A and FIG. 3B may be an embodiment of a communication interface. As seen in FIG. 3A, interface 306 is a graphical user interface presented in display 300A (and/or 300B). Interface 306 may be rendered as an overlay (e.g., an object on top of) of display 300A (and/or 300B) and may be moved or dragged to a different position of the display as desired. Interface 306 may be configured to receive inputs from a user (such as user 308A) via textbox 306A. Textbox 306A may display the text or graphics (e.g., emojis) as the user types or otherwise provides inputs. In the example depicted, the textbox 306A may include an avatar indicating the identity of the text sender (e.g., user 308A). Interface 306 may also include social bar 306B. Social bar 306B may include one or more avatars representing other users who may be in communication with the text sender. For instance, the social bar 306B indicates other users who may be part of a group that may send and receive text messages from each other. The social bar 306B may provide an indication of specific users who are available, busy, or offline. Depending on the status of the recipient of a message, the communication interface may leave a different type of message. For example, when an available recipient receives a message, the available recipient may receive the message immediately. If the recipient is busy or offline for example, the recipient may receive the message later when the recipient becomes available.

In some embodiments, the communications interface may include a text chat box. A text chat box may refer to any user interface, such as GUIs, that may be configured to receive text input from a user and provide text output to the user. Text messages may be communications (e.g., alphanumeric, graphical, or a combination thereof) sent to or received from one or more different users. The text chat box may enable text messages to be sent or received in real-time or near real-time, as to simulate a conversation between different users.

FIG. 3A and FIG. 3B include illustrated examples of text chat boxes. For example, chat box 302 may display text messages sent by user 308B (an example of the second user associated with the second client device), and text chat box 304 may display text messages sent by user 308A (example of the first user associated with the first client device). Chat boxes 302 and 304 may also include avatars (graphically, alphanumerically, or a combination thereof) depicting the identities of the text message senders. For example, chat box 302 includes avatar 302A of a second user, and chat box 304 includes avatar 304A of a first user. The avatar of the text message sender enables a user to quickly ascertain the source of the text messages. In some embodiments, the chat boxes may appear at a location above social bar 306B, corresponding to the avatar of the user that sent the text message in the chat box. For example, in FIG. 3A, chat box 302 contains a text message sent by second user 308B, leading chat box 302 to appear above the avatar of the second user 308B on social bar 306B. Chat box 304 contains text messages sent by a first user 308A, so it appears above textbox 306A of the first user 308A. This arrangement of chat box locations may also allow users to visually organize the text messages being displayed in an efficient manner.

Similarly, in FIG. 3B, chat box 304, which contains text messages sent by the first user 308A, appears over social bar 306B corresponding to the avatar of the first user 308A. Chat box 302, which contains text sent by the second user 308B, appears over textbox 306A of the second user 308B.

In some embodiments, the communications interface on the first client device includes a first link to the second application and the communications interface on the second client device may include a second link to the first application. A link may include any means of electronically associating or connecting information and may activated to cause one or more functions, applications, programs, or renderings to occur. For example, a link may contain an address to a destination, and/or instructions, that when activated, would cause the loading of information stored at the destination, or execution of the instruction. For instance, a hyperlink or a URL may be examples of the first link, which may cause the first client device to access the second application. In some embodiments, the communications interface on the second client device may include a second link to the first application which may cause the second client device to access the first application. For example, the first user may also send a link (e.g., the first link) to the second user to allow the second user to access a table (e.g., the first application) being accessed by the first user as previously described. In other embodiments, the first link to the second application and the second link to the first application may be associated to establish a two-way connection between the first and second user and cause the first and second applications to display on the first and second client devices.

For example, in FIG. 3A, link 302B include an embodiment of a link, such as the first link to the second application. Link 302B may be included in chat box 302C. By way of a non-limiting example, when a first user 308A using the first client device is in communication with a second user 308B using the second client device, via the platform, each user may be accessing different boards or tables at a given time. In order to collaborate on a common project relating to table 312B (e.g., the second application) currently being accessed by the second user 308B, the second user 308B may send link 302B (e.g., the second link) to the first user 308A through chat box 302C. The first user 308A may now access the table 312B that is currently accessed by the second user 308B, and these two parties may collaborate while accessing table 312B. Link 302B may be a hyperlink containing in a computer executable instruction that may be activated.

Consistent with disclosed embodiments, at least one processor of the system may carry out operations that may cause a first display on the first client device of the second application in response to selection on the first client device of the first link. For example, when the first client device accesses a table (e.g., the second application) embedded in the link (e.g., the second link) received from the second client device, the table may be displayed on the first client device. This may allow the first user to view and work on the same table as the second user who sent the link.

Figure 4:
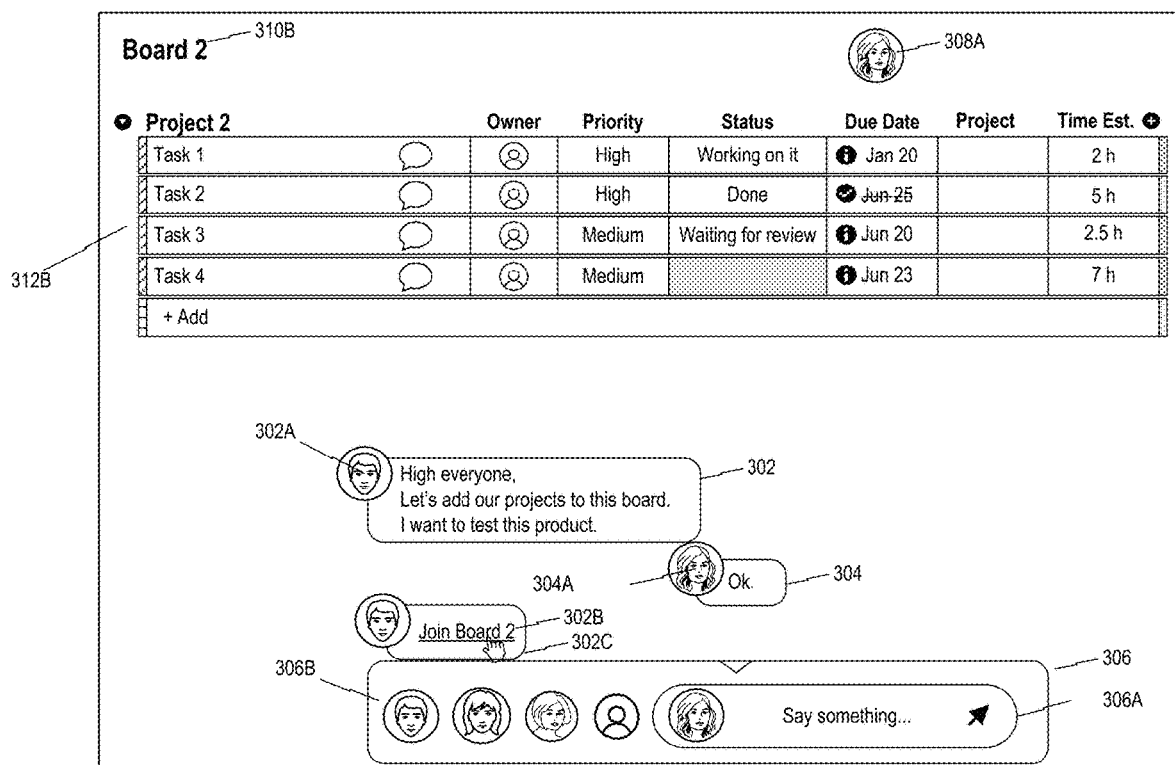
FIG. 4 depicts an exemplary application displayed on a client device after activation of a link in a communication interface, consistent with some embodiments of the present disclosure.

For example, when user 308A activates link 302B (e.g., by clicking or pressing on a touch screen, or any other type of selection), the client device of a first user 308A (e.g., the first client device) may cause the display to change to a different display (e.g., the second application). FIG. 4 may be an example of the display on the client device of the first user 308A (e.g., the first client device) after activation of the link. FIG. 4 depicts display 400, which is being presented on the first client device after activation of link 302B. Whereas the first client device previously presented display 300A prior to activation of link 302B, the first client device presents display 400 after activation of link 302B.

Consistent with disclosed embodiments, at least one processor of the system may carry out operations that may cause a second display on the second client device of the first application in response to selection on the second client device of the second link. When the second client device accesses a table (e.g., the first application) embedded in the link (e.g., the first link) received from the first client device, the table is displayed on the second client device, allowing second user to view and work on the same table as the first user who sent the link. The present disclosure is not limited to the example illustrated in FIG. 3A and FIG. 3B, however. For example, the first user 310A may also send a link configured to cause display 300A to the second device, which upon activation by the second user 308B, might cause the second client device to present display 300A on the second client device.

In some embodiments, the first link and the second link each may include at least one button, activation of which enables screen sharing. A button, for example, may be an interactive graphical element such as an icon, which may be programmed to include the first link or the second link. For example, graphic element in a shape of a button can contain or be associated with a hyperlink to the first application or the second application. Buttons may be graphical, but may also be alphanumerical, textual, or any combination thereof.

Figure 5:
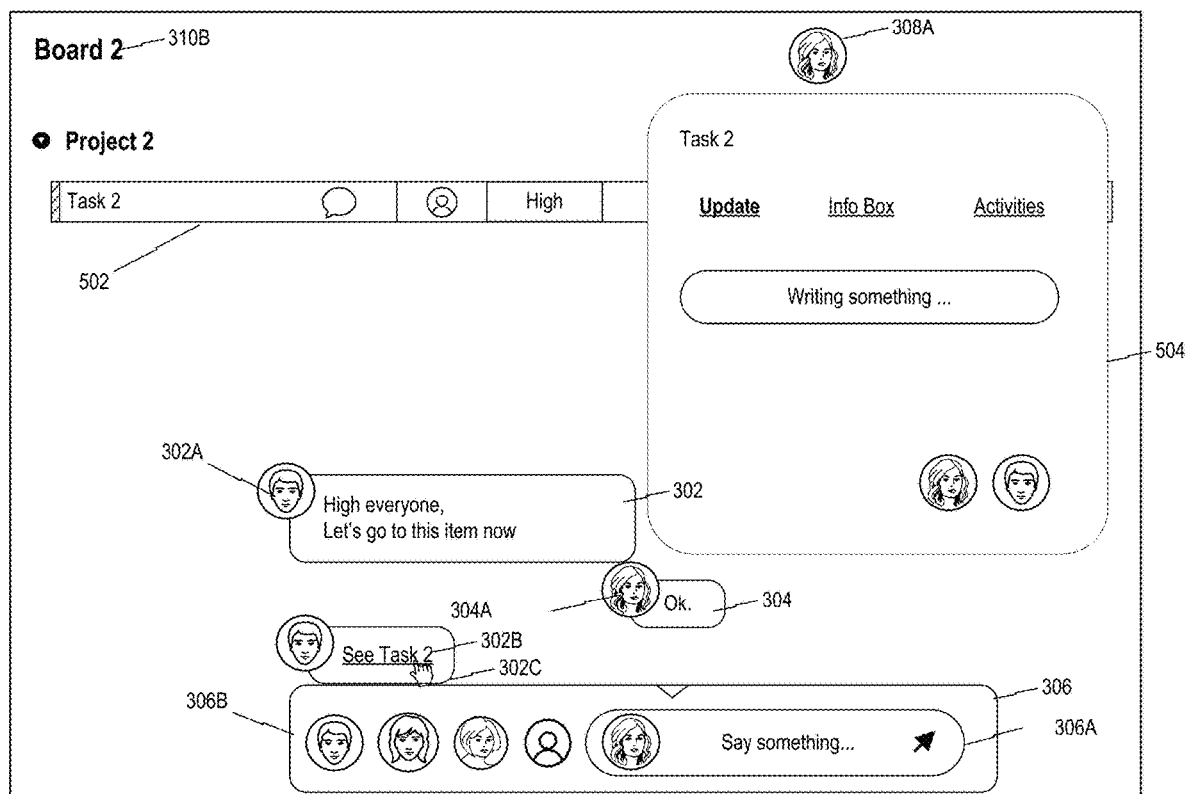
FIG. 5 depicts another exemplary application displayed on a client device after activation of a link in a communication interface, consistent with some embodiments of the present disclosure.

As depicted in FIG. 5, button 302B may be an example of a link being presented in form of a button presented with text that links other users to the board of a first user 302A. In another exemplary embodiment, the button may be graphical and may be associated with an indication of the user, such as avatar 302A, which may be associated with the first user's application.

In some embodiments, the first display on the first client device of the second application includes a link to a particular location within the second application, the particular location corresponding to a current working location on the second client device. A location may refer to a portion of the application being displayed on a display interface. For example, a particular location of table may include a particular row (or rows), column (or columns), or cell (or cells) of a table. Another example of a particular location may include a zoomed in view of a portion of a document (e.g., PDF) or a visualization (e.g., a dashboard). A current working location may refer to the location of the application that is being displayed on a client device, or is being linked to when accessed by a client device. For example, an item of a table of may be an example of a location. When, for example, the second client device provides a link of a specific item on a table, the linked item may be a particular location or the current working location. In some embodiments, when the link is associated with a specific item, the client device may zoom or scale to the specific item, or cause an additional menu or interface to appear on the display of the client device. In some embodiments, the platform may host other types of applications, in addition to or alternatively to boards and tables. For example, the platform may host applications such as word processors, spreadsheet applications, calendars, organizers, or similar types of software applications. A current working location may also refer to a specific location in those software applications, such as a specific line or page in a word processor; a specific row, column, or cell of a spread sheet; and/or a specific date in a calendar.

For example, FIG. 5 may be an example of what may be displayed on the first client device associated with a first user 308A after activation of button 302B. Item 502 may be an example of a location. Item 502 may be "Task 2" of table 312B depicted in FIG. 3B. In some instances, a second user 308B may desire to collaborate on a specific item of a board, and thus may send a link (such as button 302B) that is linked only to that item. Thus, when first user 308A activates the link, the first client device zooms directly to the linked item ("Task 2" in the example). Additionally, in some instances, display 504 may appear in FIG. 5 upon activation of button 302B. Display 504 may be a user interface that allow users (such as first user 308A or second user 308B) to make edits to information of item 502, or to leave additional notes specific to item 502 (e.g., annotations).

In some embodiments, the at least one processor is further configured to store communications between a first client device and a second client device based on the particular location. The communication between the first client device and the second client device may be, for example, a log of text messages. When the text messages are exchanged in context of a specific item, the log of text chats may be stored in a data field associated with the specific item, and later accessible by accessing the specific item. The specific item may be the item being contained in the first link or the second link. Once the communications are stored based on the particular location, a client device may access the communications from the particular location when the client device displays that particular location containing the stored communications. In this way, multiple communications may be stored in multiple locations in an application associated with multiple items, which may then be accessed to display the pertinent communications to each of the correlating items.

Figure 6:
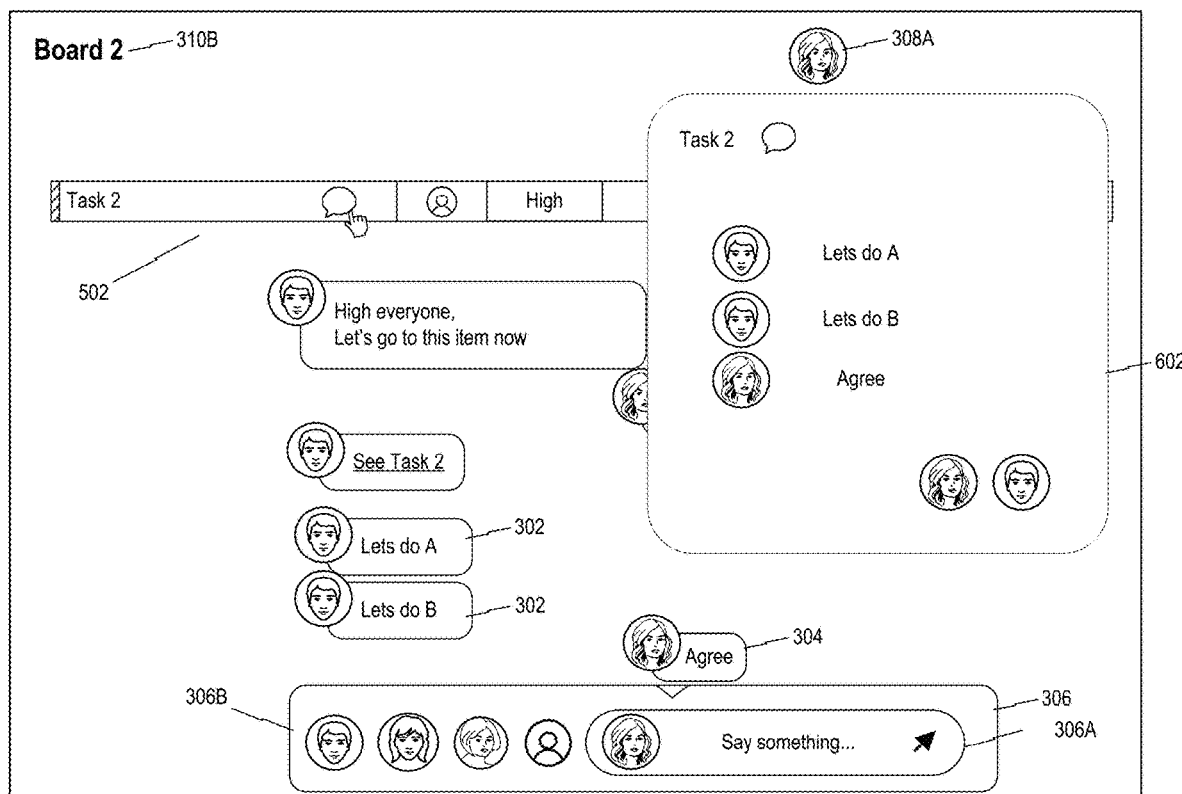
FIG. 6 depicts another exemplary application displayed on a client device including stored chat log, consistent with some embodiments of the present disclosure.

For example, FIG. 6 depicts an example of content displayed on the client device (e.g., the first client device), after activation of button 302. The text messages being sent back and forth between a first user 308A and a second user 308B may be stored in a particular location on board 310B for later viewing. In some cases, the text messages may be stored and linked to a specific item, such as item 502. For example, text messages in chat boxes 302 and 304 may be related to item 502, so it may be convenient to store the record of this conversation in a location linked to item 502. By way of example, the text message between users 308A or 308B can be retrieved and displayed in display 602. In some cases, the text messages may be accompanied by the avatar of the sender, or accompanied by a time stamp of the time of sending.

Consistent with disclosed embodiments, at least one processor of the system may carry out operations that may, during a first display and a second display, enable communication between a first client device and a second client device. For instance, even while the display interfaces on the first client device or the second client device switch views when the links to a different application are activated, the chat function, and the associated interfaces may be maintained. This may allow the on-going conversation between the first and second users to continue without interruption. The first user and the second user may switch between boards that they are currently viewing and may simultaneously interact with each other through text messages that remain active. Further, the first user and the second user may simultaneously view both applications (e.g., both boards) while simultaneously interacting with each other. This ability may allow the users to be in the "same place together," (e.g., a virtual location) even if they are viewing or working on different items or boards. The constant availability of the communication interface removes the need for the users to frequently switch between collaboration tools (such as the boards) and communication tools.

For example, as seen in FIG. 3A and FIG. 3B, both the first client device and the second client device present the text messages exchanged between the users. Moreover, as seen in FIG. 4, the first client device continues to present the text messages exchanged (e.g., chat boxes 302 and 304 remain visible and active). In FIG. 3A, FIG. 3B, and FIG. 4, interface 306 remains enabled to send and receive text messages in both the first and second client devices.

In some embodiments, the at least one processor is further configured to receive a response to a notification and to cause a communications interface to appear on a first client device and a second client device upon receipt of the response to the notification. A notification may refer to an alert or an announcement of an event or an occurrence. A notification may include any communication or command generated in response to an event or an occurrence within the system or from an external source. In one example, a notification may be generated by the system when a user sends a message (such as a text chat) to a different party. In another example, a notification may be generated by the system based on a time (such as a preset alarm for a given time), a system status (such as when system is starting up, shutting off, or encountering an error), a condition being met or failed (such as a status change, meeting a deadline, a user being assigned or removed), or some other event or occurrence of the system.

By way of example, the communications interface may appear on the first and/or second client devices when these devices receive a text message from another user. Additionally, or alternatively, the communications interface may appear when the first and/or second client devices are in communication with the platform or are accessing a board, table, or an item. Additionally, or alternatively, the communications interface may appear automatically at a fixed time, such as at the beginning of business hours. Additionally, or alternatively, the communications interface may appear when a status or information contained in a table or an item associated with a user is updated. Additionally, or alternatively, the communications interface may appear when a user selects an interactive element of a table or an item.

In some embodiments, the at least one processor is further configured to cause a communications interface to appear on a third client device and to enable access to the second application on the third client device via the first link. The present disclosure is not limited to access between two client devices. Multiple users, each using a client device, may communicate using the communications interface on the platform. One user may send links to more than one other user, all of whom may access the table or application being linked through their respective client devices.

For example in FIG. 4 or FIG. 5, social bar 306B is shown to include avatars representing additional users. Any of these additional users may join the text message conversation (e.g., may be added to the conversation by users in an established chat), and may also access link 302B or button 302B, which will cause their respective client device to display a particular location of an application as shown in FIG. 4 or FIG. 5.

Figure 7:
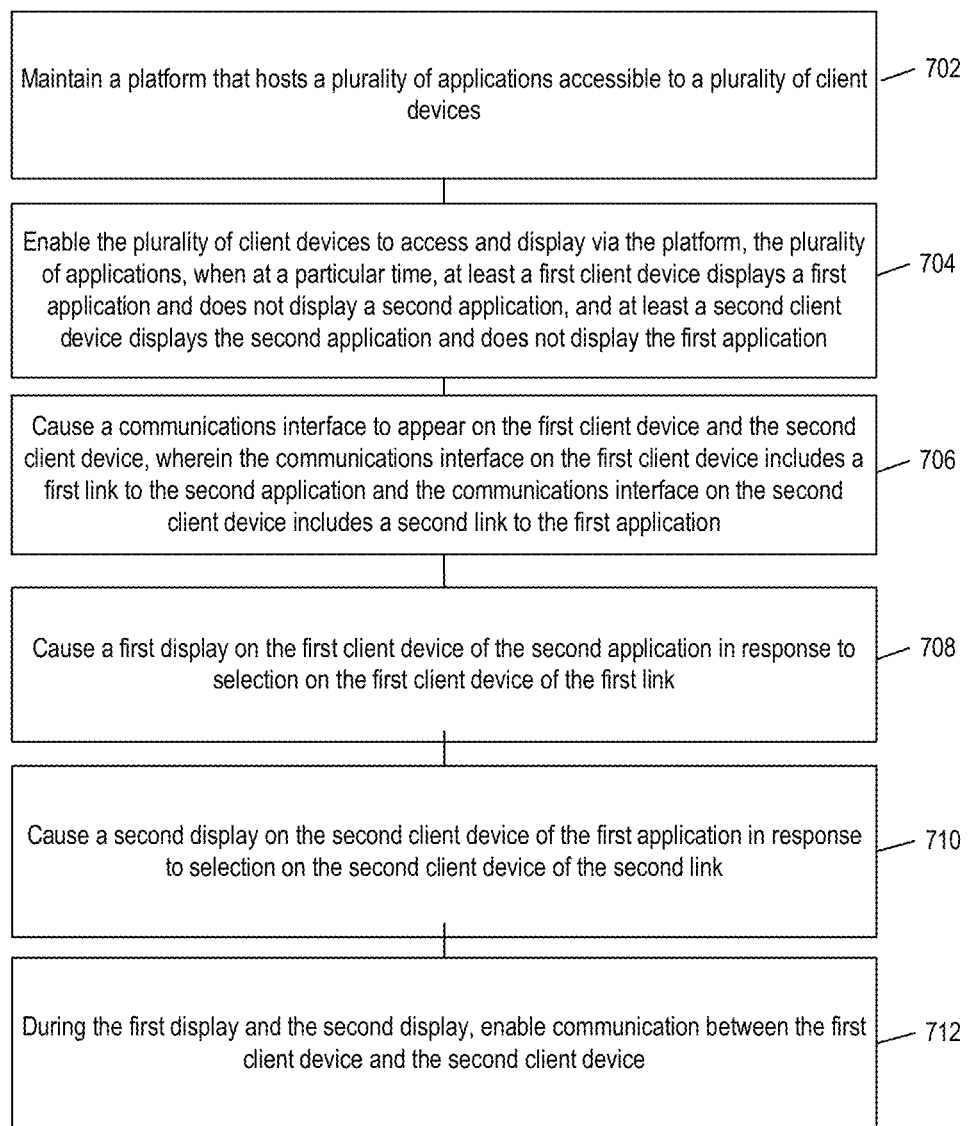
FIG. 7 depicts a block diagram of an exemplary process for mutual screen sharing during a text chat, consistent with some embodiments of the present disclosure.

FIG. 7 depicts an exemplary process for mutual screen sharing during a communication, consistent with the present disclosure.

At block 702, processing circuitry 110 may maintain a platform that may host a plurality of applications accessible to a plurality of client devices. For example, processing circuitry 110 may maintain a website, an operating system, or other virtual/digital environment on which various other applications may carryout functions, such as organization information via tables and spreadsheet, audio and video playback, animation, graphic generation, downloading and uploading of data, linking to other software or webpages, posting, and viewing of messages, text chat, and other electronic and digital functions. Processing circuitry 110 may also allow a plurality of client devices to connected to the platform. For example, user devices 220-1 to 220-m may be example of client devices that may be connected to a platform maintained by computer device 100 via network 210. Users associated with user devices 220-1 to 220-m may access the platform to use one or more of the applications hosted by the platform.

At block 704, processing circuitry 110 may enable the plurality of client devices to access and display via the platform, the plurality of applications. For example, computing device 100 may provide a link to user devices 220-1 to 220-m to gain access to boards, tables, and other applications hosted on the platform. If accessing the board requires authentication or credential information, processing circuitry 110 may confirm authentication information supplied by the client device as needed. User devices 220-1 to 220-m may display their respective display interfaces of the plurality of applications. For example, one of user device 220-m (e.g., the first client device) may present display 300A (an example of a first display) on its display interface, and another one of user device 220-m (e.g., the second client device) may present display 300B (an example of a second display) on its display interface.

At block 706, processing circuitry 110 may cause a communications interface to appear on the first client device and the second client device. For example, interface 306 may be an example of the communication interface. Processing circuitry 110 may render interface 306 as an overlay on display 300A (and/or 300B), and it may be moved or dragged to a different position as desired. Interface 306 may be configured to receive inputs from a user (such as user 308A) via textbox 306A. Textbox 306A may display the texts as the user types or otherwise provides input. Interface 306 may also include social bar 306B. Social bar 306B may include one or more avatars representing other users who may be in communication with sender of text messages. For instance, the social bar 306B indicates other users who may be part of a group that may send and receive text messages to and from each other.

In some embodiments, the communications interface includes one or more text chat box. Processing circuitry 110 may generate text chat boxes to display messages sent or received in real-time or near real-time, as to simulate a conversation between different users. For example, in FIG. 3A and FIG. 3B, chat boxes 302 and 304 are examples of text chat boxes. Chat boxes 302 and 304 also include avatars depicting the identity of texts senders, such as avatar 302A and avatar 304A. In some embodiments, processing circuitry 110 renders the chat boxes to appear at a location above social bar 306B, corresponding to the avatar of the user that sent the text message in the chat box. For example, in FIG. 3A, chat box 302 contains texts sent by 308B, so chat box 302 appears over the avatar of 308B on social bar 306B. Similarly, chat box 304 contains texts sent by 308A, so it appears over textbox 306A.

In some embodiments, the communications interface on the first client device includes a first link to the second application. Additionally, or alternatively, the communications interface on the second client device includes a second link to the first application. A link may contain an address to a destination, and/or instructions, that when activated, cause the loading of information stored at the destination, or execution of the instruction. For instances, a hyperlink or an URL may be an example of the first link, which may cause the first client device to access the second application. For example, in FIG. 3A, link 302B may be an example of a link, such as the first link to the second application. Link 302B may be included in chat box 302.

At block 708, processing circuitry 110 may cause a first display on the first client device of the second application in response to selection on the first client device of the first link. For example, when user 308A activates link 302B (e.g., by clicking or pressing on a touch screen), processing circuitry 110 may cause the client device of user 308A (e.g., the first client device) to change to a different display (e.g., the second application). Display 400 may be an example of what is being display on the client device of 308A (e.g., the first client device) after activation of link 302B.

At block 710, processing circuitry 110 may cause a second display on the second client device of the first application in response to selection on the second client device of the second link. In some embodiments, user 308A may send a link (e.g., the second link) to user 308B in a chat box, such that when user 308B activates the link, processing circuitry 110 may cause the client device of user 308B (e.g., the second client device) to present the first application for display.

At block 712, processing circuitry 110, during the first display and the second display, may enable communication between the first client device and the second client device. For instance, even while the display interfaces on the first client device or the second client device switch or re-render views, processing circuitry 110 maintains the communications function and the communication interface. For example, as seen FIG. 4, the first client device continues to present the text messages exchanged (e.g., chat boxes 302 and 304 remain visible and active). In FIG. 3A, FIG. 3B, and FIG. 4, interface 306 remains enabled to send and receive text messages in both the first and second client devices.

In the course of collaboration between different users, each of whom may be using a different device (e.g., client device), there may exist a technical challenge of configuring the user interfaces being displayed on each of the different devices to enable contextual communications regarding a particular work area in a workspace. For example, there may be a technical challenge of efficiently arranging on the user interfaces, displays of communications between the different users. For example, when many users communicate simultaneously or in proximity to each other, some messages might be missed because, for example, some messages might overwrite or cover others; some messages might scroll off or otherwise disappear from a display before the messages can be read; or some messages might be missed because a user is distracted by other messages.

Therefore, there may be a need for unconventional approaches to enable a user using their device to view on-going communications between different users, arrange such communication in a display in an efficient manner, and remove such communication displays in a timely manner in relation to a context. The context options are myriad. They may include priorities of certain communications, priorities of certain individuals, number of individuals communicating simultaneously, amount of display space available for messages, length of messages, importance level of messages, and any other factor that might influence the need to have a message remain on a display for a variable period. Various embodiments of the present disclosure describe unconventional systems, methods and computer readable media that automatically vary hang-time of pop-up messages. The various embodiments of the present disclosure describe at least a technological solution, based on improvement to operations of computer systems and platforms, to the technical challenge of efficiently arranging on the user interfaces, display of communications between differing users.

Aspects of this disclosure may relate to systems, methods, and computer readable media that automatically varies hang-time of pop-up messages. For ease of discussion, some examples are described below with reference to systems, methods, devices, and/or computer-readable media, with the understanding that discussions of each apply equally to the others. For example, some aspects of these methods may be implemented by a computing device or software running thereon. The computing device may include at least one processor as previously described (e.g., a CPU, GPU, DSP, FPGA, ASIC, or any circuitry for performing logical operations on input data) to perform the example methods. Other aspects of such methods may be implemented over a network (e.g., a wired network, a wireless network, or both).

As another example, some aspects of such methods may be implemented as operations or program codes in a non-transitory computer-readable medium. The operations or program codes may be executed by at least one processor. Non-transitory computer readable media may be implemented as any combination of hardware, firmware, software, or any medium capable of storing data that is readable by any computing device with a processor for performing methods or operations represented by the stored data. In a broadest sense, the example methods are not limited to particular physical or electronic instrumentalities, but rather may be accomplished using many differing instrumentalities.

A communications system may be any set of components working together. For example, a system may involve one or more processors that execute instructions to cause functionality described herein, such as varying the hang time of pop-up messages. The system may be configured to display the pop-up messages via an interactive element of a web page, a mobile-application, a software system, or any graphical user interface (GUI) that enables interactions between a human and a machine via the interactive element, for the purpose of facilitating communication. By way of example, the system may be configured to enable pop-up messages to appear on a display screen or other form of display, in a chat box, or in a chat bar. The pop up messages may be enabled to appear on any form of interface and in any context. For example, the messages may be enabled to pop-up in a social layer. The messages may be generated in a myriad of ways, such as through a physical or virtual keyboard, a voice to text component, buttons, icon selection, a menu, and/or via any other GUI or input device capable of receiving user inputs.

Figure 8:
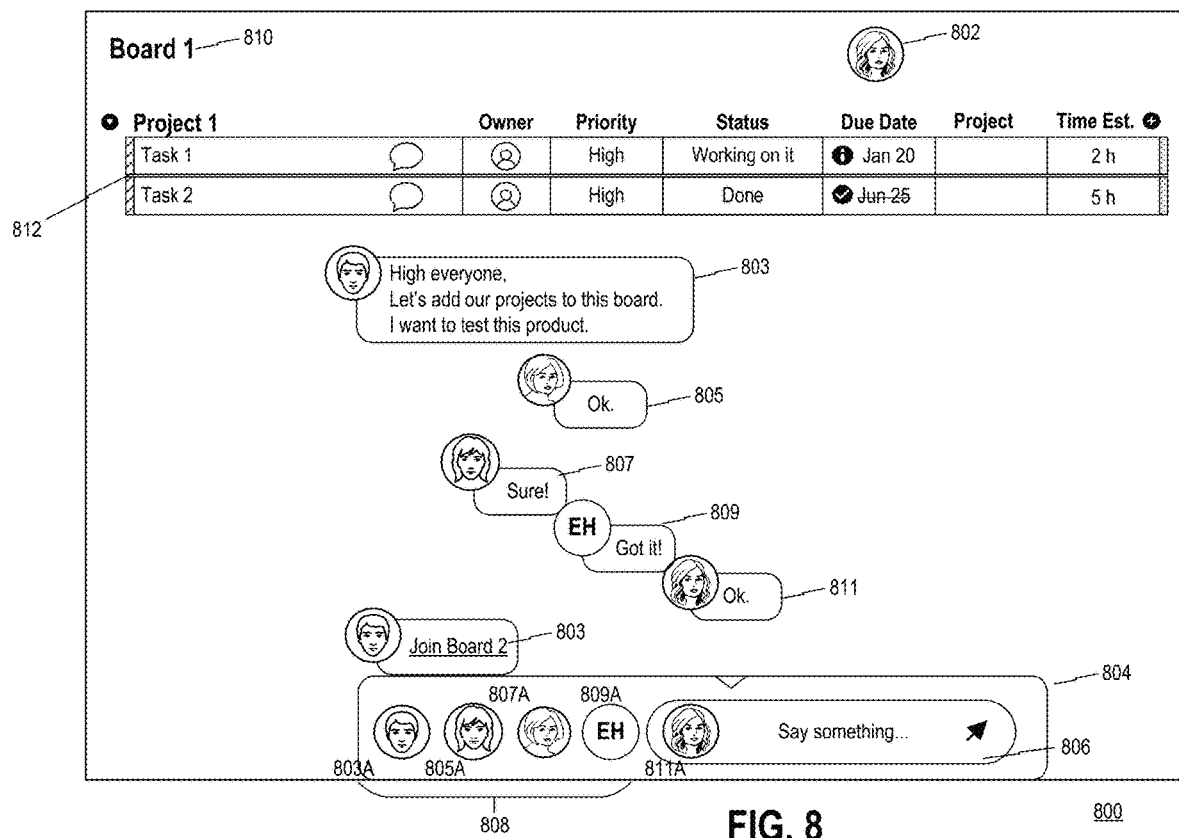
FIG. 8 depicts a display of an exemplary shared work environment containing social layer messages, consistent with some embodiments of the present disclosure.

By way of example, interface 804 depicted in FIG. 8 may be an example of a display on which hang time may be varied. As seen in FIG. 8, interface 804 is a graphical user interface presented in display 800. Interface 804 may be configured to receive inputs from a user (such as user 802) via textbox 806. Textbox 806 may display the text or graphics as the user types or otherwise provides inputs. In the example depicted, textbox 806 may include an avatar (e.g., 811A) indicating the identity of the text sender.

Pop-up messages may refer to messages, texts, graphics and/or other information that may be displayed for a limited amount of time. Pop-up messages may include information communicated between parties. For example, two or more individuals may communicate through text symbols inputted into computer systems (including PCs, MACs, phones, pagers, and other electronic devices) by way of an input device (including keyboards, touch screen, voice-to-text interface, and other suitable text interface), which may be displayed on display interfaces to be viewed by another individual. Examples of pop-up messages includes text messages, instant messages, direct messages, chat boards, SMS messages, and any other formats of exchanging information. Pop-up messages may include alphanumerics in any language of any country (e.g., English, Hebrew, Spanish, Chinese, French, Japanese, Korean) and may also include graphics such as images, emojis, GIFs, or any other graphical representation. Other forms of pop-up messages may include the transmission of a link (e.g., a URL or file path) that may cause a re-rendering of a display to present different information.

A pop-up notification may refer to a message, such as a message presented in a form of a bubble, window, box, or other format presentable on a display interface, such as a display interface as described previously. For example, display interfaces may include devices such as a display of a computer monitor, TV, mobile device, augmented reality (AR) device, virtual reality (VR) device, and/or other device employing other display technologies. In some cases, the user may view the pop-up message or notifications without having to react to the messages or notifications immediately. In some cases, the pop-up messages or notifications may disappear from the screen after some time period. The time period that the pop-up messages remain viewable by the user may be referred to as hang time. The hang time of the pop-up messages may vary, such that the communication interface may cause some pop-up messages to have a longer hang time than other pop-up messages. The communication interface may automatically determine the hang time of each of the pop-up messages based on some logic, algorithms, or rules, which may vary depending on design choice. For example, the system may assign a longer hang time that correlates to a longer message length. In other embodiments, the hang time may be manually determined by a user, such as by assigning a hang time based on the identity of a message sender. For example, there may be a preference to assign a longer hang time for a message sent by a supervisor. In other examples, the hang time may vary based on the number of messages being simultaneously displayed. For example, when fewer messages are displayed, less time may be needed to read them, and therefore, a shorter hang time may be warranted. Longer hang times may be assigned to a host of a chat session. An administrator may, in some instances, be permitted to define hang time rules.

As illustrated in FIG. 8, bubbles 803, 805, 807, 809, and 811 may each be an example of a pop-up message. Each of these bubbles may be configured to disappear from display 800 after a time period (e.g., hang time) either automatically determined by the system, by a manual assignment based on a preference, or a combination thereof.

Consistent with disclosed embodiments, at least one processor may enable presentation of a shared work environment on a plurality of client devices. A shared work environment may refer to features, functions, tools, utilities, or other activities supported or created by computer programs, applications, or software. For example, a shared work environment may be an interface, a form of display, a suite of software applications, such task organizers, word processors, spreadsheet, webpage, calendars, and/or other programs or applications that may separately or together be accessible by users through the use of client devices. The shared work environment may be presented on any interface or display of a client device, as previously discussed above. Client devices may refer to computer systems (including PCs, MACs, phones, pagers, or any other electronic device that can be used for generating and/or consuming information) associated with parties connected to a platform. A user for instance, may access the platform (e.g., a webpage) to use one or more of the applications hosted by the platform via a client device. A word processing program or a workflow management board system may serve as a platform, and various client devices might access that platform simultaneously, with embodiments of this disclosure permitting multiple users to communicate simultaneously or sequentially. The users may be enabled to view common or shared information. In some embodiments, differing users might view different information or access differing platforms, while common messages are nevertheless displayed across differing views or platforms.

FIG. 8 depicts display 800. Display 800 may be an example of a presentation of a portion of a shared work environment that is displayed on a client device. Display 800 presents board 810 and table 812, each of which may examples of an application of the shared work environment accessible by a client device. By way of example, any one of user devices 220-1 through user device 220-m depicted in FIG. 2 may be the client device that displays the shared work environment. The client device may be associated with a client with access to the shared work environment, such as by user 802 of FIG. 8.

A table may refer to any organized manner of displaying information in two dimensions, three dimensions, or more. A plurality of cells formed by horizontal and vertical rows (e.g., rows and columns) may form one example of two-dimensional table. Tables presented in greater than two dimensions may be simulated on a two-dimensional display or may be presented holographically or through virtual glasses or other virtual displays. The table may be part of a plurality of boards as described previously, which may include tables with items defining objects or entities that are managed in the platform (e.g., task, project, client, deal, or any other indication of an item).

Board 810 depicted in FIG. 8 may be an example of a table. Board 810 includes table 812, which may be an example of an application or a table. Table 812 may include one or more rows and columns. In the example depicted, table 812 includes two rows, each representing an item (e.g., "Task 1" and "Task 2"). Table 812 includes columns, each representing a category of information of an item. For example, column "Owner" may contain information on the user that created the item; column "Priority" may contain information regarding level importance of the item; and so on. Items may be contained in a rows or columns of the boards or may be associated therewith through a link (e.g., a link to another board or sub-board, or to any other data structure) or through metadata. The boards or items of the board may be associated with a user (e.g., user 802), and the platform may allow client devices of the user to access and view the boards, or items of the boards.

Disclosed embodiments may involve causing a presentation of a plurality of visual indicators on a fraction of a display of the shared work environment. A visual indicator may refer to any graphic or visual elements, such as shapes, symbols, images, animations, videos, photo, alphanumeric text, and other similar media, rendered by the system to represent data or information. Visual indicators may be rendered for the purpose of providing visual notifications, reminders, identification, information presentation, or any other viewing purposes, on, for example, only on a fraction of the display. A fraction of the display may include any portion of space taken up in a presentation of information on the display, ranging from a minimum portion of the display up to the entire display. The fraction of the display may be static or may be dynamic in that the fraction of the display may be adjusted by the system or a user. For example, the shared work environment may be configured to display may different elements, and the visual indicator may be displayed on top of, or together with other visual elements of the shared work environment. The visual indicators may take a fraction of the display of the shared work environment by being located towards the top, side, or bottom of the display.

In FIG. 8, interface 806 may include social bar 808. Social bar 808 may include one or more avatars representing other users who may be in communication with the text sender. As depicted, social bar 808 includes avatars 803A, 805A, 807A, 809A, each of which may be an example of a visual indicator representing a user associated a client device. Interface 806 also includes avatar 811A, which may be an example of a visual indicator representing user 802.

In some embodiments, the fraction of the display includes a bar on an edge of the display. For example, a fraction of the display may be reserved to display users in communication with the shared work environment. For instance, there may be one or more users sharing the shared work environment or are otherwise associated with the shared work environment. An indication of these users may be provided on the display, such as in an interface near the edged of the display, in form such as a bar.

Interface 806 may be rendered as an overlay (e.g., an object on top of) of display 800, and may be moved or dragged to a different position as desired. In FIG. 8, interface 806 is rendered as a bar located on the bottom edge of display 800.

In some embodiments, each visual indicator may represent differing clients associated with the plurality of client devices. A client may be a user, such as an individual, party, company or organization that owns or operates an associated client device.

For example, an individual, party, company or organization that owns or operates one of user devices 220-1 through user device 220-*m* depicted in FIG. 2 may be an example of a client. For example, avatar 803A may represent a first client associated with a first client device; avatar 805A may represent a second client associated with a second client device, avatar 807A may represent a third client associated with a third client device; avatar 809A may represent a fourth client associated with a fourth client device; and so on. Avatar 811A may represent user 802, who may be associated with client device that is currently viewing display 800.

A client may be represented by a graphic element, such as by a visual indicator. In some embodiments, the visual indicator is at least one of a thumbnail photo, an icon, or alphanumeric characters. For example, the visual indictor may be a photo of the client. Alternatively, an icon or picture may represent the client. For example, a logo, icon, or picture of an organization may represent the client of the client device. Alternatively, alphanumeric text such as the name or initials of a user or organization may represent the client.

In FIG. 8, avatar 803A may be an image or photo of a client. Alternatively, avatar 809A may be alphanumeric characters represent initials of another client.

Disclosed embodiments may enable at least one group chat between the plurality of client devices. A group chat may refer to a method of communication through the use of messages including alphanumeric or graphic symbols among two or more individuals. Chat messages may be sent to or received from users of the client device. In some embodiments, the chat messages may be displayed in the shared work environment. For example, two or more individuals (e.g., users of client devices) may communicate through texts, graphics (e.g., emojis), and/or images (e.g., photos) in the shared work environment. The individuals may provide input through an input apparatus (including keyboards, touch screen, voice-to-text interface, and other suitable text interface) of the client devices. Examples of group chat may include text messages, instant messages, direct messages, chat boards, SMS, and other similar format of exchanging information via alphanumeric and graphic symbols. The group chats may be example of social layer messages.

By way of example, FIG. 8 depicts an example of a group chat taken place in the shared work environment. Bubbles 803, 805, 807, 809, and 811 may contain messages sent by the different users that are part of the "group chat." For example, bubble 803 contains a message sent by avatar 803A; bubble 805 contains a message sent by avatar 805A; bubble 807 contains a message sent by avatar 807A; bubble 809 contains a message sent by avatar 809A; bubble 811 contains a message sent by avatar 811A; and so on.

In some embodiments, communications may be presented in pop-up windows appearing adjacent to corresponding visual indicators. The pop-up windows may be presented on a location on the display selectable by the user or imbedded in the system/software design. For example, the pop-up window may be placed adjacent to the visual indicator corresponding to the sender. This placement of pop-up windows may allow the viewer to readily determine the source of the text message.

In some embodiments, the pop-up windows appear at a location above social bar 808, corresponding to an avatar of the user that sent the text message in the chat box. For example, in FIG. 8, bubble 803 contains a message sent by user 803A, so bubble 803 appears over the avatar of 803A on social bar 808; bubble 805 contains a message sent by user 805A, so bubble 805 appears over the avatar of 805A on social bar 808; and so on. This arrangement of chat box locations may also allow users to visually organize the text messages being displayed in an efficient manner.

Some embodiments may be configured to alter a combination of a plurality of client devices in at least one group chat. One or more users that are part of the group chat, or an administrator of the system, may add or remove users from the group chat. For example, when a collaborator joins a project or task, the collaborator may be added to the ongoing 'conversation' as a new user. A visual indicator of the new user may appear to indicate the presence. Similarly, an existing user that was part of the 'conversation' may be removed, and his/her avatar may disappear to indicate the absence of the removed user.

In FIG. 8, a visual indicator of the new user may appear in social bar 808 to indicate the presence. Similarly, an existing user that was part of the 'conversation' may be removed, and his/her avatar may disappear from social bar 808 to indicate the absence of the removed user.

In some embodiments, the pop-up windows may remain on the display for differing durations depending on variables. A variable may refer to a factor or a parameter that may be changed (e.g., by a user, an administer, or some other party authorized to access the variable). The variable may determine a setting or a status of the system. For example, the hang-time of the pop-up window may be determined based on a variable (or variables). The duration for which pop-up windows remain on screen may be the hang-time.

It may be desirable in some situation for text chat in a pop-up window to disappear from the display screen. For example, if messages remain on screen indefinitely, they may take up screen space for no additional benefit once the content has been read by a recipient. Moreover, a 'conversation-style' exchange may be better simulated if text messages disappear after a given time. One issue that may arise in an interface that removes messages from display after a time is that when many individuals send messages at the same time, or when some messages are particularly long, there may be insufficient time to read all the messages before they disappear from the display. Therefore, it may be desirable for the system to alter the hang-time of messages depending on a number of factors, such as variables based on length of the message and/or number of concurrently displayed messages.

In some embodiments, a variable may include a length of a message. A message length may include any metric for determining the size of the message, such as by character count, word count, line count, a file size included with the message, or a combination thereof. For example, a first pop-up window that includes a text message containing a first number of characters may have a first hang-time, while a second pop-up window that includes a text message containing a second number of characters may have a second hang-time. When the second number of characters is greater than the first number of characters, the second pop-up window may be configured to have a longer hang-time (second hang-time) than the first pop-up window (first hang-time). In another example, if a message includes an attachment such as a PDF or JPG file, the file size of the attachment may be taken into account for the system to assign a longer hang-time for the message. In some embodiments, the at least one processor may be configured to compare each message to a message length threshold and to increase message hang-time when the message length threshold is surpassed. For example, the increase in hang-time based on length of the message may be in intervals, and additional hang-time is added when the length of the message reaches a threshold. For example, messages containing 0-25 characters may have a first pre-set hang time (e.g., 15 seconds), a message containing 25-50 characters may have a second pre-set hang-time (e.g., 30 seconds), and so on.

In some embodiments, variables may include a number of concurrently displayed messages. Concurrently displayed messages may include messages presented in a display at the same time. When, for instance, multiple users are sending messages, many pop-up windows may appear at once, and a viewer may need additional time to consume all the content being displayed. Thus, in the situation when a high number of messages are displayed concurrently displayed, the processor may increase the hang-time of each of the pop-up windows to enable a viewer to read all the messages.

In some embodiments, variables may include a client defined threshold. In some embodiments, the client defined threshold may be selectable by a client. In some embodiments, the client defined threshold is selectable by an administrator. The defined threshold may be selected from a preset list of options or may be defined through a customized input. An administrator may be a user other than the client who automatically has access to the client's settings and can make the selections unilaterally. For example, the user of the client device (the client) may desire a shorter or longer hang-time of pop-up windows based on personal preference. Thus, the client may change a setting of the shared work environment to manually increase or decrease the hang-time of the pop-up windows based on personal preference.

In some embodiments, variables may include a sender status. For example, the system may determine that certain messages have different hang-based on the status of the author that sends the message. For example, the system may send a message to indicate a systems status (such as error message), which may result in an increased hang-time to emphasize its importance. In another example, some users may have priority over other users. For instance, a group leader, a manager, or an executive may have priority over other individuals using the shared work environment, thus their messages may have increased hang-time over the messages sent by other users.

In some embodiments, the at least one processor may be configured to save a pop-up message for later review on a particular client device when a client associated with the particular client device selects the message. Saving a pop-up message may include storing the message in a local or remote repository that may be accessed or retrieved at a later time. Saving the pop-up message may be automatic, or it may be manually achieved by a user selecting a particular message with a hang-time to instead be saved. When the message is saved, the message may be saved in a particular location in the shared workspace, such as with an associated item, a cell, an attachment, or any other location.

Figure 9:
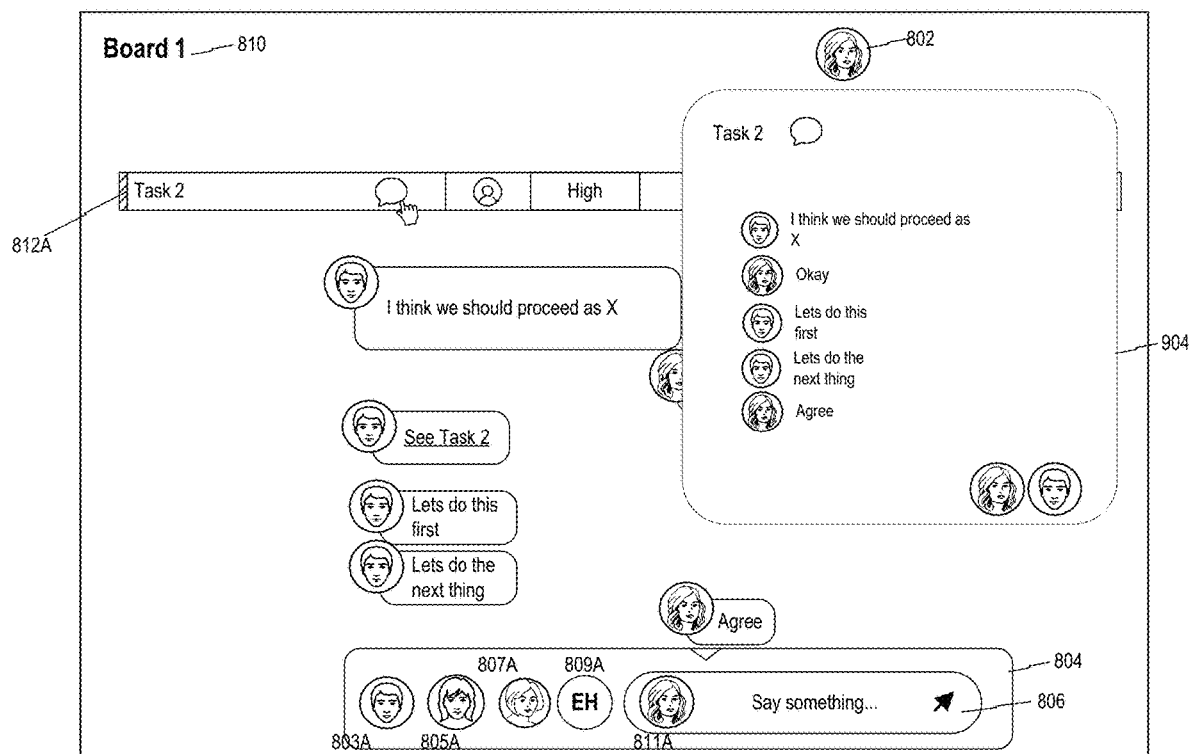
FIG. 9 depicts another display of an exemplary shared work environment containing social layer messages, consistent with some embodiments of the present disclosure.

For example, FIG. 9 depicts an example of a saved pop-up message. The messages being sent back and forth between users may be stored in board 810 for later viewing. In some cases, the messages may be stored and linked to a specific item, such as item 812A. For example, messages in pop-up windows may be related to item 812A, so it may be convenient to store the record of this conversation in a location linked to item 812A. By way of example, the message between users can be retrieved and displayed in display 904. In some cases, the text messages may be accompanied by the avatar of the sender, or accompanied by a time stamp of the time of sending.

Figure 10:
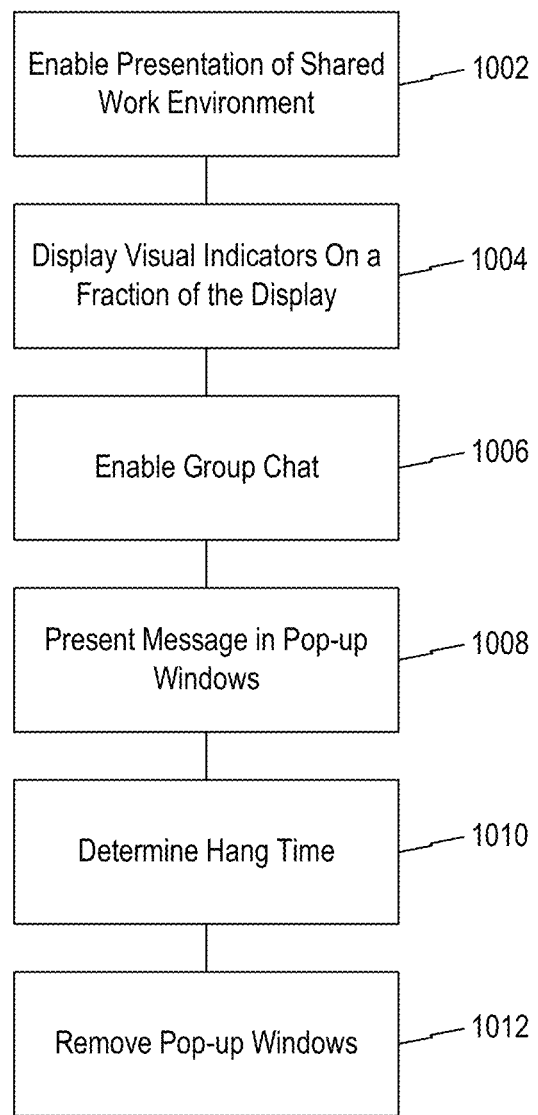
FIG. 10 depicts a flow chart of an exemplary process for variable hang time for social layer messaging, consistent with some embodiments of the present disclosure.

FIG. 10 depicts an exemplary block diagram for mutual screen sharing during a text chat, consistent with the present disclosure.

At block 1002, processing circuitry 110 may enable presentation of a shared work environment. The shared work environment may include a suite of software applications, such task organizers, word processors, spreadsheet, webpage, calendars, and/or other programs or applications that may separately or together accessible by users through the use of client devices. For example, FIG. 8 depicts display 800, which may be a shared work environment that is being displayed on one of the client devices. Display 800 includes board 810 and table 812A, each of which may be an example of an application of the shared work environment accessible by a client device. Users may use client devices to access one or more of the applications hosted by the platform via a client device. Any one of user devices 220-1 through user device 220-m depicted in FIG. 2 may be an example of the client devices. User 802 of FIG. 8 may be an example of a user who are accessing the shared work environment.

At block 1004, processing circuitry 110 may display visual indicators on a fraction of the display. For example, display 800 includes interface 804 display on a portion of the display, such as a bar on the edge of the display. Interface 804 may be rendered as an overlay (e.g., an object on top of) of display 800, and may be moved or dragged to a different position as desired. Interface 804 includes social bar 808, which includes avatars 803A, 805A, 807A, 809A, each of which may be an example a visual indicator representing a user associated a client device. Interface 804 also includes avatar 811A, which may be an example of a visual indicator representing user 802. In some embodiments, each visual indicator may represent differing clients associated with the plurality of client devices, such as a user that owns or operates one of user devices 220-1 through user device 220-m depicted in FIG. 2. For example, avatar 803A may represent a first client associated with a first client device; avatar 805A may represent a second client associated with a second client device, avatar 807A may represent a third client associated with a third client device; avatar 809A may represent a fourth client associated with a fourth client device; and so on. Avatar 811A may represent user 802, who may be associated with client device that is currently viewing display 800. The visual indicator is at least one of a thumbnail photo, an icon, or alphanumeric characters. For example, avatar 803A may be an image or photo of a client. Alternatively, avatar 809A may be alphanumeric characters represent initials of another client.

At block 1006, processing circuitry 110 may enable a group chat. Messages may be sent to or received from clients of the client device. In some embodiments, the chat messages may be displayed in the share work environment. For example, two or more individuals (e.g., users of client devices) may communicate through texts, graphics (e.g., emojis), and/or images (e.g., photos) in the shared work environment. The individuals may provide input through an input apparatus (including keyboards, touch screen, voice-to-text interface, and other suitable text interface) of the client devices. Examples of group chats may include text messages, instant messages, direct messages, chat boards, SMS, and other similar format of exchanging information via alphanumeric and graphic symbols. FIG. 8 depicts an example of a group chat taking place in the shared work environment.

At block 1008, processing circuitry 110 may present messages in pop-up windows. For example, FIG. 8 depicts an example of a group chat occurring in the shared work environment, where the messages are presented in pop-up windows. Bubbles 803, 805, 807, 809, and 811 may contain messages sent by the different users that are part of the 'group chat.' For example, bubble 803 contains a message sent by avatar 803A; bubble 805 contains a message sent by avatar 805A; bubble 807 contains a message sent by avatar 807A; bubble 809 contains a message sent by avatar 809A; bubble 811 contains a message sent by avatar 811A, and so on. The pop-up windows may be presented on a location on the display based on certain considerations. For example, the pop-up window may be placed adjacent to the visual indicator corresponding to the sender. This placement of pop-up windows may allow the viewer to readily determine the source of the text message. For example, the pop-up windows may appear at a location above social bar 808, corresponding to avatar of the user that sent the text message in the chat box. As seen, in FIG. 8, bubble 803 contains a message sent by user 803A, so bubble 803 appears over the avatar of 803A on social bar 808; bubble 805 contains a message sent by user 805A, so bubble 805 appears over the avatar of 805A on social bar 808; and so on. This arrangement of chat box locations may also allow users to visually organize the text messages being display in an efficient manner.

At block 1010, processing circuitry 110 may determine hang time. In some embodiments, as described in greater detail earlier, the pop-up windows remain on the display for differing durations (hang time) depending on variables that may be changed (e.g., by a user, an administer, or some other party authorized to access the variable). The variable may determine a setting or a status of the system. For example, the hang-time of the pop-up windows may be determined based on a variable (or variables). The duration for which pop-up windows remain on screen may be the hang-time. The variables may include length of message, wherein hang time is longer for messages with longer length. For example, processing circuitry may compare each message to a message length threshold and to increase message hang-time when the message length threshold is surpassed. For example, messages contain 0-25 characters may have a first pre-set hang time, a message containing 25-50 characters may have a second pre-set hang-time, and so on.

The variables may also include at least a number of concurrently displayed messages. When, for instance, multiple users are sending messages, many pop-up windows may appear at once, and a viewer may need additional time to consume all the content being displayed. Thus, in the situation when a high number of messages are displayed concurrently displayed, the processor may increase the hang-time of each of the pop-up windows.

The variables may also include a client defined threshold. For example, the user of the client device (the client) may desire a shorter or longer hang-time of pop-up windows based on personal preference. Thus, the client may change a setting of the shared work environment to manually increase or decrease hang-time of the pop-up windows based on personal preference. In some embodiments, the client defined threshold is selectable by a client. In some embodiments, the client defined threshold is selectable by an administrator.

The variables may also include a sender status. For example, the system may determine that certain clients have different hang-time for the messages the send. A system message indicating a systems status (such as error message) may have increased hang-time to emphasize its importance. In another example, some users may have priority over other users. For instance, a group leader, a manager, or an executive may have priority over other individuals using the shared work environment, thus their messages may have increased hang-time over the messages sent by other users.

At block 1012, processing circuitry 110 may remove pop-up windows. For example, once the pop-up window has reached the end of its hang time determined in block 1012, processing circuitry 110 removes the pop-window from the display.

In a collaborative work system, users may perform various actions on their accounts, and information of these actions may be collected, analyzed, and visualized to provide intelligence to the users for management or administration. A challenge to the information visualization is that some aggregation or high-level characteristics (e.g., frequencies, importance levels, behavior modes, or trends) of the actions performed by the users may be invisible from the presentation of the collected and analyzed data, especially when the number of the users is large or when the users are involved in many different workflows. It may be difficult to manually identify and analyze the aggregation characteristics of many actions of many users for many workflows. It may also be difficult to visualize such aggregation characteristics in real time.

Aspects of this disclosure may provide a technical solution to the challenging technical problem of visualizations of information associated with teams and team members, and may relate to a dynamic system for generating a network map reflective of node connection strength for presentation in collaborative work systems, including methods, systems, devices, and computer-readable media. For ease of discussion, some examples are described below with reference to systems, methods, devices, and/or computer-readable media, with the understanding that discussions of each apply equally to the others. For example, some aspects of methods may be implemented by a computing device or software running thereon. Other aspects of such methods may be implemented over a network (e.g., a wired network, a wireless network, or both).

Some disclosed embodiments are directed to systems, methods, devices, and non-transitory computer readable media for generating a network map reflective of node connection strength. A network map may refer to a visual presentation (e.g., a map, a chart, or a figure) for a network that may include various nodes and connections between the nodes to represent information regarding the relationships between the various nodes. A node in the network may represent an entity. A node may be presented in any way such as by alphanumerics, graphics, or a combination there of to represent an entity. An entity may refer to an individual, a device, a team, a group, a department, a division, a subsidiary, a company, a contractor, an agent or representative, or any independent, distinct organization (e.g., a business or a government unit) that has an identity separate from those of its members. In some embodiments, each of the plurality of entities may be a single individual such as a user of the collaborative work system. In some embodiments, at least some of the plurality of entities may include a group of individuals. For example, the group of individuals may be a team that uses the collaborative work system. A connection between two nodes in the network may represent an interaction or a relationship between the two nodes. The network may be presented in any two-dimensional (2D) or three-dimensional (3D) manner. Node connection strength (also referred to as "connection strength") in this disclosure may refer to a metric value of the connection, such as a frequency, an importance value, a count, a weight, or any value representing a strength of an interaction or a relationship.

Figure 11:
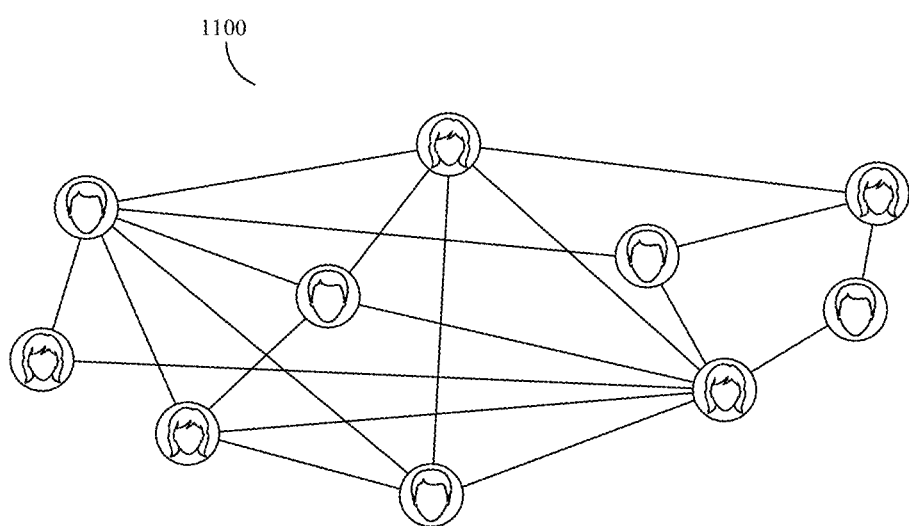
FIG. 11 illustrates an example network map, consistent with some embodiments of the present disclosure.

By way of example, FIG. 11 illustrates a network map 1100, consistent with embodiments of the present disclosure. Network map 1100 may be a 2D visual representation. A node (represented as a circular avatar) of network map 1100 may represent an individual (e.g., a team member). A connection (represented as a line between two circular avatars) between two nodes of network map 1100 may represent an interaction or a relationship between the two nodes. For example, the interaction may represent that two individuals have communicated with each other, such as by emails, instant messages, phone calls, or any other interactions.

Some disclosed embodiments may be configured to track electronic connections between a plurality of entities in an electronic workspace. An electronic workspace may refer to an electronic or digital space for storing, representing (e.g., displaying), transmitting, and/or executing instructions or data of collaborative work between a group of entities. For example, the electronic workspace may be a collaborative work system (e.g., a team collaboration website). The electronic workspace may be used by entities within the same organization or from different organizations.

Tracking may refer to an operation to monitor, follow, observe, find, search, pursue, collect, or any form of operation to record data. In some embodiments, the tracking operation may be implemented using computer software. For example, computer software may collect data (e.g., related to usage or user activity) from interactions between the computer software and a user of the computer software. In another example, first computer software may interact or interface with second computer software, and may further collect data (e.g., related to usage, user engagement, or communications between the two computer softwares) associated with the second computer software. The tracked data may be stored in a storage medium (e.g., a database on a server). In another example, data related to a user of a platform (e.g., a website or a mobile application) may be tracked by the platform. When a user of a first platform (e.g., a social media platform) is connected to a second platform (e.g., a collaborative work system), data related to the user may be collected by either the first platform or the second platform. In some embodiments, the tracked data of the user may include various characteristics, features, or specifications, such as a type of activity, a count of an activity, a feature used by the user, a time duration of using the feature by the user, or an accumulated time of using the feature. It should be noted that the characteristics, features, or specifications of the tracked data are not limited to the examples described herein.

An electronic connection between two entities may refer to a digital or electronic representation of a relationship or interaction between the two entities. The relationship may represent any organizational or business-flow relationship, such as a supervisor-supervisee or a supplier-client relationship. The interaction between the two entities may include any form of interaction. For example, the electronic connection may represent a communication, such as an instant message, a calendar invite, an email, a text message, a phone call, a shared post, a comment to the shared post, an acknowledgement (e.g., a "thumbs up") to the shared post, or any metric, activity, or form of communication or engagement. The electronic connection may include a benchmark of activities or interactions between nodes of the network map, which may be used for quantitative analysis (e.g., by comparison or ranking). For example, the electronic connection may include a value representing a frequency of communications, which may be used as a benchmark of importance of interactions between the connected nodes.

In some embodiments, the electronic connection may further include data related to the relationship or the interaction between the two entities, such as location data (e.g., an address), geography data (e.g., a positioning coordinate), temporal data (e.g., a time stamp), time tracking data (e.g., a duration of an activity), monetary data (e.g., an expenditure or an income), content data (e.g., a user-generated post), or any other type of data.

In some embodiments, the electronic connections may be tracked in a live or dynamic manner (e.g., being generated derived based on data points of usage of a computer software) rather than being predefined in a static manner. Such data points may include a geographic location, a time stamp, a time duration, a monetary value, a content, a numeric value, or any form of data. For example, at least one processor may track the electronic connections based on usage statistics of a collaborative work system. Rather than predefining which statistic metrics to be tracked, the at least one processor may allow a user to select one or more statistic metrics to track and configure (e.g., setting a filter) the selected statistic metrics based on preferences. For example, the at least one processor may generate and present a user interface to the user for such configuration. The at least one processor may continuously track and update the electronic connections as selected and configured.

In some embodiments, the electronic connections may be based on at least one of emails, team assignments, text messages, voice messages, file transfers, or collective work in the electronic workspace. For example, an electronic connection may represent a count of items generated by a user in the collaborative work system. Such a count may be associated, measured, and visualized with other data (e.g., completion of a task or a stage of a project) derived from the collaborative work system. The items generated by the user in the collaborative work system may include, for example, electronic tables ("boards"), teams, projects, tasks of a project, events, or usage (e.g., statistics of a feature or a function) of the collaborative work system.

In an example, the count of items generated by the user in the collaborative work system may include a number of items generated by one or more users in an account of the collaborative work system. The number may be associated, measured, or visualized with other information derived from the collaborative work system, such as a progress status of a task or a stage of a project, for example. In another example, the count of items generated by the user in the collaborative work system may include a number of boards generated in an account of the collaborative work system. The boards may be associated with a team, a workspace, a part of a project, or a time duration. As another example, the count of items generated by the user in the collaborative work system may include a number of events, a number of features of an event, or a number of users (e.g., monthly active users) using a feature.

By way of example, FIG. 12 illustrates an example table 1200 generated in a collaborative work system, consistent with embodiments of the present disclosure. The items generated by the user in the collaborative work system, as described above, may include table 1200 itself, contents of table 1200 (e.g., content data in a cell of table 1200), or features (e.g., statistical data or metadata) associated with the contents of table 1200. In some embodiments, the table 1200 may be displayed using a computing device (e.g., the computing device 100 illustrated in FIG. 1) or software running thereon. The table 1200 may be associated with a project (e.g., "Project 1" in FIG. 12) and may include, in the multiple rows and columns, tasks (e.g., in rows including "Task 1," "Task 2," or "Task 3") included in the project, persons (e.g., in a column 1212) assigned to the tasks, details (e.g., in a column 1214) of the tasks, statuses (e.g., in a column 1202) of the tasks, due dates (e.g., in a column 1206) of the tasks, timelines (e.g., in a column 1210) of the tasks, or any information, characteristic, or associated entity of the project. A task may refer to a part or a portion of a project. A task may be performed by an entity (e.g., an individual or a team). In some embodiments, a task may be represented by a row of cells in a task table. In some embodiments, a task may be represented by a column of cells of a task table.

Any column of the table may display cells of a single data type or of multiple data types. A "data type" of a cell in this disclosure may refer to a type, a category, or a characteristic of data to be included in the cell, such as a numeric value, a character, a symbol, a text, an alphanumeric value, a graphic element, a closed list of elements, a value range, or any constraint on the format or type of cell data. A single data type column may be one where all cells are uniform in at least one data type or characteristic. In some embodiments, the first column may be at least a portion of a single data type (e.g., texts) column-oriented data structure. A single data type column-oriented data structure may be a digital data structure of a table that includes columns where all cells of the columns may be programmed to include a single category of data.

In FIG. 12, the table 1200 includes, among other columns, a first column 1202 that has a first column heading 1204 ("Status") and a second column 1206 that has a second column heading 1208 ("Due Date"). For example, the first column 1202 may be a status column type of table 1200. Other columns with other characteristics in FIG. 12 may include a due date column type (including a second column 1206), a timeline column type (including the column 1210), a person column type (including the column 1212), and text column types such as the columns 1214 and 1216.

In FIG. 12, the first column 1202 includes three rows, each row including one or more words indicative of a status of each task of the project. The second column 1206 includes three rows, each row including a date indicative of a due date of each task of the project. In some embodiments, the computing device that implements the method may enable the user to select the second column heading in the table or through a user interface such as a column store in a manner similar to that of enabling the user to select the first column heading in the table as described above.

As illustrated in FIG. 12, the at least one processor may maintain a data structure that includes a plurality of tables (e.g., including the table 1200) and other information (e.g., metadata) associated with the plurality of tables. Each table (e.g., the table 1200) of the plurality of tables may include a plurality of rows (e.g., the rows of "Task 1," "Task 2," and "Task 3" in the table 1200) and columns (e.g., columns 1202, 1206, 1210, 1212, 1214, and 1216 of the table 1200). Each of the plurality of columns may have an associated column heading, such as the first column heading 1204 associated with the first column 1202 or the second column heading 1208 associated with the second column 1206.

Some disclosed embodiments may be configured to track characteristics of electronic connections between a plurality of entities in an electronic workspace. A characteristic of an electronic connection may refer to a type of an activity associated with the electronic connection, a time duration of the activity associated with the electronic connection, a feature of the activity associated with the electronic connection, a time duration a user spending on the feature of the activity associated with the electronic connection, a count of activities associated with the electronic connection, or any other specification or metric of the activity or a relationship associated with the electronic connection. In some embodiments, the characteristics may include at least one of a length of interaction, a quality of interaction, a type of interaction, a number of interactions, a frequency of interactions, or a regularity of interactions. A length of an interaction may include a metric such as a character count of a text message, a measure of time for a phone call or recording, or any other similar metric that can measure a length of an interaction. A quality of interaction may include any metric that measures the substance of an interaction. For example, an interaction may be of higher quality if the interaction includes sending a file. In contrast, an interaction may be of lower quality if the interaction merely includes clicking a "like" button on a post. The measure of a quality of interaction may be defined by the system or may be defined and modified according to a user preference. A type of interaction may include a descriptor of the interaction between any nodes (e.g., a message interaction, a phone call interaction, a file transmittal interaction, and so on.)

In some embodiments, the at least one processor may track the characteristics of the electronic connections in the electronic workspace directly, such as by collecting data representing the characteristics via computer software running in the electronic workspace. In some embodiments, the at least one processor may track the characteristics of the electronic connections on a computer platform (e.g., a server computer) communicatively coupled to the electronic workspace (e.g., a client computer). For example, the data representing the characteristics may be collected in the electronic workspace and transmitted to the computer platform for tracking.

Consistent with disclosed embodiments, the at least one processor may be configured to store in memory the tracked connections and the tracked characteristics. Tracking connections and characteristics may include making a record of connections and characteristics as described above in a repository (e.g., in memory) in a local client device or in a remote server.

By way of example, the memory can be memory 120 as described in association with FIG. 1. In some embodiments, the at least one processor may store the tracked connections and the tracked characteristics in a database (e.g., a relational database) in the memory.

In some embodiments, the at least one processor may be configured to calculate connection strength between connected entities based on at least one of the tracked characteristics. The connection strength may refer to a frequency, an importance value, a count, a weight, or any metric value representing a strength of an interaction or a relationship. For example, if the connection strength represents a count of interactions between two connected entities, the more interactions that occur between the two connected entities, the greater the connection strength may be.

In some embodiments, when the connection strength is associated with interactions between the connected entities, the interactions may include a "mentioning" operation (e.g., a first user responding a second user in the electronic workspace, such as an "@" operation), a replying operation (e.g., a first user posting contents in response to contents generated by a second user), a commenting operation (e.g., a first user clicking a "like" button for contents generated by a second user), an updating operation (e.g., a first user adding, removing, or modifying contents generated by a second user), a generating operation (e.g., a first user generating contents associated with a second user), a notifying operation (e.g., a first user sending a notification to a second user), a labeling operation (e.g., a first user assigning a second user to a group, team, task, or project), a communicating operation (e.g., a first user messaging, texting, emailing, or calling a second user), an annotating operation (e.g., a first user generating a note, an annotation, or a comment for a second user without notifying the second user), or any other activity associated with the connected entities in the electronic workspace. In such cases, the tracked characteristics of the connected entities may include at least one of a frequency value, a count, or a weight value. In some embodiments, the interactions between the connected entities may include an interaction between a first computer software (e.g., an application, a website, or a service platform) associated with a first user (e.g., an individual or a team) and a second computer software (e.g., an application, a website, or a service platform) associated with a second user (e.g., an individual or a team).

Some embodiments may involve calculating the connection strength using a calculation formula or an algorithm. In some embodiments, the calculated connection strength may be based on more than one of the plurality of tracked characteristics, as previously described above. For example, the tracked characteristics of the connected entities may include a count of interactions between a first entity and a second entity, and a total count of interactions between each two of the plurality of entities in the electronic workspace. The at least one processor may determine a ratio of the count of interactions between the first entity and the second entity over the total count of interactions, and determine the ratio as the connection strength.

In some embodiments, the at least one processor may calculate the connection strength based on at least one weight. The weight may be inputted by a user or determined automatically by the at least one processor (e.g., by retrieving the weight from a lookup table). For example, each count of interaction (including the count of interactions between the first entity and the second entity) between each two of the plurality of entities in the electronic workspace may be associated with a weight. The at least one processor may determine a weighted sum of the total count of interactions (e.g., by determining a sum of products, each product being calculated as a count multiplied with its associated weight), and determine a weighted product by multiplying the count of interactions between the first entity and the second entity with a weight associated with the count. Then, the at least one processor may calculate a ratio of the weighted product over the weighted sum, and determine the ratio as the connection strength. It should be noted that the at least one processor may calculate the connection strength using any formula or algorithms, not limited to the examples described herein.

In some embodiments, when at least some of the plurality of entities include a group of individuals, the calculated connection strength may include scoring. A score may include any alphanumeric associated with a metric to provide a value to a connection strength such that different connections may be compared based on their scores. For example, the calculated connection strength may be one or more scores (e.g., a ratio value as described above), each of the one or more scores being associated with an electronic connection between two of the group of individuals. A connection strength that is rated highly based on one or more characteristics may, for example, be associated with a score of "A" or "100%" for a highly rated score, and a score of "F" or "0%" for a lower rated score.

Some embodiments may involve calculating the connection strength for a predefined time period. For example, the at least one processor may calculate the connection strength between the connected entities based on at least one of the characteristics tracked in the predefined time period (e.g., a day, a week, a month, a year, or any time duration). In some embodiments, the time period may be adjustable. For example, the at least one processor may receive a first inputted time period and calculate a first connection strength for the first inputted time period, and then receive a second inputted time period and calculate a second connection strength for the second inputted time period, in which the first inputted time period is different from the second inputted time period. In some embodiments, the at least one processor may enable a user to input the time period in the electronic workspace before or concurrently with interactions occurring between the connected entities.

Aspects of this disclosure may include rendering a visualization of the plurality of entities. Rendering a visualization may refer to an operation of presenting or displaying a visual or graphical representation (e.g., a static or dynamic figure) of an object or group of objects on a screen of a device or via any other display mechanism. In some embodiments, an entity may be rendered as visualization of a node in the network map. Consistent with disclosed embodiments, the at least one processor may be configured to render a visualization of the tracked electronic connections between the plurality of entities. In some embodiments, a tracked electronic connection between two entities may be rendered as visualization of a connection (e.g., a line) between two nodes in the network map, in which the two nodes are the rendered visualization of the two entities.

By way of example, with reference to FIG. 11, the at least one processor may render the visualization of the plurality of entities as the circular avatars in network map 1100 and the tracked electronic connections between the plurality of entities as lines between the circular avatars in network map 1100.

In some embodiments, the visualization of the tracked electronic connections may represent actual interactions (e.g., communications) between the plurality of entities rather than direct organizational relationships between the plurality of entities. For example, the at least one processor may render a visualization of a tracked electronic connection between a first entity (e.g., an individual) and a second entity (e.g., an individual) based on actual interactions having occurred between the first entity and the second entity, even though the first entity and the second entity may have no direct organizational relationship (e.g., belonging to different independent departments of a company).

In some embodiments, before rendering the visualization of the tracked electronic connections, the at least one processor may determine whether a threshold condition is met. If the threshold condition is met, the at least one processor may render the visualization of the tracked electronic connections. For example, if the connection strength is calculated for a predefined time period, the at least one processor may set a minimum number (e.g., 50, 100, 200, or any number) of interactions (e.g., communications) within the predetermined time period (e.g., a month) for entities associated with the tracked electronic connections, and only enable rendering the visualization of the tracked electronic connections when the interactions between two entities exceed the minimum value. By doing so, the at least one processor may disable visualizing non-significant interactions (e.g., casual, infrequent, or one-time interactions) between the plurality of entities.

In some embodiments, the threshold condition may be related to a subset of the tracked electronic connections. For example, the at least one processor may render a visualization of a percentage range (e.g., top 10%, bottom 20%, or a range of 30% to 50%) of interactions between entities associated with the tracked electronic connections. Such a visualization may present a percentage range of frequencies of interactions between interacted entities in the electronic workspace, for example.

In some embodiments, the threshold condition may be related to a type of the tracked electronic connections. For example, the at least one processor may render a visualization of tracked electronic connections related to messages or emails but not render a visualization of tracked electronic connections related to non-significant interactions (e.g., clicking "like" buttons for user generated contents). Such a visualization may present prioritized interactions between interacted entities in the electronic workspace, for example.

In some embodiments, the threshold condition may be related to a specific entity of the tracked electronic connections. For example, the at least one processor may render a visualization of tracked electronic connections related to a first entity but not render a visualization of tracked electronic connections related to a second entity. Such a visualization may present interactions of interested entities in the electronic workspace, for example.

In some embodiments, the threshold condition may be related to a feature of the tracked electronic connections. For example, the at least one processor may render a visualization of tracked electronic connections within a time duration only, only between entities at a geographic location, or only between entities associated with the same task or project. In another example, the at least one processor may render a visualization of tracked electronic connections outside a time duration, between entities not at a geographic location, or between entities not associated with the same task or project. Such a visualization may present, for example, interactions of interested features in the electronic workspace.

In some embodiments, the threshold condition may be adjustable or customized. For example, the at least one processor may enable a user (e.g., by providing a user interface) to input or configure the threshold condition. The threshold condition may be configured before, after, or concurrently with the interactions occurring between the plurality of entities in the electronic workspace. In some embodiments, the at least one processor may render a plurality of visualizations of the tracked electronic connections under a plurality of different threshold conditions or generated at a plurality of different timestamps, in which the plurality of visualizations may be compared for trend analysis.

Consistent with disclosed embodiments, the at least one processor may be configured to render a visualization of at least one of the tracked characteristics of the electronic connections. At least one of the rendered visualizations of the tracked electronic connections and the rendered visualization of the at least one of the tracked characteristics may be reflective of the calculated connection strength. In some embodiments, the rendered visualization of the tracked electronic connections may be reflective of the calculated connection strength. For example, tracked electronic connections with a higher calculated connection strength may be rendered with a shorter line between two nodes to indicate that the two nodes have a stronger connection strength as compared to other nodes that are rendered further apart. In another example, the rendered visualization of the at least one of the tracked characteristics may be reflective of the calculated connection strength. For instance, the connection strength between two nodes may include the tracked characteristic of a frequency of interactions transmitted between the two nodes. As such, a visualization may be associated with the two nodes to represent the frequency of interactions, such as a number to indicate a count, a graphical indication such as a thicker line between the nodes, and so on. As another example, both the rendered visualization of the tracked electronic connections and the rendered visualization of the at least one of the tracked characteristics may be reflective of the calculated connection strength so that the visualization may provide information regarding both the tracked electronic connections and tracked characteristics (e.g., the distance between two nodes reflecting a strength, in addition to a number representing a count, between the two nodes).

In some embodiments, the at least one of the rendered visualization of the tracked electronic connections and the rendered visualization of the at least one of the tracked characteristics may be reflective of the calculated connection strength represented as at least one of a distance between rendered entities, a color, a size, an alphanumeric, or a graphic. For example, the rendered visualization of the tracked electronic connections, the rendered visualization of the at least one of the tracked characteristics, or both may use various thickness of lines or various sizes of nodes in the network map to reflect the calculated connection strength.

Consistent with some embodiments of this disclosure, the at least one processor may be further configured to output a display signal to cause the visualization of the plurality of entities and the visualization of the tracked electronic connections to be presented as a map of nodes. Each entity may be represented as a separate node in the map of nodes. A map of nodes may include a spatial presentation (2D, 3D, or virtual 3D) of nodes in a display or any other presentation manner. In some embodiments, in such a map of nodes, an associated entity may be represented via a photo, an icon, an avatar, a graphic, or a series of alphanumeric characters at each node.

Figure 13:
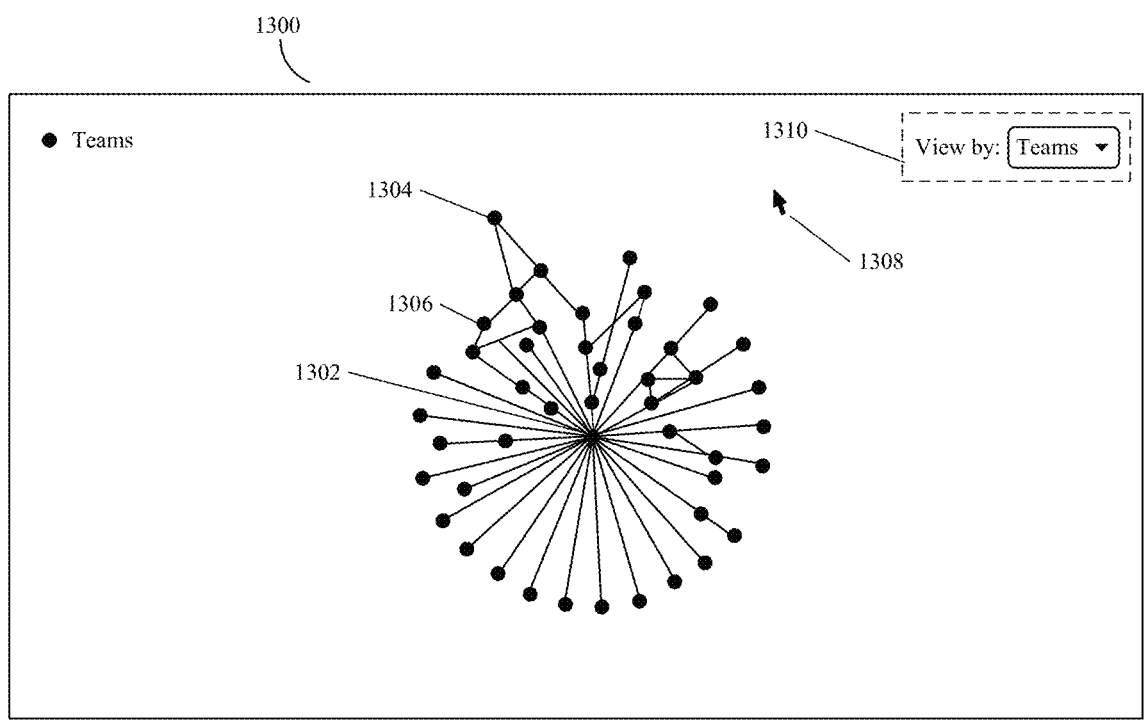
FIG. 13 illustrates an example visualization of a network map reflective of node connection strength, consistent with some embodiments of the present disclosure.

By way of example, FIG. 13 illustrates an example visualization of a network map 1300 reflective of node connection strength, consistent with some embodiments of the present disclosure. Network map 1300 includes nodes (represented as dots) and connections (represented as lines between the dots). Each node of network map 1300 represents an entity, including entities 1302, 1304, and 1306. Each connection of network map 1300 represents a tracked electronic connection between two entities. In FIG. 13, the entities may be teams. For example, entity 1302 may represent a management team, entity 1304 may represent a sales team, and entity 1306 may represent a production team. Hovering over or otherwise selecting a mode might reveal a textual and/or graphical indication of the identity of the entity represented by the node. In other embodiments, the indication may appear by default.

In some embodiments, the tracked characteristics of the electronic connections between the plurality of entities may include tracked interactions (e.g., communications) between the teams. For example, the connection strength between two connected teams may be calculated based on a count of tracked communications between the two teams. In FIG. 13, the length of the connection may be reflective of the connection strength. For example, the more communications between two teams, the shorter the lines may be between the two teams. It should be noted that the nodes and the connections in network map 1300 may be represented in other shapes besides the dots and the lines, respectively, which are not limited to the example embodiments as described herein. For example, the nodes and connections of network map 1300 may be stars and dash lines, respectively.

In some embodiments, the tracked characteristics of the electronic connections between the plurality of entities may additionally include tracked relationships (e.g., an organizational relationship) between the teams. For example, the visualization of the nodes of network map 1300 can be arranged to present (e.g., in a tree structure) an organizational structure of the teams (e.g., based on supervising duties), while the visualization of other parts of network map 1300 may remain unchanged. By doing so, network map 1300 may simultaneously present the organizational structure of the entities and the connection strength between them.

In some embodiments, although not shown in FIG. 13, instead of using the length of the connections, the connection strength may be visualized using other manners. For example, thickness or colors of the connection may be used to reflect the connection strength, in which the length of the connections may be irrelevant to the connection strength. In another example, one or more alphanumeric symbols may be overlayed on the connections to reflect the connection strength, in which the length of the connections may be irrelevant to the connection strength.

In some embodiments, each connection (e.g., a line) of network map 1300 may be associated with a weight. The weight may be predetermined, such as defined in a lookup table, or may be dynamically determined, such as being determined based on its connection strength calculated in real time. The weight may be used to represent an importance level of the electronic connections. For example, the tracked characteristics associated with network map 1300 may include various types of tracked communications between the teams, such as instant messages, emails, phone calls, or in-person meetings. In such an example, the weights of the instant messages, emails, phone calls, and in-person meetings may be assigned with increasing values that represent increasing importance levels. As another example, the tracked characteristics associated with network map 1300 may include various types of tracked relationships between the teams, such as an independent relationship, a peer relationship, or a supervising relationship. In such an example, the weights of independent relationship, peer relationship, and supervising relationship may be assigned with increasing values that represent increasing importance levels.

Figure 14:
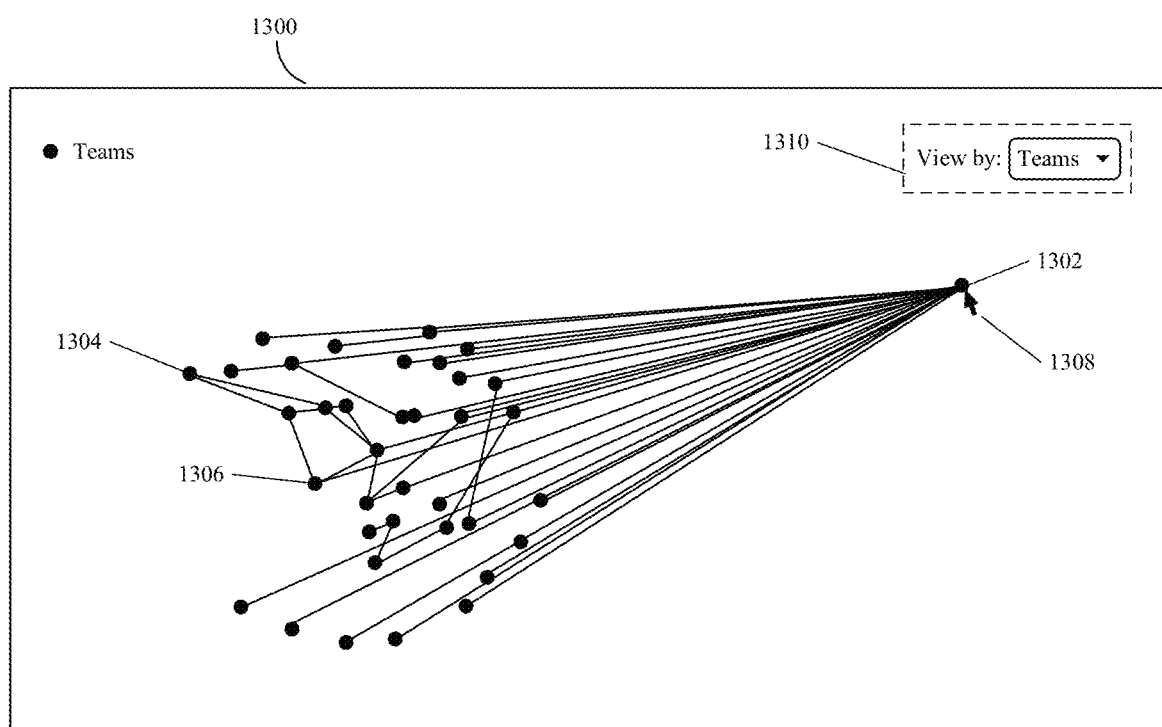
FIG. 14 illustrates an example visualization of a network map with movable nodes, consistent with some embodiments of the present disclosure.

In some embodiments, to enhance readability, the nodes of network map 1300 are capable of being moved (e.g., dragged). By way of example, FIG. 14 illustrates an example visualization of network map 1300 with movable nodes, consistent with some embodiments of the present disclosure. As illustrated in FIG. 14, entity 1302 may be dragged to an arbitrary position using cursor 1308 (e.g., by clicking, holding, and dragging entity 1302 using cursor 1308), while the electronic connections between entity 1302 and other entities in network map 1300 remain. By providing such capability to the visualization of network map 1300, a user may be enabled to rearrange the positions of the nodes of network map 1300 for enhancing readability in some situations, such as the nodes being overly congested. In some embodiments, when the user releases the clicking of cursor 1308 on entity 1302, the node of entity 1302 may return to its original position as illustrated in FIG. 13.

Figure 15:
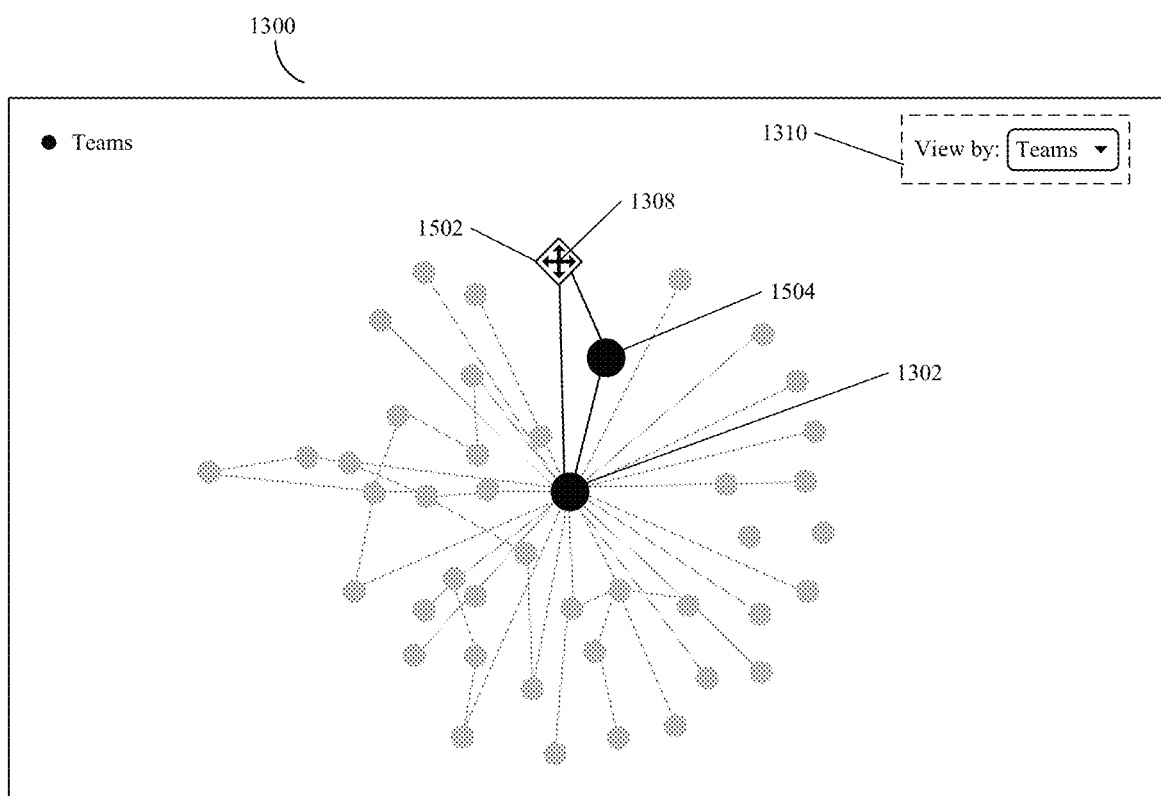
FIG. 15 illustrates an example visualization of a network map with highlighted nodes, consistent with some embodiments of the present disclosure.

In some embodiments, when a node of network map 1300 is selected, the visualization of network map 1300 may be changed to highlight the node and other nodes connected to the node. By way of example, FIG. 15 illustrates an example visualization of network map 1300 with highlighted nodes, consistent with some embodiments of the present disclosure. As illustrated in FIG. 15, an entity 1502 is selected. For example, entity 1502 may be selected by hovering cursor 1308 over entity 1502 or by clicking entity 1502 using cursor 1308, in either case of which the shape of cursor 1308 is changed to a cross shape and the shape of entity 1502 is changed to a diamond. After being selected, all entities having electronic connections with entity 1502, including entity 1302 and an entity 1504, may be visualized in a highlight mode. For example, as illustrated in FIG. 15, all other entities that have no electronic connections to entity 1502 as well as their connections may be dimmed (represented in a gray color), and the size of entity 1302 and entity 1504 may be enlarged. By providing such capability to the visualization of network map 1300, a user may be enabled to view the tracked electronic connections, the tracked characteristics of the tracked electronic connections, and the calculated connection strengths of an interested entity with improved clarity.

In some embodiments, network map 1300 may change its visualization in accordance with a presentation basis. As shown in FIGS. 13 to 15, network map 1300 is associated with a user interface 1310 (e.g., a drop-down menu). User interface 1310 enables a user to select a presentation basis to be applied for the visualization of network map 1300. In FIG. 13, user interface 1310 indicates that a presentation basis named "Teams" is selected, and thus network map 1300 shows the entities as teams as well as their connections and connection strength based on teams.

Figure 16:
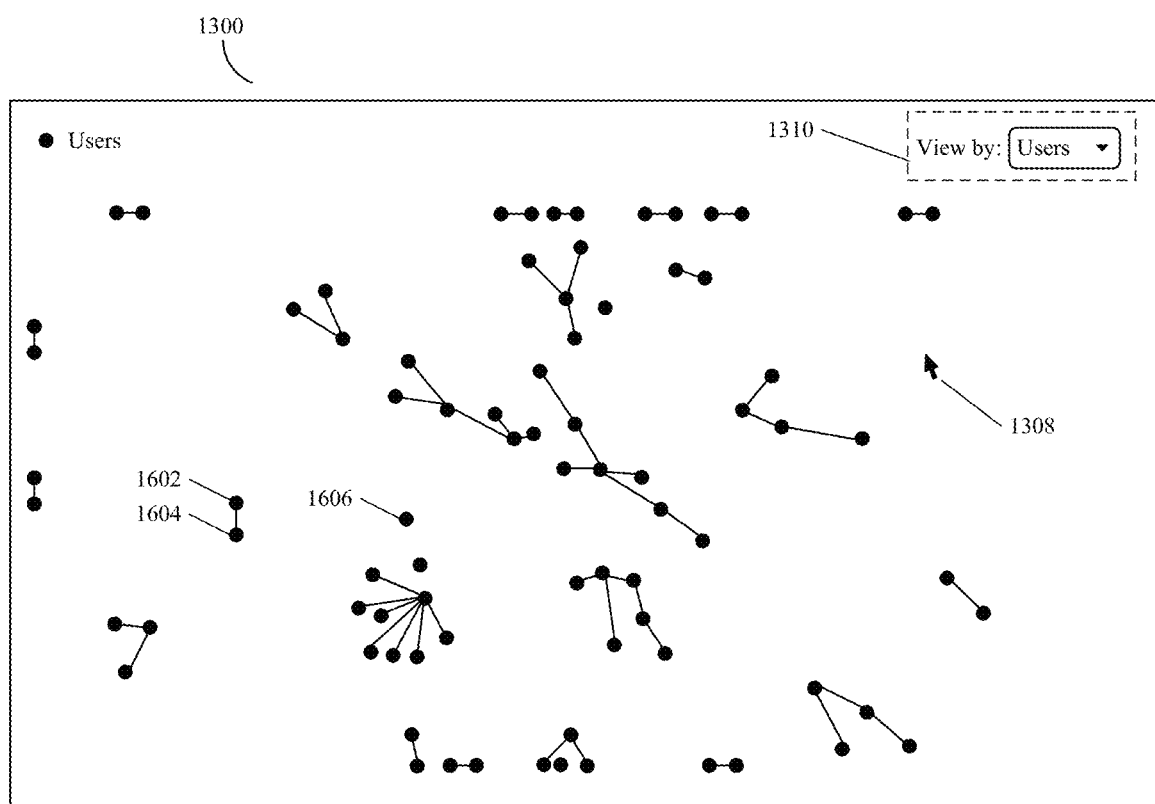
FIG. 16 illustrates another example visualization of a network map reflective of node connection strength, consistent with some embodiments of the present disclosure.

By way of example, FIG. 16 illustrates another example visualization of network map 1300 reflective of node connection strength, consistent with some embodiments of the present disclosure. As shown in FIG. 16, user interface 1310 indicates that a presentation basis named "Users" is selected, and thus network map 1300 shows the entities as users of the teams as well as their connections and connection strength based on users.

Compared to FIG. 13, each node of network map 1300 in FIG. 16 represents an entity that is a user (e.g., an individual) rather than a team, including users 1602, 1604, and 1606 that may be different individuals. Users 1602, 1604, and 1606 may belong to the same or different teams. Each connection of network map 1300 in FIG. 16 represents a tracked electronic connection between two users. For example, the tracked characteristics of the electronic connections between the plurality of users in FIG. 16 may include tracked interactions (e.g., communications) between the users or additionally include tracked relationships (e.g., an organizational relationship) between the users. The examples of the tracked interactions (e.g., communications) between the users and the examples of the tracked relationships may be similar to those described in association with FIG. 13, which will not be repeated.

Consistent with some embodiments of this disclosure and as alluded to previously, a label may be displayed near or over a node of the network map, such as for displaying an entity name or information related to the entity. For example, the label may be displayed by default. As another example, the label may be hidden by default, and when a cursor hovers over or clicks on the node, the label may be displayed near or over the node.

Figure 17:
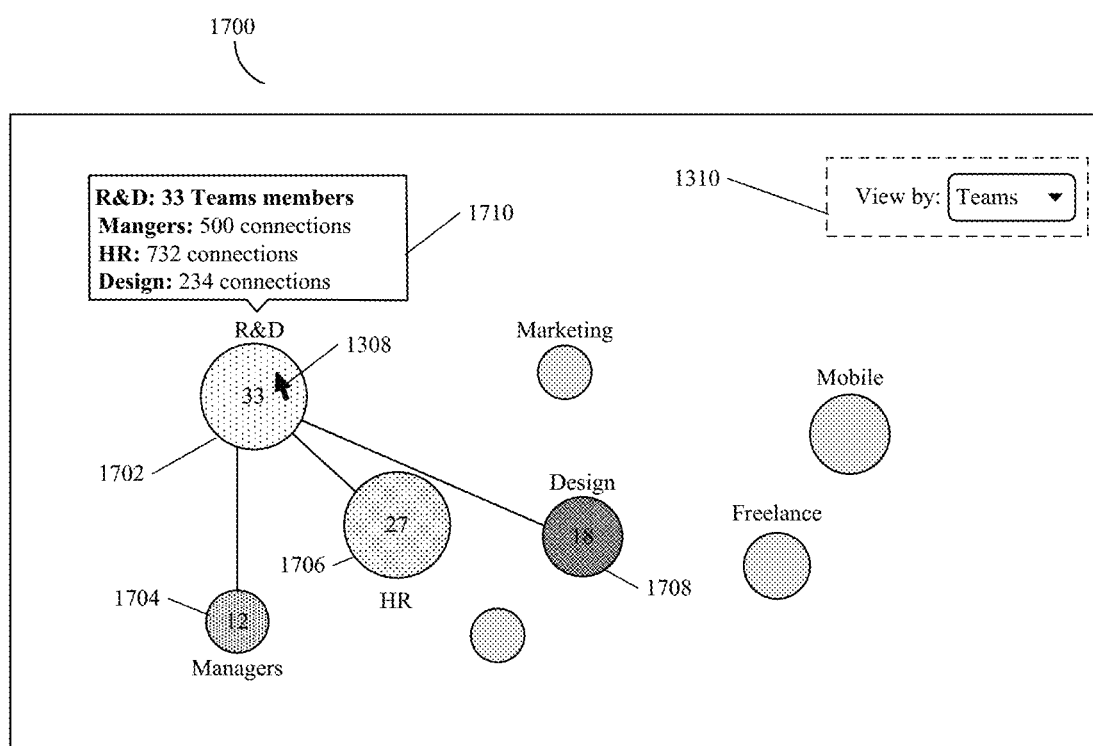
FIG. 17 illustrates a further example visualization of a network map reflective of node connection strength, consistent with some embodiments of the present disclosure.

By way of example, FIG. 17 illustrates another example visualization of a network map 1700 reflective of node connection strength, consistent with some embodiments of the present disclosure. Network map 1700 includes nodes (represented as circles) and connections (represented as lines between the circles). Each node of network map 1700 represents an entity, including entities 1702, 1704, 1706, and 1708. Each connection of network map 1700 represents a tracked electronic connection between two entities. The sizes of the nodes represent sizes of the entities.

In FIG. 17, the entities may be teams, and some entities have labels of team names displayed near their nodes, such as "R&D" near entity 1702, "Managers" near entity 1704, "HR" near entity 1706, "Design" near entity 1708, as well as "Marketing," "Freelance," and "Mobile" near other entities of network map 1700. Also, some entities have labels of team sizes (e.g., numbers of team members) displayed over their nodes, such as "33" over entity 1702, "12" over entity 1704, "27" over entity 1706, and "18" over entity 1708. As an example, when hovering cursor 1308 over entity 1702, a label 1710 may be displayed near entity 1702 to show information associated with entity 1702, such as a team size of entity 1702 and connection counts between entity 1702 and entities 1704, 1706, and 1708, respectively.

Consistent with some embodiments of this disclosure, the visualization of the network map (e.g., including the visualizations of its entities, tracked electronic connections between the entities, or tracked characteristics of the electronic connections) may not be limited to a two-dimensional representation. In some embodiments, the visualization of the network map may be presented as a three-dimensional object (e.g., with the entities distributed in a spherical shape) in a user interface (e.g., a screen of a device). For example, a virtual three-dimensional object may be manipulated (e.g., enlarged, shrunk, rotated, flipped, or mirrored) for viewing the entities, the tracked electronic connections between the entities, or the tracked characteristics of the electronic connections. In some embodiments, the visualization of the network map may be presented in hierarchy. For example, one or more entities may be grouped and presented as a single node in a first network map, and when the single node is selected to expand, a visualization of a second network map including only the one or more entities may be presented. In such an example, in some embodiments, the single node in the first network map may be displayed using a presentation basis of teams, and the nodes in the second network map may be displayed using a presentation basis of users.

Consistent with some embodiments of this disclosure, the visualization of the network map may be filtered using one or more tracked characteristics of the tracked electronic connections between entities of the network map. The tracked characteristics may include, for example, a count, a frequency, a weight, a content, a location, a date, a time, an individual, a team, a task, a project, a client, a supplier, a type of communications, or any other feature, specification, or metric associated with the electronic connection. For example, by applying a filter of a location, the visualization of the network map may be enabled to show only entities and their tracked electronic connections associated with the location. By providing such capability to the visualization of the network map, a user may be enabled to view contents of the network map related to an interested characteristic with improved clarity.

Figure 18:
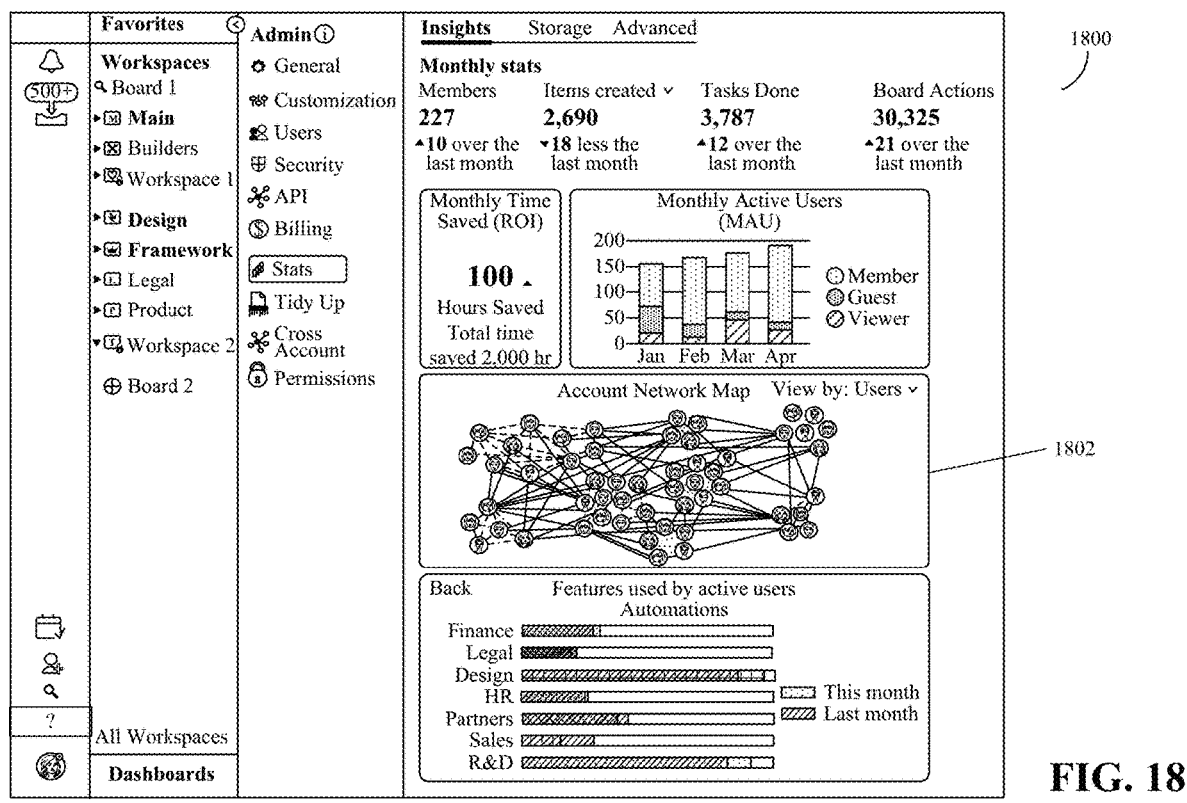
FIG. 18 illustrates an example visualization of an electronic working space including a network map reflective of node connection strength, consistent with some embodiments of the present disclosure.

By way of example, FIG. 18 illustrates an example visualization of an electronic working space 1800 including a network map 1802 reflective of node connection strength, consistent with some embodiments of the present disclosure. As illustrated in FIG. 18, electronic working space 1800 may be displayed as a user interface (e.g., a webpage) on a screen of a computing device. Network map 1802 may be displayed as part of the user interface, which presents tracked accounts, tracked electronic connections between the tracked accounts, and tracked characteristics of the tracked electronic connections viewed using users as a presentation basis. Network map 1802 may provide information to a user of electronic workspace 1800 to identify trends, behaviors and user account information that is non-obvious in other parts of electronic workspace 1800. For example, network map 1802 may reveal that some users lack communications, which may cause inefficiencies in their teams. In some embodiments, network map 1802 may be displayed in a dynamic manner to reflect actual communications between the users in electronic workspace 1800 in real time.

In some embodiments, network map 1802 may visualize information of entities (e.g., "persons" in table 1200 in FIG. 12) associated with a board (e.g., "Board 1") in electronic workspace 1802. In some embodiments, network map 1802 may visualize information of entities associated with two or more boards (e.g., both "Board 1" and "Board 2") in electronic workspace 1800. In some embodiments, network map 1802 may visualize information of entities associated with one or more boards in electronic workspace 1800 and another electronic workspace (not shown in FIG. 18).

As described in association with FIGS. 11 to 18, the technical solutions provided in this disclosure may provide visualization of information of entities in an electronic workspace with improved clarity, which may assist management and administration of the electronic workspace. Based on the visualization of the information of the entities, a manager or administrator may be enabled to comprehend the dynamics and trends occurring among entities. For example, the network map reflective of node connection strength may be applied to organize and manage different departments of a company or different members of a department.

Figure 19:
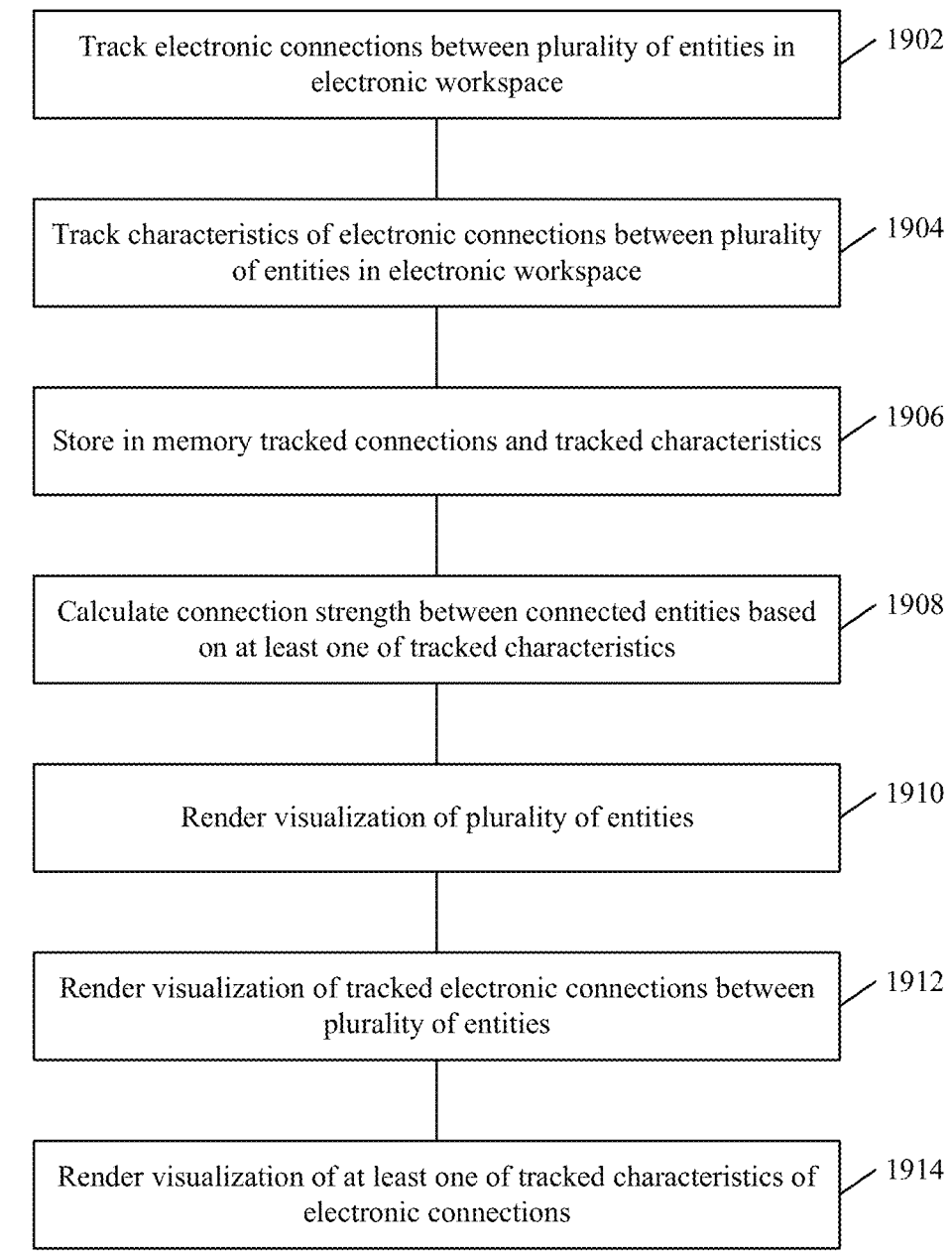
FIG. 19 is a block diagram of an example process for generating a network map reflective of node connection strength, consistent with embodiments of the present disclosure.

FIG. 19 illustrates a block diagram of an example process 1900 for generating a network map reflective of node connection strength, consistent with embodiments of the present disclosure. While the block diagram may be described below in connection with certain implementation embodiments presented in other figures, those implementations are provided for illustrative purposes only, and are not intended to serve as a limitation on the block diagram. In some embodiments, the process 1900 may be performed by at least one processor (e.g., the processing circuitry 110 in FIG. 1) of a computing device (e.g., the computing device 100 in FIGS. 1-2) to perform operations or functions described herein, and may be described hereinafter with reference to FIGS. 11 to 18 by way of example. In some embodiments, some aspects of the process 1900 may be implemented as software (e.g., program codes or instructions) that are stored in a memory (e.g., the memory portion 122 in FIG. 1) or a non-transitory computer-readable medium. In some embodiments, some aspects of the process 1900 may be implemented as hardware (e.g., a specific-purpose circuit). In some embodiments, the process 1900 may be implemented as a combination of software and hardware.

FIG. 19 includes process blocks 1902 to 1914. At block 1902, at least one processor may track electronic connections between a plurality of entities in an electronic workspace. In some embodiments, each of the plurality of entities may be a single individual. In some embodiments, at least some of the plurality of entities may include a group of individuals.

At block 1904, the at least one processor may track characteristics of the electronic connections between the plurality of entities in the electronic workspace. In some embodiments, the characteristics may include at least one of a length of interaction, a quality of interaction, a type of interaction, a number of interactions, a frequency of interactions, or a regularity of interactions.

At block 1906, the at least one processor may store in memory the tracked connections and the tracked characteristics.

At block 1908, the at least one processor may calculate connection strength between connected entities based on at least one of the tracked characteristics. In some embodiments, the calculated connection strength may include scoring. In some embodiments, the at least one processor may calculate the connection strength based on at least one weight.

In some embodiments, the at least one processor may calculate the connection strength for a predefined time period. For example, the time period may be adjustable. In some embodiments, the electronic connections may be based on at least one of emails, team assignments, text messages, voice messages, file transfers, or collective work in the electronic workspace. In some embodiments, the calculated connection strength may be based on more than one of the plurality of tracked characteristics.

At block 1910, the at least one processor may render a visualization of the plurality of entities. At block 1912, the at least one processor may render a visualization of the tracked electronic connections between the plurality of entities.

At block 1914, the at least one processor may render a visualization of at least one of the tracked characteristics of the electronic connections. At least one of the rendered visualization of the tracked electronic connections and the rendered visualization of the at least one of the tracked characteristics may be reflective of the calculated connection strength.

In some embodiments, the at least one of the rendered visualization of the tracked electronic connections in block 1912 and the rendered visualization of the at least one of the tracked characteristics reflective of the calculated connection strength in block 1914 may be represented as at least one of a distance between rendered entities, a color, a size, an alphanumeric, or a graphic.

Consistent with some embodiments of this disclosure, the at least one processor may further output a display signal to cause the visualization of the plurality of entities and the visualization of the tracked electronic connections to be presented as a map of nodes, in which each entity may be represented as a separate node. In some embodiments, at each node, an associated entity may be represented via a photo, an icon, an avatar, a graphic, or a series of alphanumeric characters.

Unless otherwise defined, all technical and scientific terms used herein have the same meaning as commonly understood by one of ordinary skill in the art. The materials, methods, and examples provided herein are illustrative only and not intended to be limiting.

Implementation of the method and system of the present disclosure may involve performing or completing certain selected tasks or steps manually, automatically, or a combination thereof. Moreover, according to actual instrumentation and equipment of preferred embodiments of the method and system of the present disclosure, several selected steps may be implemented by hardware (HW) or by software (SW) on any operating system of any firmware, or by a combination thereof. For example, as hardware, selected steps of the disclosure could be implemented as a chip or a circuit. As software or algorithm, selected steps of the disclosure could be implemented as a plurality of software instructions being executed by a computer using any suitable operating system. In any case, selected steps of the method and system of the disclosure could be described as being performed by a data processor, such as a computing device for executing a plurality of instructions.

As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Although the present disclosure is described with regard to a "computing device", a "computer", or "mobile device", it should be noted that optionally any device featuring a data processor and the ability to execute one or more instructions may be described as a computing device, including but not limited to any type of personal computer (PC), a server, a distributed server, a virtual server, a cloud computing platform, a cellular telephone, an IP telephone, a smartphone, a smart watch or a PDA (personal digital assistant). Any two or more of such devices in communication with each other may optionally comprise a "network" or a "computer network".

To provide for interaction with a user, the systems and techniques described here can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment or implementation are necessary in every embodiment or implementation of the invention. Further combinations of the above features and implementations are also considered to be within the scope of some embodiments or implementations of the invention.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

Disclosed embodiments may include any one of the following bullet-pointed features alone or in combination with one or more other bullet-pointed features, whether implemented as a method, by at least one processor, and/or stored as executable instructions on non-transitory computer-readable media:

maintaining a platform that hosts a plurality of applications accessible to a plurality of client devices;

enabling the plurality of client devices to access and display via the platform, the plurality of applications, when at a particular time, at least a first client device displays a first application and does not display a second application, and at least a second client device displays the second application and does not display the first application;

causing a communications interface to appear on the first client device and the second client device;

wherein the communications interface on the first client device includes a first link to the second application and the communications interface on the second client device includes a second link to the first application;

causing a first display on the first client device of the second application in response to selection on the first client device of the first link;

causing a second display on the second client device of the first application in response to selection on the second client device of the second link;

during the first display and the second display, enabling communication between the first client device and the second client device;

wherein the plurality of applications include tables;

wherein the communications interface includes a text chat box;

wherein the first link and the second link each include at least one button, activation of which enables screen sharing;

receiving a response to a notification and to cause the communications interface to appear on the first client device and the second client device upon receipt of the response to the notification;

wherein the first display on the first client device of the second application includes a link to a particular location within the second application, the particular location corresponding to a current working location on the second client device;

storing communications between the first client device and the second client device based on the particular location;

causing the communications interface to appear on a third client device and to enable access to the second application on the third client device via the first link;

enabling presentation of a shared work environment on a plurality of client devices;

causing a presentation of a plurality of visual indicators on a fraction of a display of the shared work environment;

wherein each visual indicator represents differing clients associated with the plurality of client devices;

enabling at least one group chat between the plurality of client devices;

wherein communications are presented in pop-up windows appearing adjacent corresponding visual indicators;

wherein the pop-up windows remain on the display for differing durations depending on variables including at least one of length of message, number of concurrently displayed messages, a client defined threshold, or a sender status;

saving a pop-up message for later review on a particular client device when a client associated with the particular client device selects the message;

wherein the fraction of the display includes a bar on an edge of the display;

wherein the visual indicator is at least one of a thumbnail photo, an icon, or alphanumeric characters;

comparing each message to a message length threshold and to increase message hang-time when the message length threshold is surpassed;

wherein the client defined threshold is selectable by a client;

wherein the client defined threshold is selectable by an administrator;

altering a combination of the plurality of client devices in the at least one group chat;

tracking electronic connections between a plurality of entities in an electronic workspace;

tracking characteristics of the electronic connections between the plurality of entities in the electronic workspace;
storing in memory the tracked connections and the tracked characteristics;
calculating connection strength between connected entities based on at least one of the tracked characteristics;
rendering a visualization of the plurality of entities;
rendering a visualization of the tracked electronic connections between the plurality of entities;
rendering a visualization of at least one of the tracked characteristics of the electronic connections;
wherein at least one of the rendered visualization of the tracked electronic connections and the rendered visualization of the at least one of the tracked characteristics is reflective of the calculated connection strength;
outputting a display signal to cause the visualization of the plurality of entities and the visualization of the tracked electronic connections to be presented as a map of nodes;
wherein each entity is represented as a separate node;
wherein at each node, an associated entity is represented via a photo, an icon, an avatar, a graphic, or a series of alphanumeric characters;
calculating the connection strength for a predefined time period;
wherein the time period is adjustable;
wherein the electronic connections are based on at least one of emails, team assignments, text messages, voice messages, file transfers, or collective work in the electronic workspace;
wherein the characteristics include at least one of a length of interaction, a quality of interaction, a type of interaction, a number of interactions, a frequency of interactions, or a regularity of interactions;
wherein the calculated connection strength is based on more than one of the plurality of tracked characteristics;
wherein the at least one of the rendered visualization of the tracked electronic connections and the rendered visualization of the at least one of the tracked characteristics reflective of the calculated connection strength is represented as at least one of a distance between rendered entities, a color, a size, an alphanumeric, or a graphic;
wherein each of the plurality of entities is a single individual;
wherein at least some of the plurality of entities includes a group of individuals;
wherein the calculated connection strength includes scoring;
calculating the connection strength based on at least one weight.

Systems and methods disclosed herein involve unconventional improvements over conventional approaches. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

It is appreciated that the above described embodiments can be implemented by hardware, or software (program codes), or a combination of hardware and software. If implemented by software, it can be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above described modules/units can be combined as one module or unit, and each of the above described modules/units can be further divided into a plurality of sub-modules or sub-units.

The block diagrams in the figures illustrate the architecture, functionality, and operation of possible implementations of systems, methods, and computer hardware or software products according to various example embodiments of the present disclosure. In this regard, each block in a flowchart or block diagram may represent a module, segment, or portion of code, which includes one or more executable instructions for implementing the specified logical functions. It should be understood that in some alternative implementations, functions indicated in a block may occur out of order noted in the figures. For example, two blocks shown in succession may be executed or implemented substantially concurrently, or two blocks may sometimes be executed in reverse order, depending upon the functionality involved. Some blocks may also be omitted. It should also be understood that each block of the block diagrams, and combination of the blocks, may be implemented by special purpose hardware-based systems that perform the specified functions or acts, or by combinations of special purpose hardware and computer instructions.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as example only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

It will be appreciated that the embodiments of the present disclosure are not limited to the exact construction that has been described above and illustrated in the accompanying drawings, and that various modifications and changes may be made without departing from the scope thereof.

Other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims.

Computer programs based on the written description and methods of this specification are within the skill of a software developer. The various programs or program modules can be created using a variety of programming techniques. One or more of such software sections or modules can be integrated into a computer system, non-transitory computer readable media, or existing software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application. These examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A system for mutual screen sharing during a text chat, the system comprising:
at least one processor configured to:
maintain a collaborative work platform that hosts a plurality of applications and a communications interface accessible to a plurality of client devices, wherein the plurality of applications include tables for containing data in cells defined by the intersection of horizontal rows and vertical rows, wherein at least one of the horizontal rows and the vertical rows is associated with both a first user and a second user;
enable the plurality of client devices to access and display via the platform the plurality of applications, when at a particular time, at least a first client device associated with the first user displays a first application prior to and without displaying the communications interface on the first client device and does not display a second application, and at least a second client device associated with the second user displays the second application prior to and without displaying the communications interface on the second client device and does not display the first application;
via the platform, cause a first text chat box of the communications interface to appear on the first client device and a second text chat box of the communications interface to appear on the second client device following the display of the first application and the second application, the first text chat box for enabling text input and viewing by the first user and the second text chat box for enabling text input and viewing by the second user, wherein the communications interface on the first client device displays a first link to a first particular location within the second application, and the communications interface on the second client device displays a second link to a second particular location within the first application;
cause a first display on the first client device of the first particular location within the second application in response to selection on the first client device of the first link, wherein the first particular location corresponds to a specific item;
during the first display on the first client device of the first particular location within the second application, enable the first client device to change data in the first particular location within the second application displayed on the second client device;
cause a second display on the second client device of the second particular location within the first application in response to selection on the second client device of the second link;
during the second display on the second client device of the second particular location within the first application, enable the second client device to change data in the second particular location within the first application displayed on the first client device;
during the first display and the second display, enable communication between the first client device and the second client device;
during the first display, store first communications in association with the first particular location;
during the second display, store second communications in association with the second particular location; and
at a time after the particular time and in response to selection of the specific item corresponding to the first particular location, enable the first client device and the second client device to access the stored first communications.

2. The system of claim 1, wherein the first link and the second link each include at least one button, activation of which enables screen sharing.

3. The system of claim 1, wherein the at least one processor is further configured to receive a response to a notification and to cause the communications interface to appear on the first client device and the second client device upon receipt of the response to the notification.

4. The system of claim 1, wherein the at least one processor is further configured to cause the communications interface to appear on a third client device and to enable access to the second application on the third client device via the first link.

5. The system of claim 1, wherein the stored first communications are stored for a limited period of time.

6. The system of claim 5, wherein the at least one processor is further configured to permit selection of the limited period of time.

7. The system of claim 1, wherein the first communications and the second communications are stored automatically.

8. The system of claim 1, wherein the at least one processor is further configured to display the first communication in a pop-up window appearing adjacent the specific item.

9. The system of claim 8, wherein the at least one processor is further configured to display the pop-up window for differing durations depending on variables, wherein the variables include at least one of a client defined threshold or a priority.

10. The system of claim 1, wherein enabling the plurality of client devices to access and display via the platform the plurality of applications requires an authentication.

11. The system of claim 1, wherein the at least one processor is further configured to determine that the first client device and the second client device are in communication with the first application and to cause the communications interface to appear on the first client device and the second client device upon the determination.

12. The system of claim 1, wherein the at least one processor is further configured to determine that an action was performed in the first application and to cause the communications interface to appear on the first client device and the second client device upon the determination.

13. The system of claim 1, wherein the at least one processor is further configured to determine that at least one of the first user and the second user has selected an interactive element in at least one of the tables and to cause the communications interface to appear on the first client device and the second client device upon the determination.

14. A non-transitory computer readable medium containing instructions that when executed by at least one processor, cause the at least one processor to perform operations for mutual screen sharing during a text chat, the operations comprising:

maintaining a platform that hosts a plurality of applications and a communications interface accessible to a plurality of client devices, wherein the plurality of applications include tables for containing data in cells defined by the intersection of horizontal rows and vertical rows, wherein at least one of the horizontal rows and the vertical rows is associated with both a first user and a second user;

enabling the plurality of client devices to access and display via the platform the plurality of applications, when at a particular time, at least a first client device associated with the first user displays a first application prior to and without displaying the communications interface on the first client device and does not display a second application, and at least a second client device associated with the second user displays the second application prior to and without displaying the communications interface on the second client device and does not display the first application;

via the platform, causing a first text chat box of a communications interface to appear on the first client device and a second text chat box of the communications interface to appear on the second client device following the display of the first application and the second application, the first text chat box for enabling text input and viewing by the first user and the second text chat box for enabling text input and viewing by the second user, wherein the communications interface on the first client device includes a first link to a first particular location within the second application, and the communications interface on the second client device includes a second link to a second particular location within the first application;

causing a first display on the first client device of the first particular location within the second application in response to selection on the first client device of the first link, wherein the first particular location corresponds to a specific item;

during the first display on the first client device of the first particular location within the second application, enabling the first client device to change data in the first particular location within the second application displayed on the second client device;

causing a second display on the second client device of the second particular location within the first application in response to selection on the second client device of the second link;

during the second display on the second client device of second particular location within the first application, enabling the second client device to change data in the second particular location within the first application displayed on the first client device;

during the first display and the second display, enabling communication between the first client device and the second client device;

during the first display, storing first communications in association with the first particular location;

during the second display, storing second communications in association with the second particular location;

at a time after the particular time and in response to selection of the specific item corresponding to the first particular location, enabling the first client device and the second client device to access the stored first communications.

15. The non-transitory computer readable medium of claim 14, wherein the first link and the second link each include at least one button, activation of which enables screen sharing.

16. The non-transitory computer readable medium of claim 14, wherein the operations further include receiving a response to a notification and causing the communications interface to appear on the first client device and the second client device upon receipt of the response to the notification.

17. The non-transitory computer readable medium of claim 14, wherein the operations further comprise causing the communications interface to appear on a third client device and enabling access to the second application on the third client device via the first link.

18. A method for mutual screen sharing during a text chat, the method comprising:

maintaining a platform that hosts a plurality of applications and a communications interface accessible to a plurality of client devices, wherein the plurality of applications include tables for containing data in cells defined by the intersection of horizontal rows and vertical rows, wherein at least one of the horizontal rows and the vertical rows is associated with both a first user and a second user;

enabling the plurality of client devices to access and display via the platform the plurality of applications, when at a particular time, at least a first client device associated with the first user displays a first application prior to and without displaying the communications interface on the first client device and does not display a second application, and at least a second client device associated with the second user displays the second application prior to and without displaying the communications interface on the second client device and does not display the first application;

via the platform, causing a first text chat box of a communications interface to appear on the first client device and a second text chat box of the communications interface to appear on the second client device following the display of the first application and the second application, the first text chat box for enabling text input and viewing by the first user and the second text chat box for enabling text input and viewing by the second user, wherein the communications interface on the first client device includes a first link to a first particular location within the second application, and the communications interface on the second client device includes a second link to a second particular location within the first application;

causing a first display on the first client device of the first particular location within the second application in response to selection on the first client device of the first link, wherein the first particular location corresponds to a specific item;

during the first display on the first client device of the first particular location within the second application, enabling the first client device to change data in the first particular location within the second application displayed on the second client device;

causing a second display on the second client device of the second particular location within the first application in response to selection on the second client device of the second link;

during the second display on the second client device of second particular location within the first application, enabling the second client device to change data in the second particular location within the first application displayed on the first client device;

during the first display and the second display, enabling communication between the first client device and the second client device;

during the first display, storing first communications in association with the first particular location;

during the second display, storing second communications in association with the second particular location;

at a time after the particular time and in response to selection of the specific item corresponding to the first particular location, enabling the first client device and the second client device to access the stored first communications.

19. The method of claim 18, further comprising causing the communications interface to appear on a third client device and enabling access to the second application on the third client device via the first link.

* * * * *